US010173781B2

(12) United States Patent
Gornik

(10) Patent No.: US 10,173,781 B2
(45) Date of Patent: Jan. 8, 2019

(54) SYSTEMS AND METHODS FOR APPLYING DEFORMATIONS TO A STRUCTURAL SURFACE

(71) Applicant: AeroIceFree LTD., Bene-Atarot (IL)

(72) Inventor: Amihay Gornik, Karmey Yosef (IL)

( * ) Notice: Subject to any disclaimer, the term of this patent is extended or adjusted under 35 U.S.C. 154(b) by 343 days.

(21) Appl. No.: 15/208,713

(22) Filed: Jul. 13, 2016

(65) Prior Publication Data
US 2017/0015427 A1    Jan. 19, 2017

(30) Foreign Application Priority Data

Jul. 14, 2015 (IL) .......................................... 239942
Sep. 6, 2015 (IL) .......................................... 241216

(51) Int. Cl.
*B64D 15/16*        (2006.01)
(52) U.S. Cl.
CPC .................................... *B64D 15/16* (2013.01)
(58) Field of Classification Search
CPC ......... B64D 15/00; B64D 15/16; B64D 15/20
See application file for complete search history.

(56) References Cited

U.S. PATENT DOCUMENTS 2,271,466 A  *  1/1942  Schmidt ................. B64D 15/16
                                                244/134 A

FOREIGN PATENT DOCUMENTS

GB            523108 A  *  7/1940  ............. B64D 15/16

* cited by examiner

*Primary Examiner* — Valentina Xavier
(74) *Attorney, Agent, or Firm* — Reches Patents

(57) ABSTRACT

System for applying deformations to a structural surface, the system may include an actuating unit, operable to produce a periodically variable force which is applied to at least one first location of the structural surface, thereby displacing the structural surface in a plurality of directions at the at least one first location and a passive displacing unit comprising a weight and a displacer supporting the weight and fixed to at least one second location on the structural surface; wherein the structural surface is capable of transferring vibrations between the at least one first location and the at least one second location, so that the displacing of the structural surface at the at least one first location produces forces which are applied to the weight via the structural surface and the displacer, bringing the weight to resonance, thereby displacing the structural surface in a plurality of directions at each of the at least one second location.

20 Claims, 28 Drawing Sheets

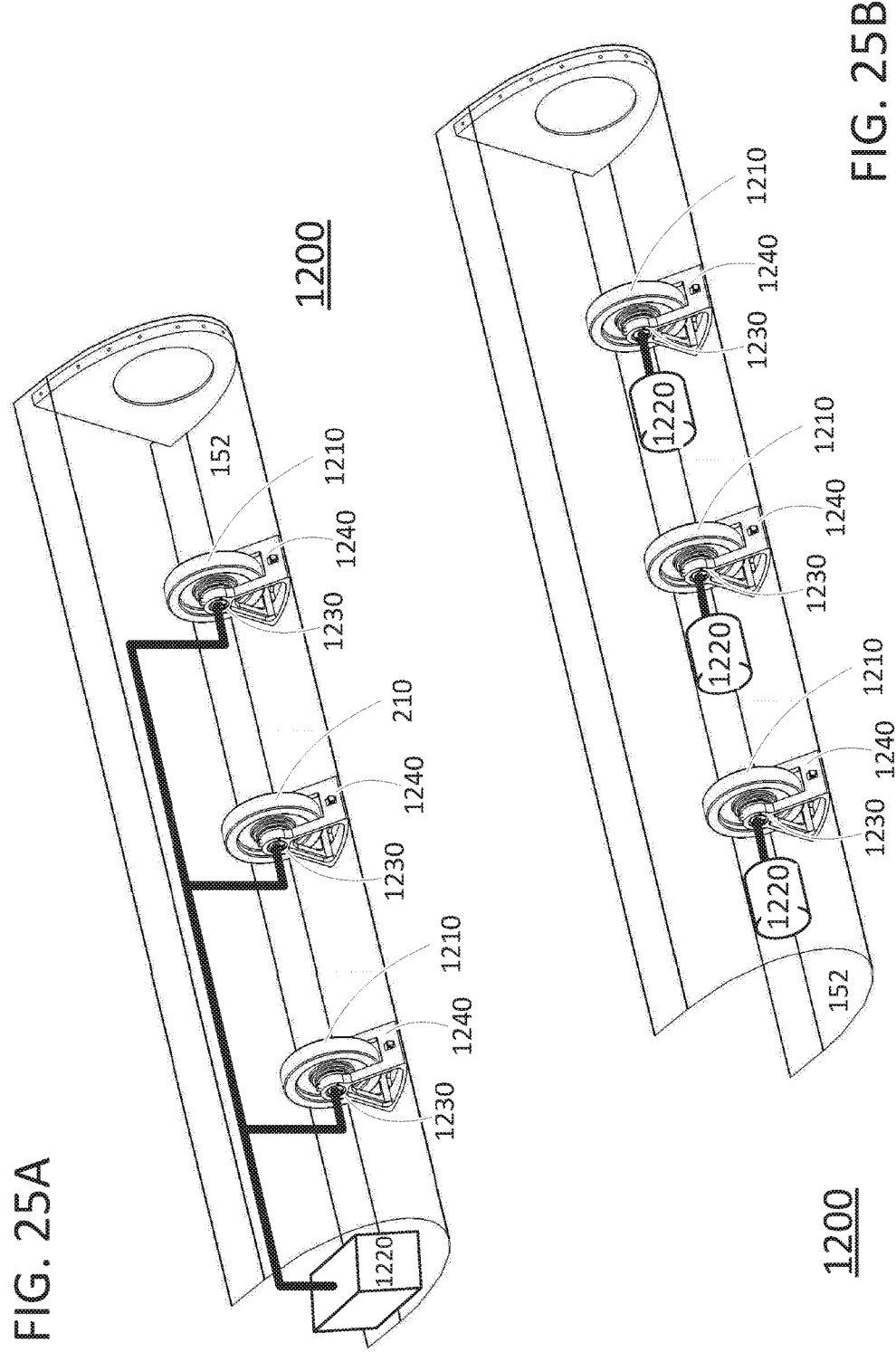

SYSTEMS AND METHODS FOR APPLYING DEFORMATIONS TO A STRUCTURAL SURFACE

RELATED APPLICATIONS

This application claims priority from Israeli patent application serial number 239,942 entitled "Systems and Methods for Applying Deformations to a Structural Surface" filing date Jul. 14, 2015, and from Israeli patent application serial number 241,216 entitled "Systems and Methods for Aircraft Deicing" filing date Sep. 6, 2015, all are being incorporated herein by reference.

FIELD

The invention is related to systems and methods for applying deformations to a structural surface, such as although not limited to systems and methods for applying deformations to an aircraft skin surface. Especially, the invention is related to systems and methods for deicing of aircrafts by applying deformations to aircraft skin surface of aircrafts.

BACKGROUND

Mechanical resonance is the tendency of a mechanical system to absorb energy when the frequency of its oscillations matches the system's natural frequency of vibration in higher level than it absorbs energy at other frequencies. Mechanical resonance may cause violent swaying motions and even catastrophic failure in improperly constructed structures including aircrafts. Other forms of dynamic instabilities—such as flutter—may also insert various forms of vibration into various parts of the aircraft.

When designing aircrafts, it is customary for engineers to implement various means to ensure that mechanical resonance frequencies of the component parts of the aircraft do not match driving vibrational frequencies of motors or other oscillating parts on the aircraft. Such means may include, for example, different kinds of shock absorbers and other absorbers, as well as other means of dissipating the absorbed energy.

Furthermore, vibrations usually reduce the effectivity of various systems which are installed on the aircraft (e.g. sensors, mounts, mechanical components and so on). Therefore, extra means are usually used in order to prevent vibration of systems installed in the aircraft with respect to the body of the aircraft (including the chassis as well as the external structural surfaces).

U.S. Pat. No. 8,517,313 by Amihay Gornik, entitled "Mechanical Vibration Deicing System" discloses an aircraft deicing system including at least one motor operative to drive at least one eccentric mass in rotational motion and at least one displacer coupled to at least one location on at least one aircraft surface and coupled to the at least one eccentric mass such that forces produced by the rotational motion of the eccentric mass are applied to the at least one displacer, causing the at least one displacer to displace the at least one aircraft surface in a plurality of directions at each of the at least one location, thereby causing disengagement of ice from the at least one aircraft surface.

GENERAL DESCRIPTION

According to an aspect of the invention, there is disclosed a system for applying deformations to a structural surface, the system including: (a) an actuating unit, operable to produce a periodically variable force which is applied to at least one first location of the structural surface, thereby displacing the structural surface in a plurality of directions at the at least one first location; and (b) a passive displacing unit including a weight and a displacer supporting the weight and fixed to at least one second location on the structural surface; wherein the structural surface is capable of transferring vibrations between the at least one first location and the at least one second location, so that the displacing of the structural surface at the at least one first location produces forces which are applied to the weight via the structural surface and the displacer, bringing the weight to resonance, thereby displacing the structural surface in a plurality of directions at each of the at least one second location.

According to a further aspect of the invention, the displacements of the structural surface at the at least one second location may cause disengagement of ice from the structural surface.

According to a further aspect of the invention, the actuating unit may be fixed to the structural surface at one or more of the at least one first location.

According to a further aspect of the invention, the actuating unit may be operable to produce the periodically variable force at a driving frequency, thereby producing forces which bring into resonance the weight, a part of the structural surface, and at least a part of the actuating unit, thereby displacing the structural surface in a plurality of directions at each of the at least one second location and at each of the at least one first location.

According to a further aspect of the invention, in the resonance state a ratio between (a) an average magnitude of displacement of the at least one second location and (b) an average magnitude of displacement of the at least one first location is between ⅓ and 3.

According to a further aspect of the invention, the structural surface may include an aircraft leading edge.

According to a further aspect of the invention, the structural surface may include an aircraft leading edge and an overall mass of the passive displacing unit is at least 80 grams.

According to a further aspect of the invention, the structural surface may include an aircraft leading edge and distance of a center of mass of the passive displacement unit from the structural surface is at least 4 cm.

According to a further aspect of the invention, the structural surface may include an aircraft leading edge and acceleration levels of the structural surface at each of the at least one second location and at each of the at least one first location exceed 80 g during an operation of the actuating unit.

According to a further aspect of the invention, the structural surface may include an aircraft leading edge and forces which are applied to structural surface by the displacer at each of the at least one second location exceed 80 N during an operation of the actuating unit.

According to a further aspect of the invention, the system may include at least one actuating unit, and a plurality of passive displacing units, wherein the system includes at least twice as many passive displacing units than actuating units.

According to a further aspect of the invention, the system may include a sensor operable to sense at least one icing parameter indicative of icing condition on the structural surface, and a controller operable to control an operation of the actuating unit based at least one the icing parameter.

According to a further aspect of the invention, the system may include: (a) at least one ice thickness sensor for sensing an ice thickness responsive characteristic of the structural surface, by sensing displacement of the structural surface responsive to the forces produced by the system; and (b) at least one controller operable to control an operation of the actuating unit based on an output of the at least one ice thickness sensor.

According to a further aspect of the invention, the actuating unit may include at least one actuator displacer fixed to the at least one first location and rotatably supporting a shaft about which the at least one eccentric mass moves in rotational motion, thereby producing inertial forces which are applied via the shaft to the at least one actuator displacer, causing the at least one actuator displacer to displace the structural surface in a plurality of directions at each of the at least one first location, the plurality of directions corresponding to changing positions of the eccentric mass as it moves in rotational motion about the shaft.

According to a further aspect of the invention, the system may include a plurality of actuating units and a plurality of passive displacing units, wherein the system includes at least twice as many passive displacing units than actuating units; wherein each of the actuating units is fixed to the structural surface at one or more of the at least one first location, and is operable to produce the periodically variable force at a driving frequency, thereby producing forces which bring into resonance the weight, a part of the structural surface, and at least a part of the actuating unit, thereby displacing the structural surface in a plurality of directions at each of the at least one second location and at each of the at least one first location; wherein in the resonance state a ratio between (a) an average magnitude of displacement of the at least one second location and (b) an average magnitude of displacement of the at least one first location is between $1/3$ and 3, wherein the structural surface includes an aircraft leading edge; wherein the displacements of the structural surface at the second locations and at the first locations cause disengagement of ice from the leading edge.

According to an aspect of the invention, there is disclosed an aircraft including: (a) an airframe including a structural surface; (b) an engine operable to propel the aircraft in a flying direction, the engine being mechanically connected to the airframe; (c) a plurality of actuating units, each of the actuating units being operable to produce a periodically variable force which is applied to at least one first location of the structural surface, thereby displacing the structural surface in a plurality of directions at the at least one first location; and (d) a plurality of passive displacing units, each of the passive displacing units including a weight and a displacer supporting the weight and fixed to at least one second location on the structural surface; wherein the structural surface is capable of transferring vibrations between each of the first locations and at least one associated second location out of the second location, so that the displacing of the structural surface at the first locations by the actuating units produces forces which are applied to the plurality of weights via the structural surface and the displacers, bringing each of the weights to resonance, thereby displacing the structural surface in a plurality of directions at each of the second locations.

According to a further aspect of the invention, the displacements of the structural surface of the aircraft at the at least one second location may cause disengagement of ice from the structural surface.

According to a further aspect of the invention, the actuating unit of the aircraft may be fixed to the structural surface at one or more of the at least one first location.

According to a further aspect of the invention, the actuating unit of the aircraft may be operable to produce the periodically variable force at a driving frequency, thereby producing forces which bring into resonance the weight, a part of the structural surface, and at least a part of the actuating unit, thereby displacing the structural surface in a plurality of directions at each of the at least one second location and at each of the at least one first location.

According to a further aspect of the invention, the structural surface of the aircraft may include an aircraft leading edge, wherein the aircraft includes at least one actuating unit, and a plurality of passive displacing units, wherein along a distance of at least 5 meters of the leading edge, a distance between any two adjacent passive displacement units does not exceed 1 meter.

According to a further aspect of the invention, the aircraft may include at least one actuating unit, and a plurality of passive displacing units, wherein the system includes at least twice as many passive displacing units than actuating units.

According to a further aspect of the invention, the aircraft may include a sensor operable to sense at least one icing parameter indicative of icing condition on the structural surface, and a controller operable to control an operation of the actuating unit based at least one the icing parameter.

According to a further aspect of the invention, the aircraft may further include: (a) at least one ice thickness sensor for sensing an ice thickness responsive characteristic of the structural surface, by sensing displacement of the structural surface responsive to the forces produced by the system; and (b) at least one controller operable to control an operation of the actuating unit based on an output of the at least one ice thickness sensor.

According to a further aspect of the invention, the aircraft may include a plurality of actuating units and a plurality of passive displacing units, wherein the system includes at least twice as many passive displacing units than actuating units; wherein each of the actuating units is fixed to the structural surface at one or more of the at least one first location, and is operable to produce the periodically variable force at a driving frequency, thereby producing forces which bring into resonance the weight, a part of the structural surface, and at least a part of the actuating unit, thereby displacing the structural surface in a plurality of directions at each of the at least one second location and at each of the at least one first location; wherein in the resonance state a ratio between (a) an average magnitude of displacement of the at least one second location and (b) an average magnitude of displacement of the at least one first location is between $1/3$ and 3; wherein the structural surface includes an aircraft leading edge; wherein the displacements of the structural surface at the second locations and at the first locations cause disengagement of ice from the leading edge.

According to an aspect of the invention, there is disclosed a method for applying deformations to a structural surface, the method including: (a) applying by an actuation unit a periodically variable force to at least one first location of the structural surface, resulting in vibrations which displace the structural surface in a plurality of directions at the at least one first location; and transferring the vibrations by the structural surface to a passive displacing unit connected to the structural surface at one or more second locations separated from the at least one first location; thereby bringing a weight of the actuation unit and a part of the structural surface to resonance; wherein the resonance of the structural surface creates deformations of the structural surface in a plurality of directions at the one or more second locations.

According to a further aspect of the invention, the deformations of the structural surface may cause disengagement of ice from the structural surface.

According to a further aspect of the invention, the transferring of the vibrations by the structural surface may produce forces which bring into resonance the weight, a part of the structural surface and at least a part of the actuating unit, thereby displacing the structural surface in a plurality of directions at each of the one or more second locations and at each of the one or more first location.

According to a further aspect of the invention, in the resonance state a ratio between (a) an average magnitude of displacement of the at least one second location and (b) an average magnitude of displacement of the at least one first location is between $1/3$ and 3.

According to a further aspect of the invention, the transferring may include transferring the vibrations by the structural surface to a plurality of passive displacing units, at a plurality of second locations; thereby bringing weights of the passive displacement units and parts of the structural surface to resonance; wherein the resonance of the structural surface creates deformations of the structural surface in a plurality of directions at the plurality of second locations.

According to a further aspect of the invention, the method may further include: (a) sensing an ice thickness responsive characteristic of the structural surface, by sensing displacement of the structural surface responsive to the forces produced by the system; and (b) controlling an operation of the actuating unit based on a result of the sensing.

According to an aspect of the invention, there is disclosed an aircraft deicing system, including: (a) a motor including a stator and a rotor, the rotor being rotatable about a center of mass of the rotor, and the stator rotatably supporting the rotor; (b) at least one displacer connected to the stator and to an aircraft skin surface at a plurality of connection locations; and (c) a controller operable to control torques in the motor, including a first torque applied to the rotor and a second torque applied to the stator; wherein the first torque angularly accelerates the rotor about the center of mass; wherein the second torque produces countering forces applied to the aircraft skin surface at the plurality of connection locations by the at least one displacer at different directions, causing displacement of the aircraft skin surface at at least one of the connection locations.

According to a further aspect of the invention, the controller is operable to control a current input to the motor, the current generating a magnetic flux in the motor, which result in at the first torque and the second torque.

According to a further aspect of the invention, the displacements of the aircraft skin surface at the at least one connection location cause disengagement of ice from the aircraft skin surface.

According to a further aspect of the invention, the second torque is at least 2 Newton·meter.

According to a further aspect of the invention, the second torque produces countering forces of at least 100 Newton applied to the aircraft skin surface by the at least one displacer at at least one of the connection locations.

According to a further aspect of the invention, the controller is operable to control application of the second torque at alternating opposite directions, thereby producing forces applied to the aircraft skin surface at the plurality of connection locations by the at least one displacer at different directions, causing displacement at different directions of the aircraft skin surface at the at least one connection location.

According to a further aspect of the invention, the controller is operable to control the alternating second torque on the stator in a rate of at least 20 Hertz.

According to a further aspect of the invention, the alternating periodical angular acceleration causes the rotatable mass to rotate about the center of mass in opposing directions.

According to a further aspect of the invention, the controller is operable to control the alternating second torque at a driving frequency, thereby bringing the aircraft skin surface to resonate around the at least one connection location, thereby causing disengagement of ice from the aircraft skin surface.

According to a further aspect of the invention, the aircraft deicing system further includes at least one ice thickness sensor operable to sense an ice thickness responsive characteristic of the aircraft skin surface, by sensing displacement of the aircraft skin surface responsive to the countering forces; wherein the controller is operable to control the torques in the motor in response to an output of the at least one ice thickness sensor which is indicating the ice thickness responsive characteristic.

According to a further aspect of the invention, the aircraft skin surface includes a leading edge of a wing.

According to an aspect of the invention, there is disclosed an aircraft deicing system, including: (a) a rotatable mass, rotatable about a center of mass of the rotatable mass; (b) at least one displacer rotatably supporting the rotatable mass and connected to an aircraft skin surface at a plurality of connection locations; (c) at least one motor operative ( ) to drive the rotatable mass in rotational motion about the center of mass at variable speeds; and (d) a controller operable to control angular acceleration of the rotatable mass about the center of mass, wherein the angular acceleration of the rotatable mass produce a torque on the aircraft deicing system, the torque being countered by forces applied to the aircraft skin surface at the plurality of connection locations by the at least one displacer at different directions, causing displacement of the aircraft skin surface at at least one of the connection locations.

According to a further aspect of the invention, the displacements of the aircraft skin surface at the at least one connection location cause disengagement of ice from the aircraft skin surface.

According to a further aspect of the invention, the torque is at least 2 Newton·meter.

According to a further aspect of the invention, the angular acceleration produce forces of at least 100 Newton applied to the aircraft skin surface by the at least one displacer.

According to a further aspect of the invention, the acceleration controller is operable to control alternating periodical angular acceleration of the rotatable mass about the center of mass at different directions, wherein the alternating periodical angular acceleration of the rotatable mass produce forces applied to the aircraft skin surface at the plurality of connection locations by the at least one displacer at different directions, causing displacement at different directions of the aircraft skin surface at the at least one connection location.

According to a further aspect of the invention, the acceleration controller is operable to control alternating periodical angular acceleration of the rotatable mass in a rate of at least 20 Hertz.

According to a further aspect of the invention, the alternating periodical angular acceleration causes the rotatable mass to rotate about the center of mass in opposing directions.

According to a further aspect of the invention, the acceleration controller is operable to control alternating periodical angular acceleration of the rotatable mass about the center of mass at a driving frequency, thereby bringing the aircraft skin surface to resonate around the at least one connection location, thereby causing disengagement of ice from the aircraft skin surface According to a further aspect of the invention, the aircraft deicing system further includes at least one ice thickness sensor operable to sense an ice thickness responsive characteristic of the aircraft skin surface, by sensing displacement of the aircraft skin surface responsive to the forces produced by motion of the rotatable mass; wherein the acceleration controller is operable to control the angular acceleration of the rotatable mass in response to an output of the at least one ice thickness sensor which is indicating the ice thickness responsive characteristic.

According to a further aspect of the invention, the aircraft skin surface includes a leading edge of a wing.

According to an aspect of the invention, there is disclosed an aircraft, including: (a) an airframe including aircraft skin surface including a leading edge of the aircraft; (b) a plurality of motors, each of the motors including: a rotor rotatable about a center of mass of the rotor, and a stator rotatably supporting the rotor and connected to the aircraft skin surface by a displacer; and (c) a controller operable to control torques in the motors, the torques in each motor including: a first torque, applied to the rotor, which angularly accelerates the rotor about its center of mass; and a second torque, applied to the stator, which produces countering forces applied by the displacer to the aircraft skin surface at different directions, causing displacement of the aircraft skin surface.

According to a further aspect of the invention, each displacer is connected to the aircraft skin surface at a plurality of connection locations, wherein the second torques in each motors produce the countering forces at the connection locations in which the corresponding displacer is connected to the aircraft skin surface.

According to a further aspect of the invention, the displacements of the aircraft skin surface at the at least one connection location cause disengagement of ice from the aircraft skin surface.

According to a further aspect of the invention, a plurality of second torques in the plurality of motors is at least 2 Newton·meter.

According to a further aspect of the invention, the second torque in each motor out of the plurality of motors produces countering forces of at least 100 Newton applied to the aircraft skin surface.

According to a further aspect of the invention, the controller is operable to control application of the second torque at alternating opposite directions in each one of the motors, thereby producing forces applied to the aircraft skin surface at different directions, causing displacement at different directions of the aircraft skin surface at different locations of the aircraft skin surface.

According to a further aspect of the invention, the controller is operable to control the alternating second torques at a driving frequency, thereby bringing the aircraft skin surface to resonate at different locations, thereby causing disengagement of ice from the aircraft skin surface at the different locations.

According to a further aspect of the invention, the aircraft further includes at least one ice thickness sensor operable to sense an ice thickness responsive characteristic of the aircraft skin surface, by sensing displacement of the aircraft skin surface responsive to the countering forces; wherein the controller is operable to control the torques in at least one motor out of the plurality of motors in response to an output of the at least one ice thickness sensor which is indicating the ice thickness responsive characteristic.

According to a further aspect of the invention, the aircraft skin surface includes a leading edge of a wing.

According to an aspect of the invention, there is disclosed a method for deicing an aircraft skin surface of an aircraft, the method including: (a) increasing torques on a rotor and a stator of a motor in which the rotor is rotatable about a center of mass of the rotor; (b) applying to the aircraft skin surface, by at least one displacer connected between the stator and the aircraft skin surface, forces which counter the torque on the stator, the forces being applied at different directions at a plurality of locations; and (c) displacing the aircraft skin surface by the forces at at least one of the plurality of locations, thereby cause disengagement of ice from the aircraft skin surface at the at least one location.

According to a further aspect of the invention, the method includes angularly accelerating a rotation of the rotor about the center of mass, as a result of the increasing of the torque on the rotor.

According to a further aspect of the invention, the method includes increasing of the torques by increasing electric current in at least one coil of the motor.

According to a further aspect of the invention, the angularly accelerating includes angularly accelerating the rotation of the rotatable mass by a brake.

According to a further aspect of the invention, the increasing includes increasing the torque on the stator to at least 2 Newton·meter.

According to a further aspect of the invention, the applying includes applying forces of at least 100 Newton to the aircraft skin surface.

According to a further aspect of the invention, the increasing includes alternately increasing each of the torques at alternating opposite directions, thereby producing forces applied to the aircraft skin surface at the plurality of locations at different directions, wherein the resulting displacing includes displacing of the aircraft skin surface at the at least one location at different directions at different times.

According to a further aspect of the invention, the alternately increasing of the torques is executed at a rate of at least 40 alternations per second.

According to a further aspect of the invention, the alternating periodical angular acceleration causes the rotatable mass to rotate about the center of mass in opposing directions.

According to a further aspect of the invention, the alternately increasing of the torques is executed at a driving frequency, thereby bringing the aircraft skin surface to resonate around the at least one location, thereby causing disengagement of ice from the aircraft skin surface.

According to a further aspect of the invention, the method further includes sensing an ice thickness responsive characteristic of the aircraft skin surface by sensing displacement of the aircraft skin surface; and wherein the level of increasing is based a result of the sensing.

According to a further aspect of the invention, the aircraft skin surface includes a leading edge of a wing.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 25A and 25B illustrate examples of aircraft deicing systems which includes a plurality of motors, in accordance with examples of the presently disclosed subject matter;

Figure 1:
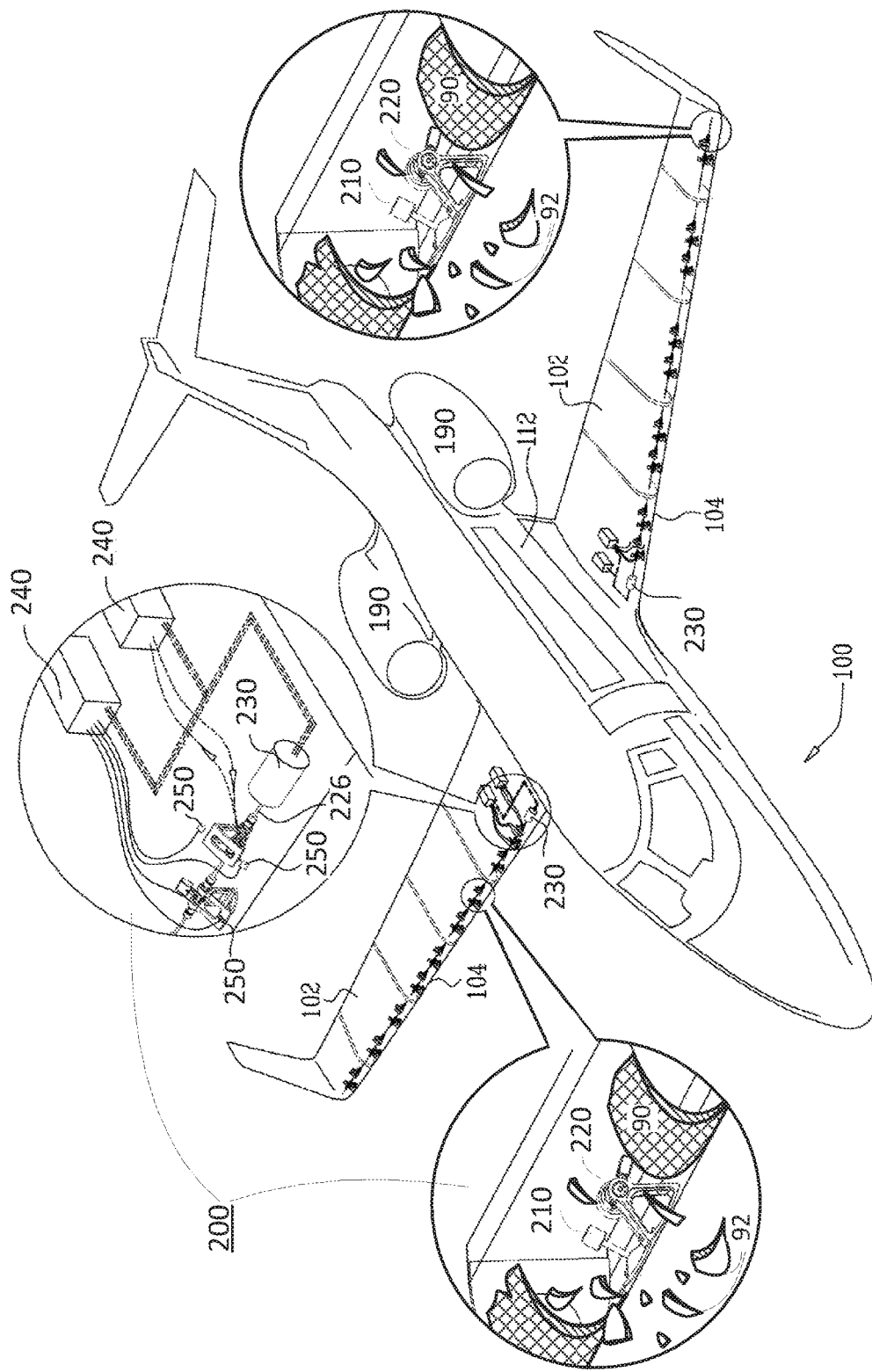
FIG. 1 is a simplified illustration illustrating an example of an aircraft which includes a system for applying deformations to a structural surface of the aircraft, in accordance with the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "calculating", "computing", "determining", "generating", "setting", "configuring", "selecting", "defining", or the like, include action and/or processes of a computer that manipulate and/or transform data into other data, the data represented as physical quantities, e.g. such as electronic quantities, and/or the data representing the physical objects. The terms "computer", "processor", and "controller" should be expansively construed to cover any kind of electronic device with data processing capabilities, including, by way of non-limiting example, a flight computer, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Figure 2:
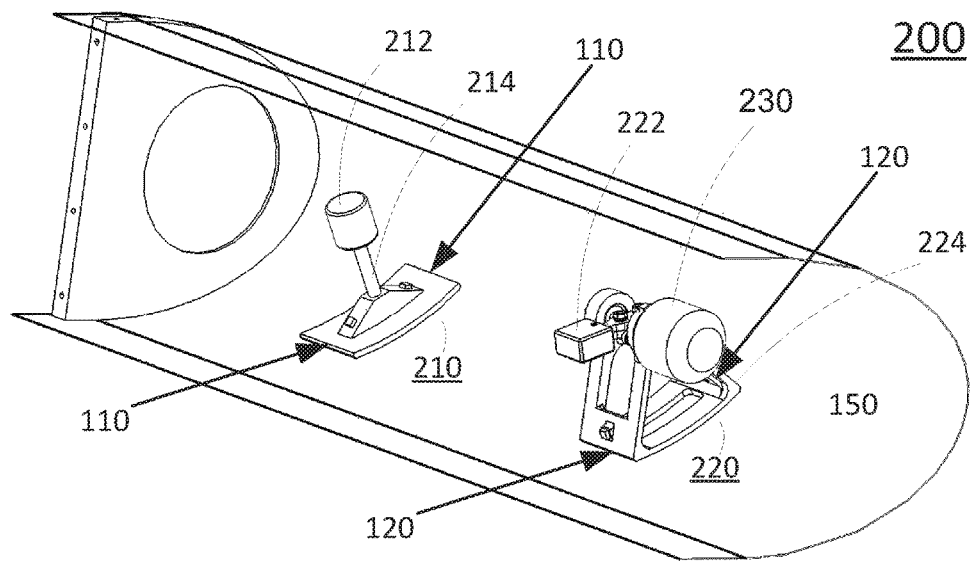
FIGS. 2 and 3 are illustrations of examples of systems for applying deformations to a structural surface, in accordance with the presently disclosed subject matter.

Reference is now made to FIG. 1, which is a simplified illustration illustrating an example of an aircraft 100 which includes a system 200 for applying deformations to a structural surface 150 of aircraft 100, in accordance with the presently disclosed subject matter, and to FIG. 2 which is an illustration of an example of system 200 for applying deformations to a structural surface 150 (also referred to as "surface 150"), in accordance with the presently disclosed subject matter. The deformations of one or more structural surfaces 150 by system 200 may be used for deicing (e.g. as discussed below in greater detail) or for other uses (e.g. modifying a reflection of electromagnetic radiation off the structural surface, e.g. for improving stealth or as an electronic countermeasure).

As seen in FIG. 1, system 200 may optionally be located at an aircraft leading edge, which may be a leading edge of any airfoil section of the aircraft, such as the leading edge of a wing, of a horizontal stabilizer, of a fin, of a vertical stabilizers, of a V-tail, of a helicopter rotor blade, of a propeller, and so on. The leading edges of such airfoil parts have a higher tendency for icing in lower temperatures, and deforming air craft surfaces of the leading edges—or surfaces in its vicinity—may be used for deicing ice collected on such surfaces.

It is noted that system 200 may also be located on non-leading-edge surfaces of the aircraft, e.g. if the deformations of the structural surfaces are used for other reasons, such as for electronic warfare or for other reasons, or in other structural surfaces which on which ice tend to collect. For example, other types of surfaces of aircrafts which may also serve as structural surface 150 are radomes, aircraft fairing antenna, antenna covers, inlets, air intakes, fans, and so on.

The term "aircraft" is well known in the art, and should be interpreted in a non-limiting way to include any flying machine that gain lift from the air around it. More specifically, system 200 may be used to deform structural surfaces of propelled aircraft whose lift is a dynamic lift of an airfoil, such as an airplane, a helicopter, a multirotor helicopter (e.g. a quadcopter), an Unmanned Aerial Vehicle (UAV), a missile, and so on. Other types of aircraft may also be used (such as a nonpropelled glider, a hot-air balloon, a zeppelin, and so on).

It is noted that system 200 may be used for applying deformation to many types of structural surfaces, and not only to structural surfaces of aircrafts, as long as the structural surface is able to transmit vibrations between sufficiently remote locations. The surface (whether aircraft surface or another structural surface) may be made from any such material, such as metals, composite materials, plastics, fiberglass, carbon fibers, and so on.

The term "structural surface" should refer to any surface which is part of a mechanical structure and which is made of rigid material. The structural surface may be an external surface of the mechanical structure (e.g. as exemplified with respect to leading edges of aircrafts), but this is not necessarily so, and the invention may also be applied to internal structural surfaces. It is noted that it is not necessary the structural surface 150 would provide any mechanical support to the structure to which it belong. For example, the structural surface may be a Perspex covering of an opening, which only prevent dust from entering a machinery via the opening.

A non-exhausting list of few example of structural surfaces to which the invention may applied are surfaces belonging to:
  a. Aircraft;
  b. Other types of vehicles (e.g. ships, submarines, trains, trucks, etc.);
  c. Buildings (e.g. windows, walls, doors, infrastructure, and so on of homes, skyscrapers, etc.);
  d. Bridges;
  e. Airborne units such as cameras, pods, coolers, etc.;
  f. Antennas and various poles; and so on.

It is further noted that the structural surface may also belong to a small-scale apparatus, such as any surface of a Microelectromechanical system (MEMS), which are system of small scale (e.g. between 10 micrometers and 10 millimeters) which are usually fabricated on a semiconductor using modified semiconductor device fabrication technologies (e.g. molding and plating, wet etching, dry etching, electro discharge machining, etc.). The structural surface may be used for any functionality of the MEMS, whether mechanical, electric, optical, etc.

System 200 includes at least one actuating unit 220 and at least one passive displacing unit 210. Each actuating unit 220 is distant from the other one or more units (210 and possibly also 220). Each passive displacing unit 210 is distant from the other one or more units (210 and possibly also 220).

All of the one or more passive displacing units 210 are connected to one or more structural surfaces 150. Passive displacing unit 210 is a unit which is operable to move an area of structural surface 150 to which it is connected, by applying mechanical forces on one or more connection locations between the passive displacing unit 320 and the structural surface 150.

Each of the one or more passive displacing units 210 includes a weight 212 and a displacer 214 which supports weight 212. Displacer 214 is mechanically connected to weight 212 (for supporting it), and it is fixed to at least one second location 110 on structural surface 150. As discussed below in greater detail, the one or more passive displacing units 210 of system 200 may be connected to one or structural surfaces 150, or to a plurality of structural surfaces 150.

It is noted that displacer 214 (and/or actuator displacer 224, if implemented) may be implemented as a rigid uniform displacer, made out of a continuous piece of a single rigid matter. For example, displacer 214 (as well as actuator displacer 224) may be made out of any combination of one or more of the following materials: metals, plastics, composite materials, (e.g. fiberglass, carbon fibers, etc.). However, it is also possible to use a displacer 214 which is not made out of a continuous piece of a single rigid matter, e.g. by adding an axis or a bearing between parts of displacer 214 (and/or actuator displacer 224). In the following description a displacer which is a rigid displacer is used as a primary variation, but it is noted that other types of displacers may also be used.

It is noted that weight 212 may include one or more physical parts. For example, weight 212 may consist of a single piece (or lump) of metal, but it may also consist of several pieces of matter, each being independently connected to displacer 214.

System 200 also includes one or more actuating units 220 (also referred to as "driving unit" and as "active displacing unit"). Actuating unit 220 is operable to produce a periodically variable force which is applied to at least one first location 110 of structural surface 150, thereby displacing structural surface 150 in a plurality of directions at the at least one first location 110.

The periodically variable force is a force which changes over a period. The period may be of constant duration (e.g. the duration of each period is 10 milliseconds), but periods of changing durations may also be used (for example, in some actuating mechanism the duration of each period may depend on movement of other components of system 200). Optionally, the periodically variable force may be a sinusoidal variable force (i.e. force whose magnitude change sinusoidally), or a sinusoidal-like variable force. The periodically variable force produced by actuating unit 220 can also have periodically recurring impulses, such as the force produced by actuating unit 220 of FIG. 7.

Actuating unit 220 may receive energy required for producing the periodically variable force from many sources, such as from a motor 230, from a battery (not illustrated), from another system of aircraft 100 (or of another platform on which system 200 may be installed), and so on.

Some of the mechanisms by which actuating unit 220 may produce the periodically variable force are: rotating motor, linear motor, electric and/or electromagnetic mechanisms (e.g. capacitor, coil, magnets, etc.), pressure wave, any type of motor 230, and so on.

Optionally, actuating unit 220 may include at least mass 222 (consisting of one or more pieces), and actuator displacer 224 which fixes the actuating unit to at least one first location 120 on the one or more structural surfaces 150 to which the one or more passive displacing units 210 are connected. It is noted that mass 222 is not necessarily connected directly to actuator displacer 224. For example, in FIG. 16, mass 222 moves along actuator displacer 224, which is a rod connecting two parts of surface 150.

Mass 222 can be moved with respect to structural surface 150 by motor 230. The movement of mass 222 with respect to surface 150 may also be a movement with respect to actuator displacer 224 (e.g. as is the case if mass 222 is an eccentric mass connected to actuator displacer 224 via an axis, as illustrated in FIG. 2). It is noted that the amplitude of the force resulting from the movement of mass 222 (along a given axis) may change in a sinusoidal manner over time, but this is not necessarily so.

It is noted that displacer 214 (and possibly also actuator displacer 224) may be connected (fixed) to the respective one or more structural surfaces 150 in various ways, such as (although not limited to) glue, screws, nails, nuts and bolts, blind bolts, pins, one or more pins passing through a lug of a fitting embedded to the structural surface, etc. The mechanism of connection may be selected to limit the amount of energy which is wasted, and to withstand deliberate vibrations which are applied to the connection by system 200.

With respect to both the one or more second locations 110 (in which displacer 214 is connected to the structural surface 150) and the one or more first locations 120 (in which actuator displacer 224 is connected to the structural surface 150), it is noted that the sizes and the shapes of these locations may vary, depending on various considerations such as structural strength, functionality in transferring movement between the displacing unit and the structural surface, position with respect to the leading edge, and so on. It is noted that a single displacer 214 (and likewise a actuator displacer 224) may be connected to a structural surface 150 in more than one locations, where these locations are separated from each other (e.g. as exemplified in FIGS. 14A, 14B, 15A and 15B).

Figure 14A:
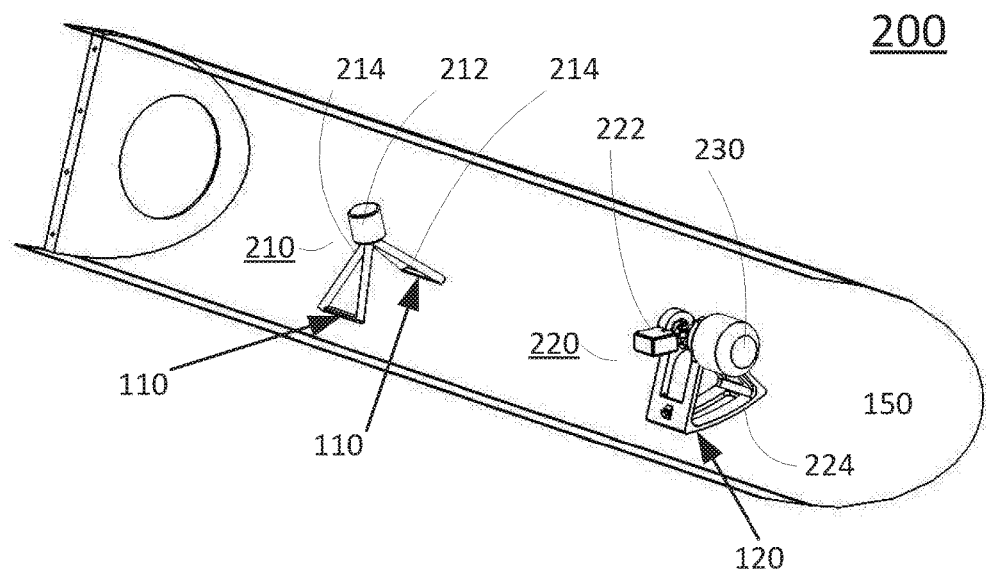
FIGS. 14A, 14B, 15A, 15B, and 16 illustrate examples of a system for applying deformations to a structural surface, in accordance with the presently disclosed subject matter.
Figure 14B:
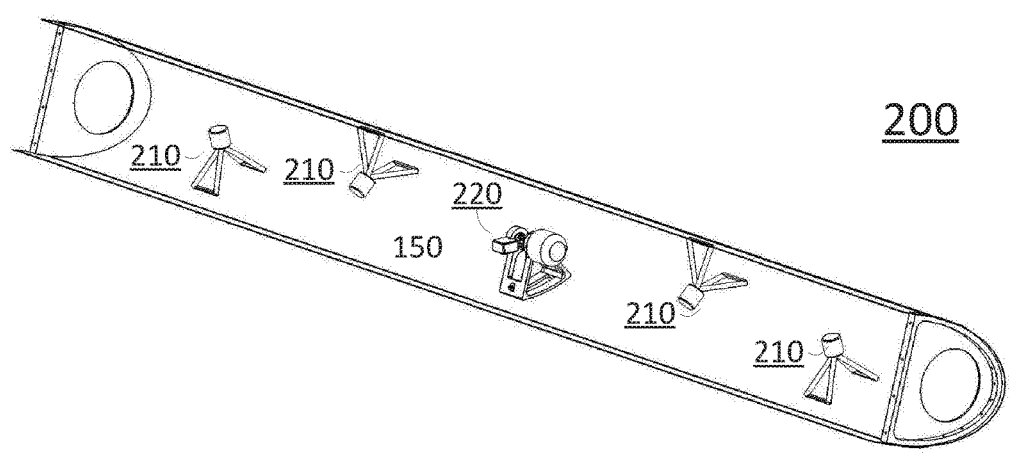
Figure 15A:
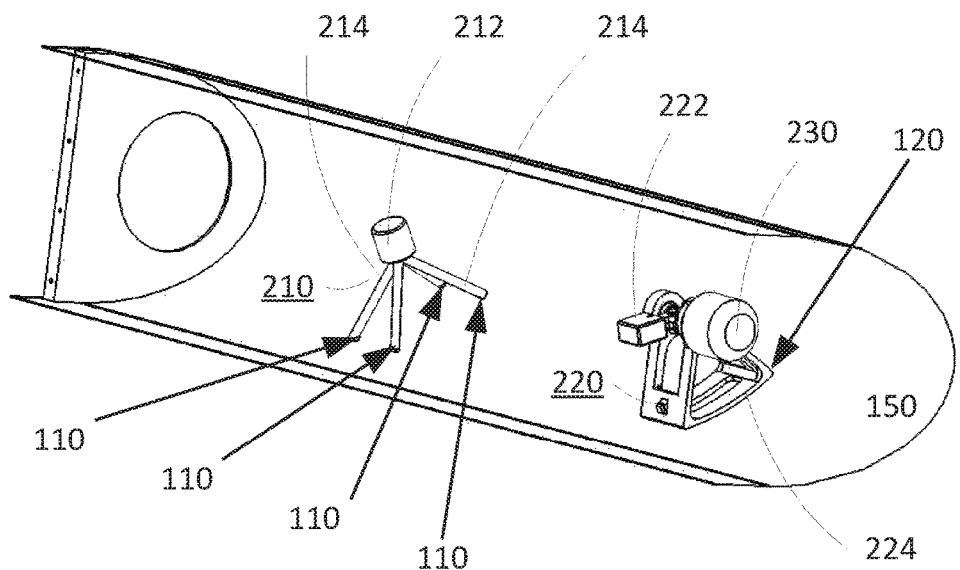
Figure 15B:
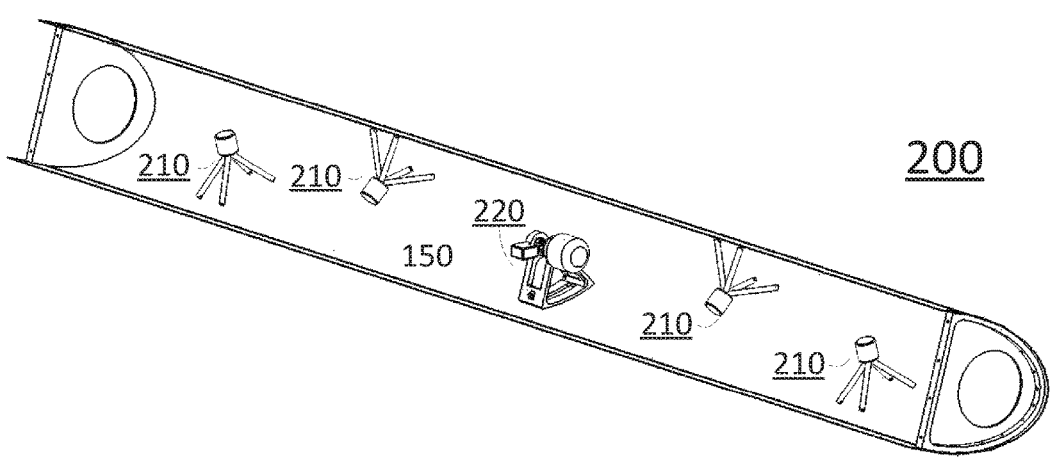

FIGS. 14A, 14B, 15A and 15B illustrate examples of system 200 for applying deformations to a structural surface 150, in accordance with the presently disclosed subject matter. In the examples of FIGS. 14A and 14B, each passive displacing unit 210 is connected to structural surface 150 at two distinct locations, and each of displacers 214 is shaped so that the connection points to surface 150 are located on two parts of the displacer 214. In the examples of FIGS. 15A and 15B, each passive displacing unit 210 is connected to structural surface 150 at four distinct locations, and each of displacers 214 is shaped so that the connection points to surface 150 are located on four parts of the displacer 214.

It is noted that structural surface 150 has a certain degree of flexibility, and therefore the at least one passive displacing unit 210 and the at least one actuating unit 220 are not static with respect to the aircraft to which system 200 is connected (e.g. with respect to a fuselage 112 of the aircraft).

Structural surface 150 is capable of transferring vibrations between the at least one first location 120 and the at least one second location 110, so that the displacing of structural surface 150 at the at least one first location (at least by the periodically variable force produced by actuating unit 220) produces forces which are applied to weight 212 via structural surface 150 and displacer 214, bringing the weight 212 to resonance, thereby displacing structural surface 150 in a plurality of directions at each of the at least one second location 110.

Structural surface 150 is capable of transferring vibrations between the at least one second location 110 and the at least one first location 120. Therefore, mechanical energy may be transferred via structural surface 150 between the at least one second location 110 and the at least one first location 120, and vice versa. Naturally, the degree in which vibrations pass through surface 150 depend on the frequency of vibrations. It is noted that surface 150 is capable of transferring vibrations between the second location(s) and the first location(s) at least at a driving frequency (which is discussed below) and in frequencies around the driving frequency.

In some cases, the degree to which each passive displacing unit 210 may move in any direction with respect to the carrying platform (aircraft, building, etc.) may depend not only on the geometry (of the displacing unit, of the structural surface, and on the connection between them), but also on the internal structure of structural surface 150 (e.g. if made from composite material). It is noted that optionally, parameters of surface 150 may be determined in order to allow transferring of vibrations around the driving frequency. Such parameters may include, for example, material of the structural surface, dimensions (e.g. width), internal structure (e.g. layer structure of composite materials layers), and so on.

System 200 may include mass 222, and motor 230 which is operable to move mass 222 of the actuating unit 220 at a driving frequency, thereby producing forces which are applied to weight 212 (of passive displacing unit 210) via: actuator displacer 224, structural surface 150 and displacer 214, bringing weight 212 to resonance. The resonance of weight 212 results in displacing structural surface 150 in a plurality of directions at each of the at least one second location 110.

That is, the actuating of mass 222 of actuating unit 220 by motor 230, results in bringing into resonance weight 212 of passive displacing unit 210, while the passive displacing unit 210 is remote from actuating unit 220 (e.g. the connection points of each of these units to surface 150—at locations 110 and 120, can be at least 10 cm apart, or more). The bringing of weight 222 to resonance is enabled by structural surface 150, which transfers vibrations from the at least one first location 120 to the at least one second location 110.

Different kinds of motors may be used as motor 230, including all of the motors known in the art to be used on vehicles. For example, motor 230 may be an electric motor, a fluid driven motor (e.g. a pneumatic motor), piezoelectric motor, cam and follower motor, and so on. Motor 230 may be a variable speed motor, but this is not necessarily so.

It is noted that motor 230 may be incorporated into actuating unit 220 (e.g. as illustrated in FIG. 2) and be supported by it, but this is not necessarily so, and motor 230 may also be located elsewhere on structural surface 150, or even in other parts of the aircraft.

Optionally, at least one actuating unit 220 out of the one or more actuating units 220 may be operable to produce the periodically variable force at a driving frequency, thereby producing forces which bring into resonance at the driving frequency weight 212, and a part of the structural surface 150, thereby displacing structural surface 150 in a plurality of directions at each of the at least one second location 220.

Optionally (e.g. in cases where actuating unit 220 is mechanically connected to structural surface 150), at least one actuating unit 220 out of the one or more actuating units 220 may be operable to produce the periodically variable force at the driving frequency, thereby producing forces which bring into resonance weight 212, a part of the structural surface 150, and at least a part of actuating unit 220, thereby displacing the structural surface in a plurality of directions at each of the at least one second location and at each of the at least one first location.

The driving frequency is a frequency in which weight 212 (and possibly other parts of passive displacing unit 210 as well as an area of surface 150 around it) resonate. It is noted that the driving frequency may be the natural resonance frequency of a resonating system which includes weight 212. However, this is not necessarily so, and the driving frequency may be a frequency which is somewhat different than this natural resonance frequency, but still sufficiently close in order for weight 212 to resonate (e.g. having a transfer function value larger than 2).

The term "resonating system" refers to a group of components (or parts thereof) which resonate together which each other, due to forces transmitted between them in a certain timing (phase difference) which Increase the total energy of the resonating system. The resonating system may purely mechanical resonating system (in which the timely forces increase the total Kinetic/Elastic Energy of a system which includes elasticity and mass), but may also may be a system resonating in a combination of mechanical and electric and/or electromagnetic system (e.g. if the actuating system includes a capacitance based inducement).

In the context of system 200, such resonating mechanical system includes also some or all of displacer 214, and the aforementioned resonating area (or areas) of surface 150 around the one or more second locations (and may include other parts of system 200 and/or of the aircraft as well).

The movement of weight 212 in resonance (which is actuated, as described above, by actuating structural surface 150 by actuating unit 220) applies forces via displacer 214 to surface 150 at the at least one second locations in which displacer 214 is connected to surface 150. Those forces cause the displacing structural surface 150 in the plurality of directions at each of the at least one second location 110—thereby applying deformations to structural surface 150. This deformations may be used, for example, for releasing of ice from the structural surface in the environment of the at least one second location 110.

Thus, system 200 utilizes energy which is entered to the system at a first place (the at least one first location 120, by actuating unit 220) for deforming structural surface 150 at another place (around passive displacing unit 210), by bringing another displacing unit (unit 210) to resonance.

In the following description, several ways in which such an arrangement can be further beneficial are disclosed. For example, it is shown that a single actuating unit 210 may be used to bring several passive displacing units 210 to resonance, thereby deforming larger parts of structural surface using the same energy. It is also demonstrated that the actuation by actuating unit 220 may be used to bring into resonance both the one or more passive displacing units 210 and the actuating unit 220 itself.

Figure 3:
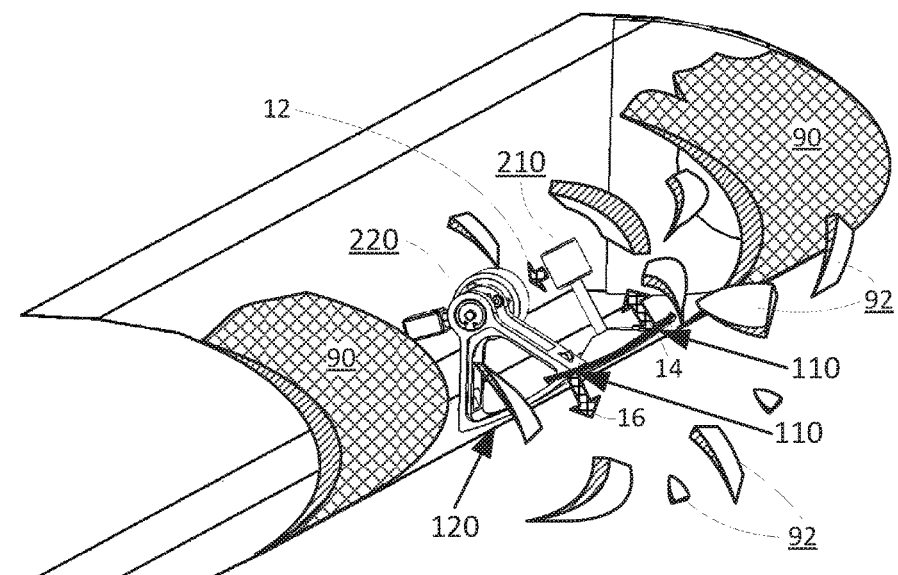

FIG. 3 illustrates an example of system 200, in accordance with the presently disclosed subject matter. As mentioned above, optionally the displacements of structural surface 150 at the at least one second location 110 cause disengagement of ice from structural surface 150 (in conditions of ice accumulation). FIG. 3 illustrates the system of FIG. 2 from a different angle, and also demonstrates ice 90 collected on structural surface 150, and shattered ice 92 which is disengaged from surface 150 as a result from the deformation of surface 150 by system 200.

Arrow 12 indicates a direction of movement of weight 212 at a given moment in time, and arrows 14 and 16 illustrates the forces (and therefor the direction of movement) of different parts of surface 150 at two second locations 110. As can be seen, in the illustrated example, the movements of structural surface 150 by forces transmitted thereto by displacer 214 are in opposing directions (generally inwards at the position of force 14 and generally outwards at the position of force 16). Such forces in opposing directions results in sheer stress and in twisting of structural surface 150, which may facilitate disengagement of ice 90 from surface 150. It is nevertheless that other types of mechanical stresses and forces applied onto the ice 90 by surface 150 (as a result of operation of system 200) may also result in disengagement of ice.

Possibly, system 200 may be designed so that actuating unit 220 (or at least part of it) resonate together with weight 212 (and possibly with other parts of unit 210 as well, such as displacer 214). Resonating together means that those two units can act as coupled oscillators, having a common resonance frequency. Structural surface 150 itself acts as a coupling of this coupled oscillator. Depending at least on the internal structure of structural surface 150 (especially the part between units 210 and 220), surface 150 may act spring-like (where the magnitude of the forces generated by the deformations of surface 150 are proportional to the magnitudes of the displacement from equilibrium), or in another manner (where the forces are not linear to the magnitude, and may also depend on the direction of deformation).

Optionally, in addition to the resonating of weight 212, actuating unit 210 (or parts thereof) may resonate together with weight 212, at the same frequency. For example, optionally, motor 230 is operable to move mass 222 at the driving frequency, thereby producing forces which bring into resonance weight 212, mass 222, and at least a part of structural surface 150. The bringing of all of those components (212, 222, 150, and possibly other components such as 214, 224) into resonance results in displacing structural surface 150 in a plurality of directions at each of the at least one second location 210 and at each of the at least one first location 220.

In such configurations, it is possible to use a single actuating unit 220 (e.g. using a single motor 230) to deform structural surface 150 at locations which are relatively remote from one another. Normally (assuming a fixed width and rigidity structural surface), each of the second locations 210 and the first locations 220 is a center of an area of deformation, having the largest deformation magnitude in its area (being a local maximum of displacement).

It is noted that system 200 (and possibly also structural surface 150) may be designed to determine a relationship between amplitudes of resonance of surface 150 at the different second location(s) 110 and first location(s) 120. The relationship between the amplitudes of resonance at these locations depends on many factors, such as:

a. The distance between the different locations (110 and 120)
b. The distance of units 210 and 220 (e.g. their centers of mass) from surface 150
c. The rigidity of surface 150
d. The weights of the different components of system 200
e. The rigidity of the different components of system 200
f. The shapes of displacer 214 and of actuator displacer 224
g. The number, shapes, sizes and orientations of connections of displacer 214 and actuator displacer 224 to surface 150
h. The locations of units 210 and 220 with respect to surface 150 (e.g. with respect to the leading edge), and so on.

As aforementioned, one of the parameters which may affect the amplitudes of vibration at the at least one second location and the at least one first location is the mass of the displacing units (110 and 120), and the ratio between the two. Optionally, a ratio between an overall mass of the passive displacing unit and an overall mass of the actuating unit in an aircraft airfoil is at least $\frac{1}{3}$ (e.g. between $\frac{1}{3}$ and 3). That is, the overall mass of the passive displacing unit 110 is significant with respect to the overall mass of the actuating unit 120 (at least one third). For example, the actuation unit 220 may weigh 300 grams, and each passive displacing unit 210 may weigh 150 grams (for a 1:2 ratio).

Optionally, when installed in an airfoil of an aircraft (e.g. when surface 150 including a leading edge), the overall mass of each out of one or more passive displacing units 210 is at least 80 grams.

The desired ratio between vibration amplitudes of different locations on structural surface 150 may depend on the use of the deformations of surface 150. For example, in the case of deicing, the amplitudes of deformation may be selected based on the relative thickness of accumulated ice during flight. Optionally, in the resonance state a ratio between (a) an average magnitude of displacement of the at least one second location 110 (average if there is more than one second location 110) and (b) an average magnitude of displacement of the at least one first location is between $\frac{1}{3}$ and 3. That is, the amplitude of vibrations in any of the locations 110 and 120, in such a case, is not more than 3 times larger than the amplitude of vibrations in any other location 110 and 120). It is possible to design system 200 so that the ratio is even lower, and even practically 1 (e.g. between 0.9 and 1.1).

Figure 4A:
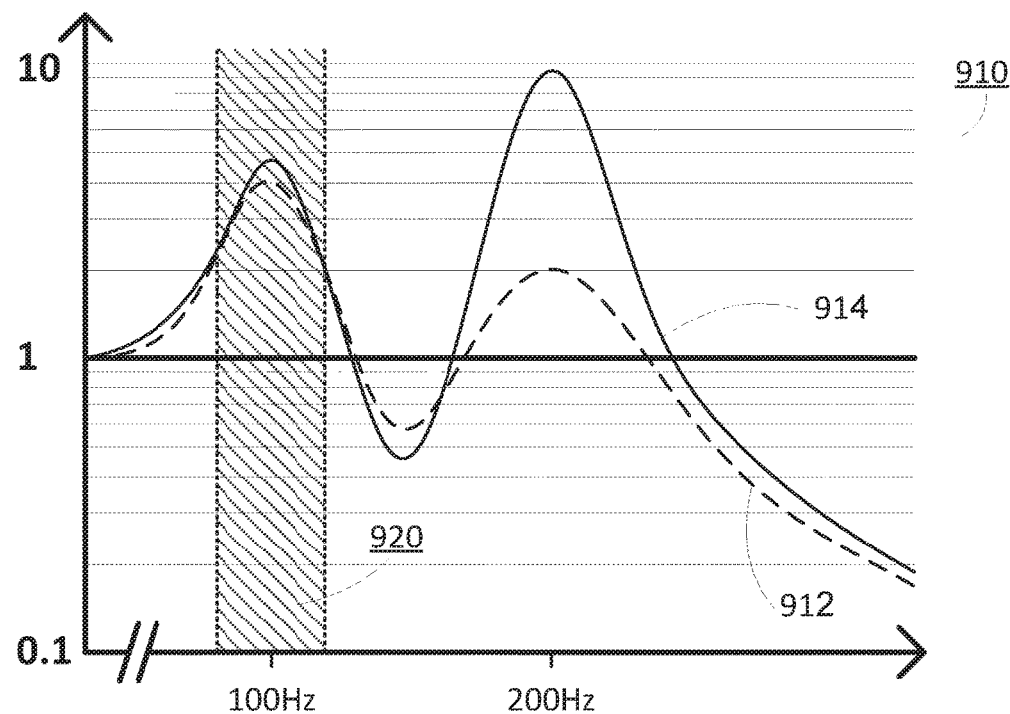
FIGS. 4A and 4B show frequency response graphs of a first location and of a second location of a structural surface, in accordance with the presently disclosed subject matter.

FIG. 4A shows a frequency response graph 910 of a second location 110 and of a first location 120, in accordance with the presently disclosed subject matter. It is noted that graph 910 is a schematic simplified frequency response graph, and it does not accurately represent any actual physical system. The system whose frequency response is illustrated in FIGS. 4A and 4B includes a single passive displacing unit 110 and a single actuating unit 120 which also resonate at the driving frequency.

The frequency response of the second location 110 (in which a passive displacing unit 210 is connected to structural surface 150) is represented by dashed line 912. The frequency response of the first location 120 (e.g. in which a actuating unit 220 is connected to structural surface 150) is represented by dashed line 914.

Both of the frequency response lines (912 and 914) represent the amplitude of movement of structural surface 150 at the specific location (indicated by the ordinate), when force at a specific frequency (indicated by the abscissa) is applied to the system by actuating unit 210 (e.g. by the movement of mass 222, which is moved by motor 230). It is noted that lines 912 and 914 do not represent the mode shape of the system when vibrating in a given frequency without external intervention, but rather the response of different locations on structural surface 150 when force is continuously applied by actuating unit 220.

Figure 4B:
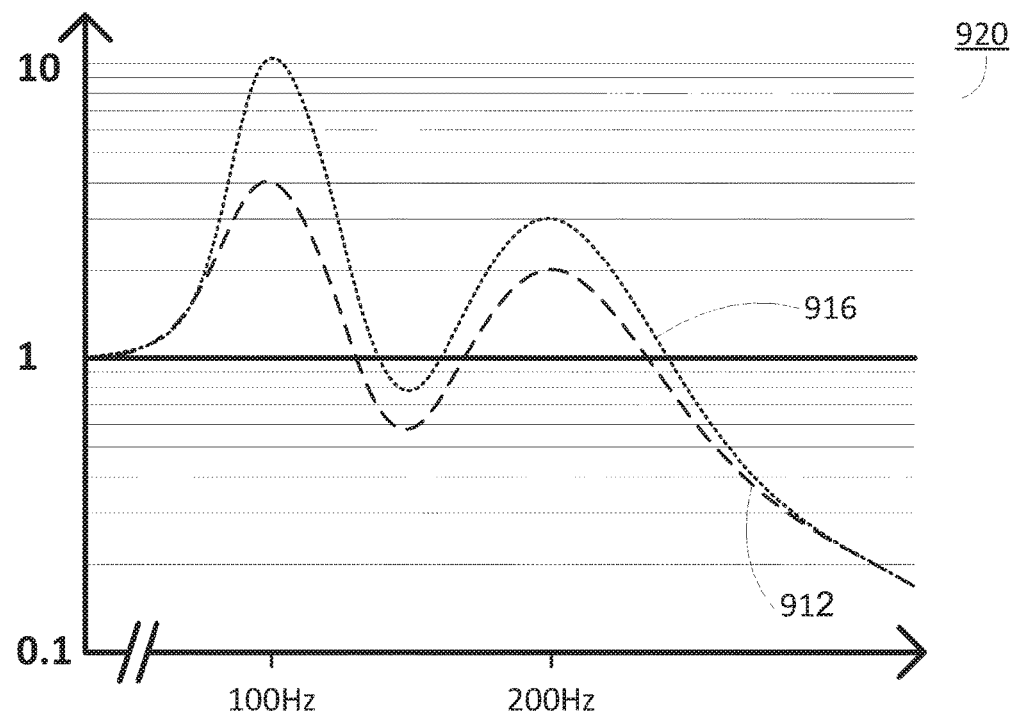

For the sake of comparison, FIG. 4B shows a frequency response graph 920 of the second location 110, in accordance with the presently disclosed subject matter. It is noted that graph 920 is a schematic simplified frequency response graph, and it does not accurately represent any actual physical system. The frequency response of the second location 110 in case force is applied at the first location (as is the case in system 200) is represented by dashed line 912, and the frequency response of the second location 110 in the case force is applied directly on the second location is represented by dotted line 916.

Reverting to FIG. 4A, it is noted that both second location 110 and first location 120 resonate at the same frequencies, which for the sake of example are 100 Hz and 200 Hz. As can be seen, the amplitude of both locations (110 and 120) is similar at the first natural mode of the system (at 100 Hz), at around 5 times more of the regular level (ordinate arbitrary unit 1 indicates no amplification and no damping). As mentioned above, the ratio between the amplitude of the second location and that of the first location is generally determined by parameters which can be selected at the design stage of system 200.

It is noted that system 200 may be designed so that each out of the at least one passive displacing unit 210 resonate in its lower resonance frequency (or a nearby frequency), but this is not necessarily so, and other normal modes may also be ignited. Referring to FIG. 4A, for example, actuating unit 210 may excite weight 212 to resonate at a driving frequency of around 100 Hz (first normal mode), but may alternatively excite weight 212 to resonate at a driving frequency of around 200 Hz (second normal mode).

As aforementioned, the driving frequency is not necessarily exactly the resonance frequency, and nearby frequencies within some range 920 may also be used, range 920 including frequencies in which the gain of the resonating compound exceeds a predetermined gain (e.g. about 2 in the illustrated example). It is nevertheless noted that working in frequencies just above the resonance frequency may be harder to achieve, if frequency is gradually increased actuating unit 210 and/or by motor 230.

FIGS. 5A, 5B, 5C and 5D illustrate examples of system 200 for applying deformations to a structural surface 150, in accordance with the presently disclosed subject matter. As demonstrated in FIGS. 5A, 5B, and 5C, system 200 may include a plurality of passive displacing units 210, all being brought into resonance by a single actuating unit 220. The single actuating unit 220 may also resonate together with the passive displacement units 210 of system 200, but this is not necessarily so.

Figure 5A:
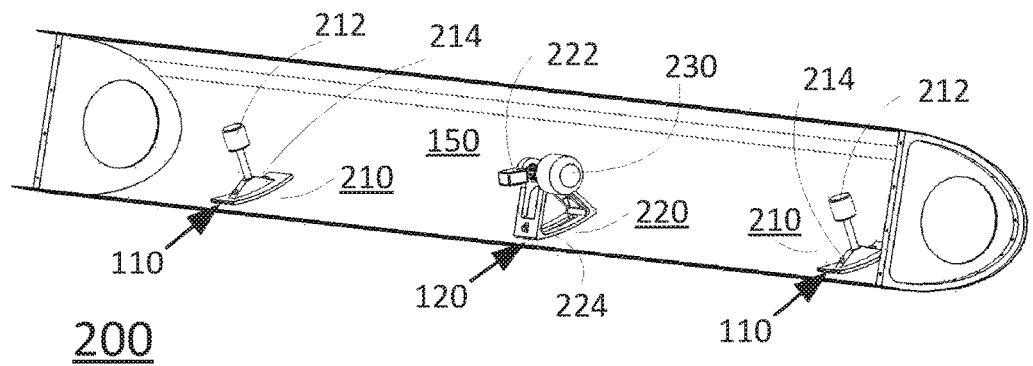
FIGS. 5A, 5B, 5C, 5D, 6A, 6B and 7 illustrate examples of systems for applying deformations to a structural surface, in accordance with the presently disclosed subject matter.
Figure 5B:
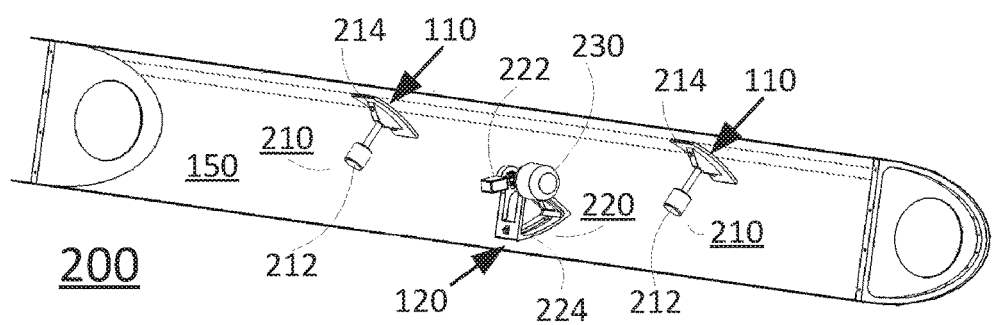
Figure 5C:
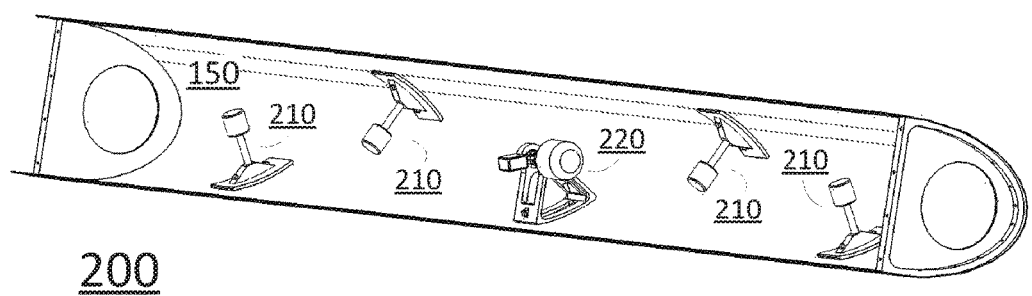

Referring to the example of FIG. 5C, it is noted that if system 200 includes two or more passive displacing units 210 which are excited by a single active displacing unit 220, the distances of the passive displacing units 210 from the actuating unit 220 may be different from each other.

It is noted that system 200 can be designed so that the different passive displacing units 210 which are excited by such a single active displacing unit 220 are not excited concurrently, but rather are excited according to a predetermined excitation order. This may be achieved, for example, by selecting weights 212 of different masses, or which are located at different distances from structural surface 150. Optionally, after actuating unit 210 begins to apply forces which deform surface 150 at the at least one first location 120, the weights 212 of the different passive displacing units 220 excited by that actuating unit 220 may be brought to resonance according to a resonating order. Optionally, the resonating order is such that passive displacing units 210 farther from the driving displacing unit 220 are brought to resonance first, and closer passive displacing units 220 are brought to resonance later. It is nevertheless noted that other orders of excitation may also be planned and used.

Figure 5D:
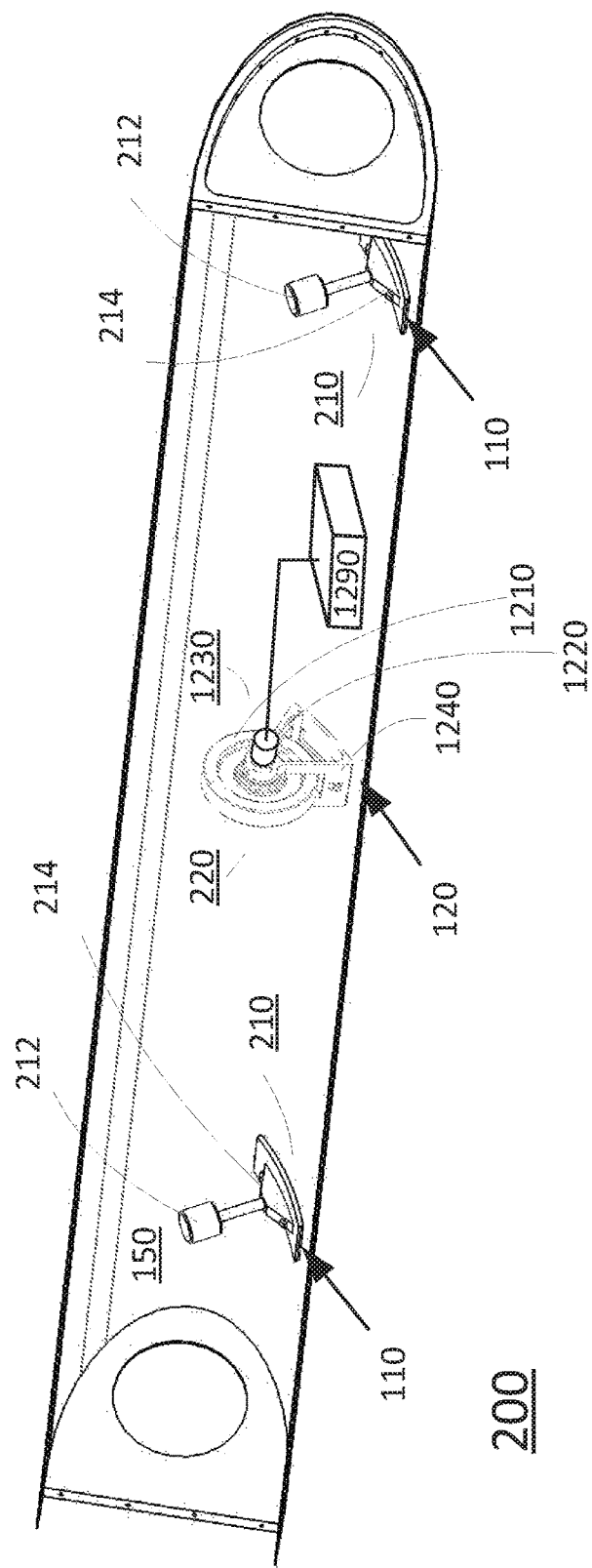

Referring to FIG. 5D, it is noted that system 1200 (discussed in detail with respect to FIGS. 19-26) may serve as active displacing unit 210. According to such an implementation, actuator unit 210 of system 200 includes (as discussed below with respect to system 1200):

a. Motor 1230 (which may serve as motor 230), which in turn includes stator 1220 and rotor 1210. Rotor 1210 is rotatable about a center of mass of the rotor (denoted 1212 in FIG. 23), and stator 1220 rotatably supports rotor 1210. That is, stator 1220 supports rotor 1210, while enabling mass 1210 to rotate about its center of mass.
b. At least one displacer 1240 (serving as displacer 224) which is connected to stator 1220 and to aircraft skin surface 150 at a plurality of connection locations (collectively denoted 120); and
c. Controller 1290 (which may serve as controller 240), which is operable to control torques in motor 1230, including a first torque applied to rotor 1210 and a second torque applied to stator 1220 (the first torque angularly accelerates rotor 1210 about the center of mass and the second torque produces countering forces applied to the aircraft skin surface 150 at the plurality of connection locations by the at least one displacer 1240 at different directions, causing displacement of the aircraft skin surface 150 at at least one of the connection locations).

Additional details on the way system 1200 operates (and therefore, on ways in which it may operate as actuating unit 220 for system 200) are discussed below, especially in relation to FIGS. 20 through 26. Any reference to surface 152 (in any name, e.g. aircraft skin surface 152, etc.) is applicable to surface 150, mutatis mutandis.

Figure 6A:
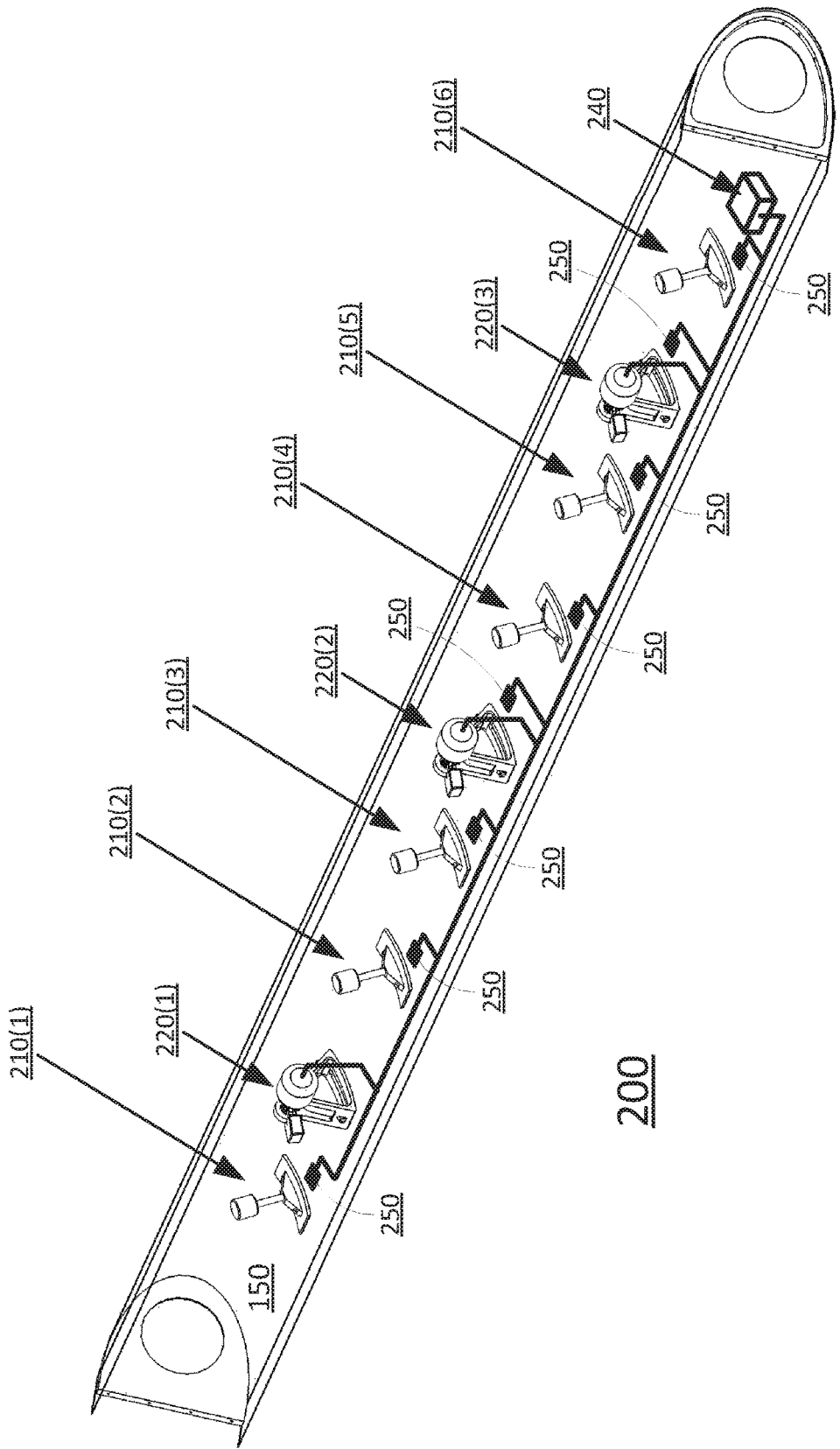
Figure 6B:
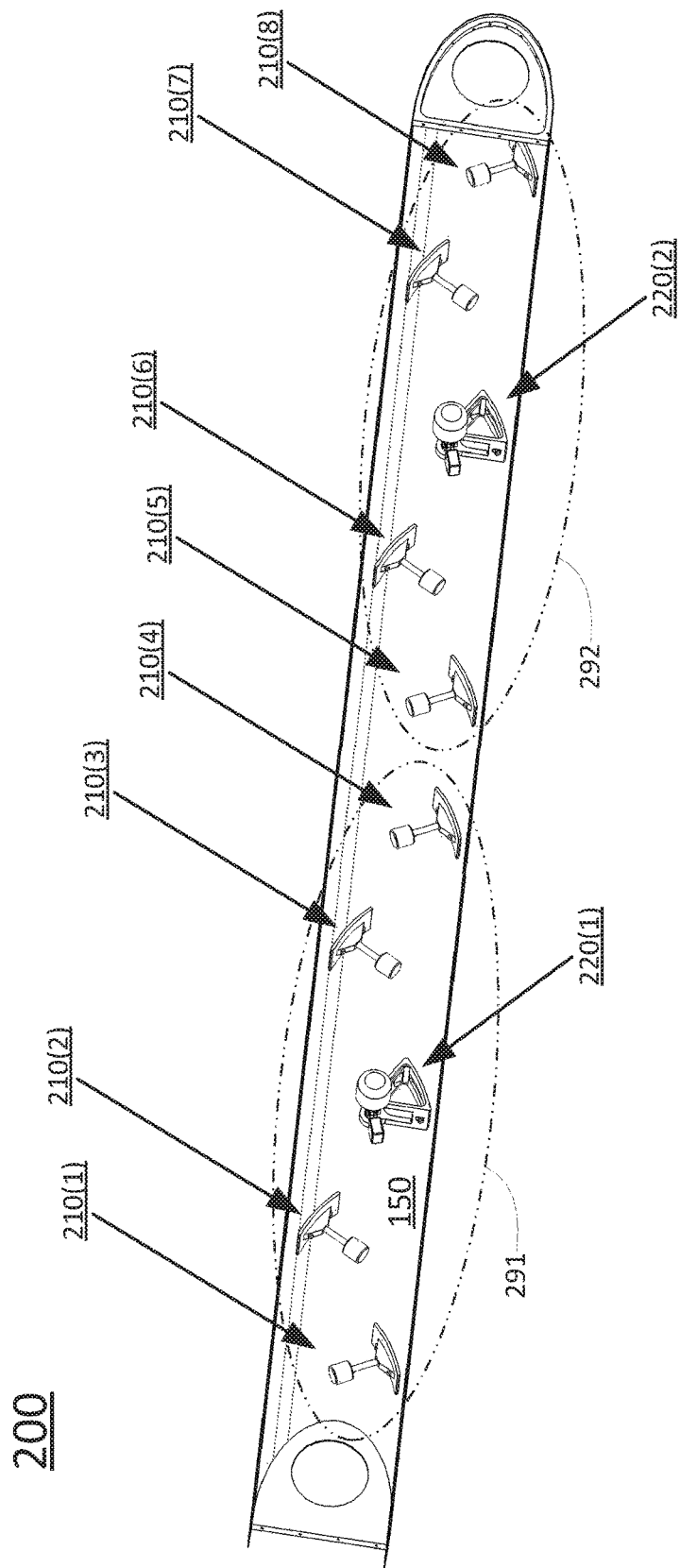

FIGS. 6A and 6B illustrate examples of system 200 for applying deformations to a structural surface 150, in accordance with the presently disclosed subject matter. As demonstrated in FIGS. 6A and 6B, system 200 may include a plurality of actuating units 220, each operable to bring into resonance one or more passive displacing units 210, out of a plurality of passive displacing units 210 of system 200. The actuating units 220 may also resonate together with the one or more passive displacement units 210 it excites, but this is not necessarily so.

With respect to the example of FIG. 6A, actuating unit 220(1) is operable to bring to resonance passive displacing units 210(1) and 220(2), actuating unit 220(2) is operable to bring to resonance passive displacing units 210(3) and 220(4), and actuating unit 220(3) is operable to bring to resonance passive displacing units 210(5) and 220(6). However, the subgroups of passive displacing units 210 excited by the different actuating units 220 may overlap. For example, optionally actuating unit 220(2) may also bring to resonance passive displacing units 220(2) and 220(5). It is noted that the different actuating units 220 of system 200 (if there is more than one) may operate concurrently, partly concurrently or at different times.

With respect to the example of FIG. 6B, actuating unit 220(1) is operable to bring to resonance passive displacing units 210(1) through 220(4) (collectively denoted as group 291), and actuating unit 220(2) is operable to bring to resonance passive displacing units 210(5) through 220(8) (collectively denoted as group 292).

In case system 200 includes more than one passive displacing unit 210 (and one or more actuating units 220), each actuating unit 220 may be designed to excite one passive displacing unit 210, or a group of passive displacing units 210. Optionally, system 200 may include at least twice as many passive displacing units than actuating units. However, the ratio can be even larger (e.g. as exemplified in FIGS. 5C and 6B).

Referring to FIGS. 5B and 5C, it is noted that if system 200 is installed next to a leading edge of the aircraft (e.g. of a wing thereof), the units 210 and 220 may be installed on one side of the leading edge, or on both sides (e.g. as exemplified in FIGS. 5B, 5C and 6B).

One or more actuating units 220 and one or more passive displacing units 210 may optionally be located on the suction surface (e.g. the upper surface of a wing) of the respective airfoil (e.g. the wing), on the pressure surface of the respective airfoil (e.g. the lower surface of the wing), or on both of these surfaces. It is noted that within the scope of the present invention, the suction surface and the pressure surface may both be considered a single structural surface 150, as vibration can be transmitted between those two parts of the airfoil on the surface level thereof.

However, in some cases a single actuating unit 220 apply periodically varying forces to a plurality of structural surfaces 150. In such cases, a single actuating unit 220 may bring to resonance passive displacing units 210 connected to the different structural surfaces 150. For example, a single actuating unit 220 may be connected by one or more displacers 214 to a plurality of structural surfaces 150, and by the moving of its mass 222 by motor 230, such a single actuating unit 220 may bring to resonance passive displacing units 210 connected to the different structural surfaces 150.

Such different structural surfaces 150 are either completely separated from one another, or different parts of the surface of a single platform part (e.g. an aircraft component) which are too remote from each other, and therefore vibration on one structural surface have 150 no (or little) effect on the other one or more structural surfaces 150.

Referring to actuating unit 220, it is noted that the operation of actuating unit 220 may be controlled by a controller 240 of system 200 (e.g. as illustrated in FIG. 6A). Controller 240 may be operable to control various parameters of the operation of actuating unit 220, such as: turn on times, turn off times, activation level, operational frequency, direction of movement, activation profiles, programs, or schemes, and so on.

Referring to motor 230, it is noted that the operation of motor 230 may be controlled by a controller 240 of system 200 (e.g. as illustrated in FIG. 6A). Controller 240 may be operable to control various parameters of the operation of motor 230, such as: turn on times, turn off times, activation level, operational frequency, direction of movement, activation profiles, programs, or schemes, and so on. The following discussion which pertains to controller 240, it is noted that controller 240 may control actuating unit 220 and/or motor 230 (if implemented), which may or may not be a part of actuating unit 220.

Controller 240 may be a dedicated hardware controller, a part of a general hardware processor, and may also be implemented as general purpose processor running a dedicated software. Controller 240 may base its controlling on many kinds of sources, such as: preprogramed data, data collected by sensors of system 200 (if any), data transmitted from other aircraft systems, commands of the pilot (or another member of the flight crew), feedback mechanisms of system 200 (if any), and so on.

System 200 may further include one or more sensors 250 (e.g. as illustrated in FIG. 6A). Such one or more sensors 250 may be used to collect information which can later be used by controller 240. For example, sensor(s) 250 may be used to determine system parameters, structural surface parameters, aircraft parameters, atmospheric parameters and/or ice parameters.

For example, system 200 may include one or more sensors 250 operable to sense at least one icing parameter (a parameter which is indicative of icing condition on structural surface 150). Controller 240 in such case is operable to control an operation of actuating unit 210 and/or of motor 230 based at least one the icing parameter. The icing parameter may be useful, for example, for detecting presence of ice on surface 250, for detecting thickness of the ice, for detecting removal of ice by the operation of system 200, and so on. Some of the types of sensors 250 which may be used are strain gauge, current gauge, acceleration gauge, and so on.

Optionally, system 200 may include at least one sensor 250 which is an ice thickness sensor (e.g. employing at least one of an acceleration sensor and a strain gauge) for sensing an ice thickness responsive characteristic of structural surface 150, e.g. by sensing displacement of structural surface 150 responsive to the forces produced by the system. Controller 240 in such case is operable to control an operation of actuating unit 210 and/or of motor 230 based on an output of the at least one ice thickness sensor. An example of control logic which may be employed by controller 240 is described hereinbelow with reference to FIG. 10.

Optionally, sensor 250 may be an acceleration sensor, such as model NMA 1213D acceleration sensors commercially available from Freescale Semiconductors Inc., 6501 William Cannon Drive West, Austin, Tex. 78735, USA; which is mounted on a surface of actuator displacer 224 on the wing of the aircraft in order to serve as ice presence sensors, as is described hereinbelow. Such an acceleration sensors may be arranged to lie perpendicular to the surface of the leading edge.

Optionally, sensor 250 may be a strain gauge (e.g. strain gauge 062AP commercially available from Vishay Intertechnology Inc., 63 Lancaster Ave., Malvern Pa. 19355, USA). Such a strain gauge may be mounted, for example, onto the curved interior surface of the leading edge. Control logic which may be employed by controller 240 based on information received from a strain gauge is described hereinbelow with reference to FIG. 11.

Referring to actuating unit 220, it is noted that different kinds of mechanisms of movable mass may be used in order to generate vibrations in system 200 (which ultimately bring at least the passive displacing unit(s) 210 to resonance). In the examples of FIGS. 2, 3, 5A, 5B, 5C, 6A and 6B, actuating unit 220 includes an eccentric mass 222 which is rotatable about a shaft, using the power of motor 230.

Figure 7:
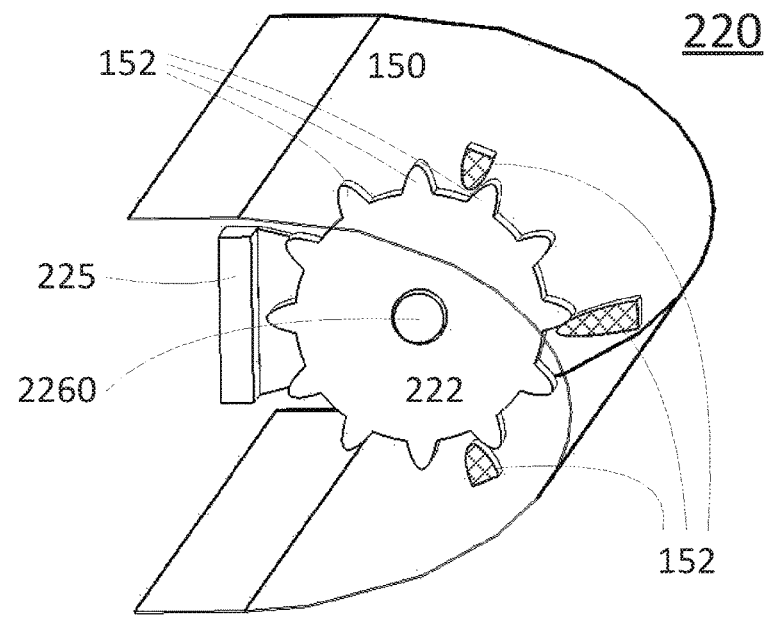

FIG. 7 illustrates an example of system 200, in accordance with the presently disclosed subject matter. In the example of system FIG. 7, actuating unit 220 includes a rotating mass 222 having an irregular shape about a central point (i.e. not all points on the circumference of the rotating mass are at the same distance from the rotation axis, e.g. a circle having one or more protrusions 2220). In the illustrated example, mass 222 is a cogwheel having a plurality of cogs 2220.

Because of the different distance from the rotation axis 2260, some parts of mass 222 hit surface 150 (or protrusions 152 on that surface) at different times, thereby applying force onto the location of impact. As can be seen, the movable mass 222 in this example is not fixed to surface 150, but rather to another point on the carrying structure, by support 225. Another example which does not necessitate protrusions 152 on the surface 150 is described in U.S. Pat. No. 2,271,466 entitled "Wing deicer", by L. C. Schmidt and W. J. Schmidt.

Reverting to the example of the eccentric mass (an example of which is described at length at U.S. Pat. No. 8,517,313 entitled "Mechanical vibration deicing system", by the same inventor. A detailed description of such a displacement unit is provided throughout the U.S. Pat. No. 8,517,313 patent.

Figure 8:
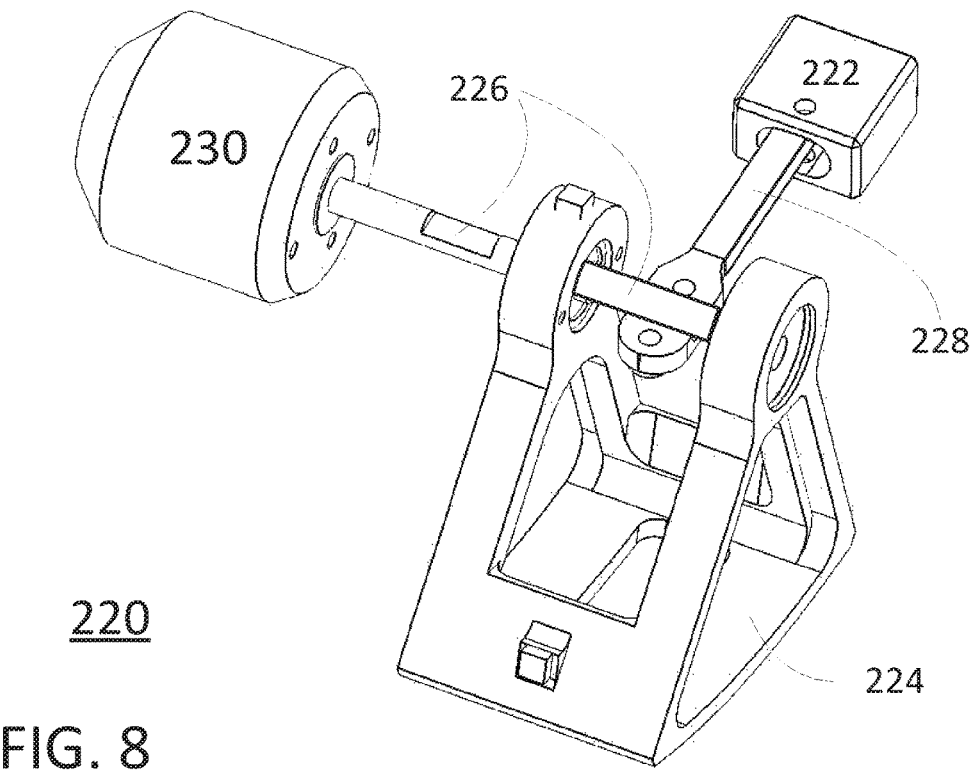
FIG. 8 illustrates an example of an actuating unit, in accordance with the presently disclosed subject matter.

FIG. 8 illustrates an example of actuating unit 220, in accordance with the presently disclosed subject matter. Optionally, actuating unit 220 may include at least one displacer 224 (also referred to as "actuator displacer", to differentiate it from displacer 214 of the passive displacing unit 210). Actuator displacer 224 of FIG. 8 is fixed to the at least one first location 120 (not illustrated in FIG. 8, demonstrated in FIG. 2), and it rotatably supports shaft 226 about which mass 222 (being an eccentric mass in this case) moves in rotational motion.

The rotational movement of mass 222 about shaft 226 produces inertial forces which are applied via shaft 226 to the at least one actuator displacer 224, causing the at least one actuator displacer 224 to displace structural surface 150 in a plurality of directions at each of the at least one first location 120, the plurality of directions corresponding to changing positions of the eccentric mass (mass 222) as it moves in rotational motion about shaft 226.

Mass 222 (operating as an eccentric drive mass) may be fixedly mounted to elongate drive shaft portion 228 for rotation together with drive shaft portion 228 about an axis (which is usually concentric with a center of shaft 226).

Figure 9A:
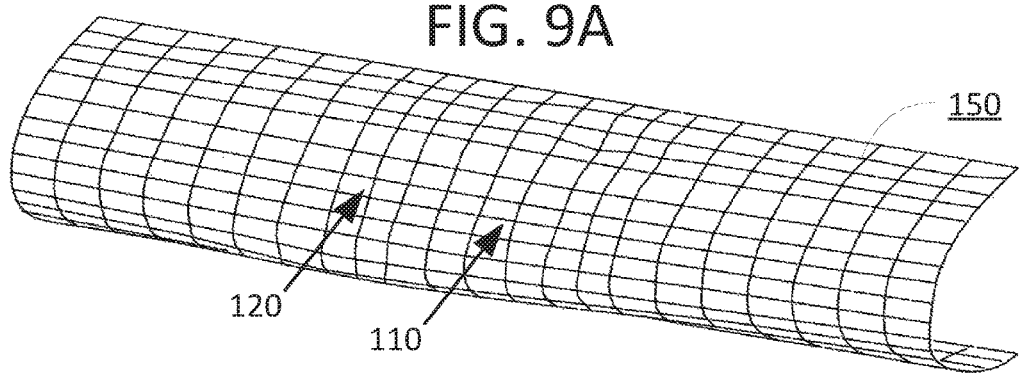
FIGS. 9A through 9D show, in an exaggerated manner, deformation of the leading edge of a structural surface in different phases of the vibration of an actuating unit and a passive displacing unit, in accordance with the presently disclosed subject matter.
Figure 9B:
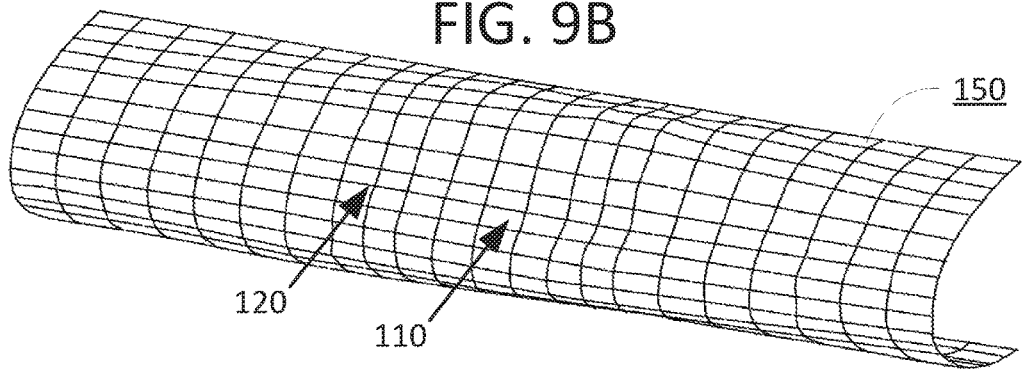
Figure 9C:
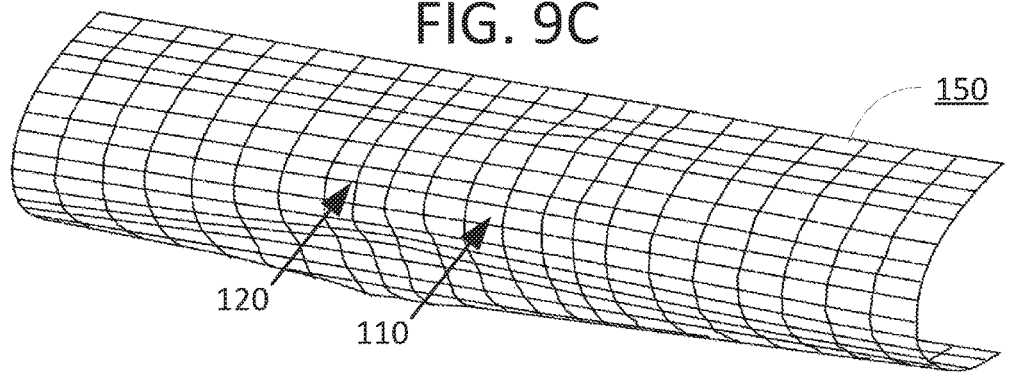
Figure 9D:
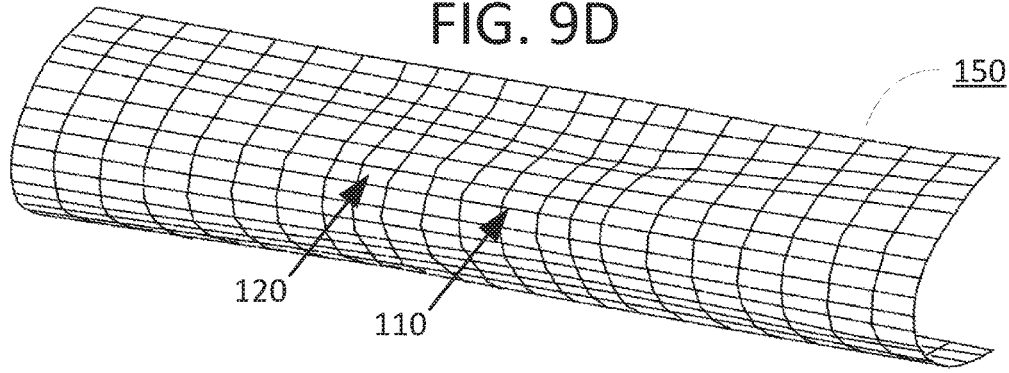

FIGS. 9A through 9D show, in an exaggerated manner, deformation of the leading edge of surface 150 in different phases of the vibration of passive displacing unit 210 and actuating unit 220, in accordance with the presently disclosed subject matter. FIG. 9A demonstrate the deformation at phase 0, FIG. 9B demonstrate the deformation at phase π/2 (or 90°), FIG. 9C demonstrate the deformation at phase π (or 180°) and FIG. 9D demonstrate the deformation at phase 3π/2 (or 270°). The extent of exaggeration is estimated to be a factor of 40.

Figure 10:
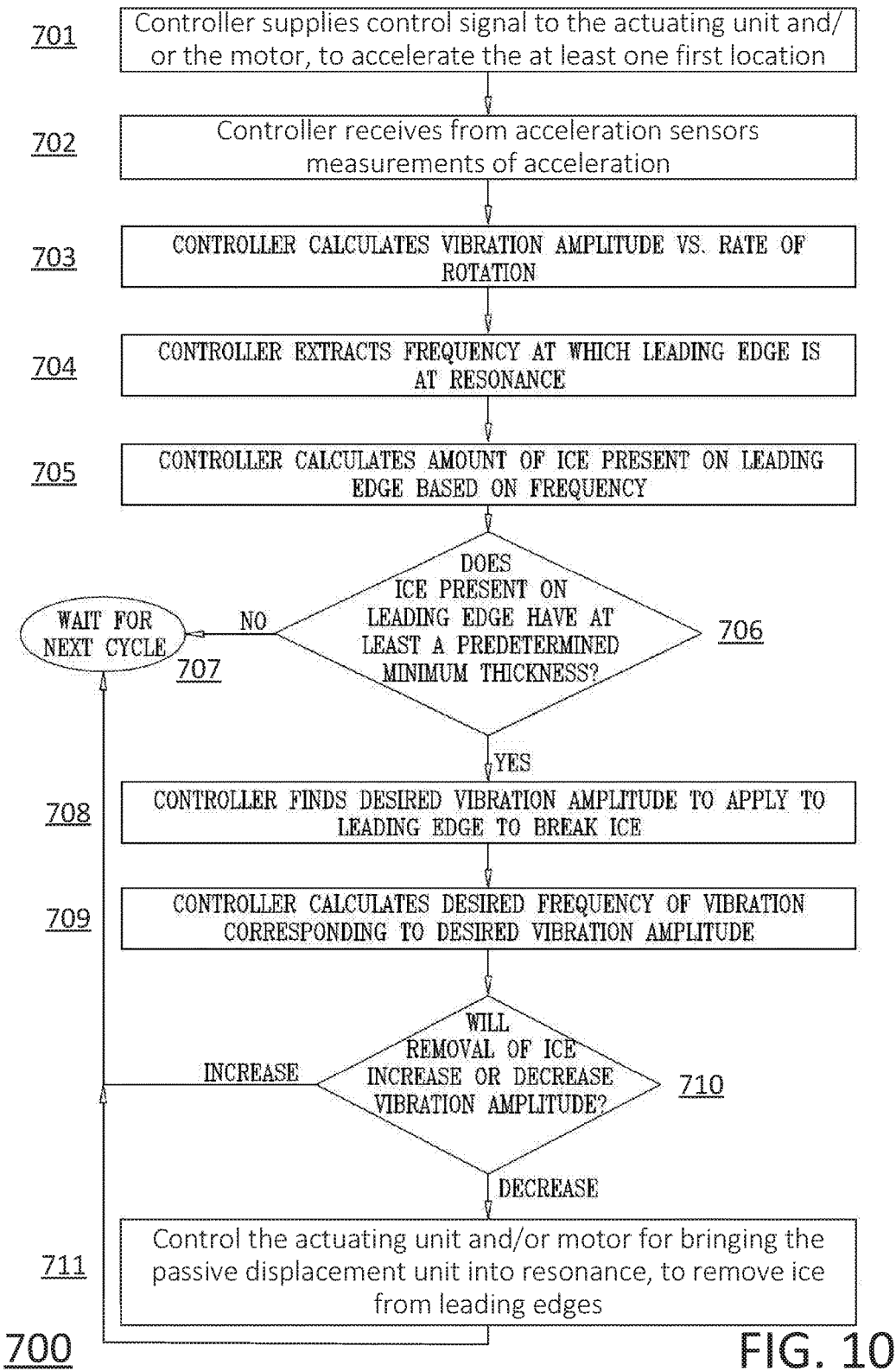
FIGS. 10 and 11 are simplified flow charts illustrating methods for controlling a deicing system, in accordance with the presently disclosed subject matter.

FIG. 10 is a simplified flow chart illustrating method 700 for controlling system 200, in accordance with the presently disclosed subject matter. Referring to the examples set forth with respect to the previous drawings, method 700 may be executed by system 200, and especially by controller 240. Method 700 is exemplified in FIG. 11 in relation to a structural surface which is a leading edge of an aircraft surface, but it is noted that method 700 may also be applied for removing ice from other types of structural surfaces. Method 700 includes at least stages 701, 702, 703, 704, 705, 706, 707, 708, 709, 710, and 711. Method 700 may also include additional stages.

As seen in FIG. 10, controller 240 may provide a control signal to actuation unit 220 and/or to motor 230, causing actuation unit 220 and/or motor 230 to accelerate from rest to a an operational frequency (e.g. 500 Hz or 500 revolutions/second). Acceleration sensors 250 measure acceleration of surface 150 (directly or indirectly, by measuring displacer 214), and provide corresponding output indications to controller 240.

Figure 12:
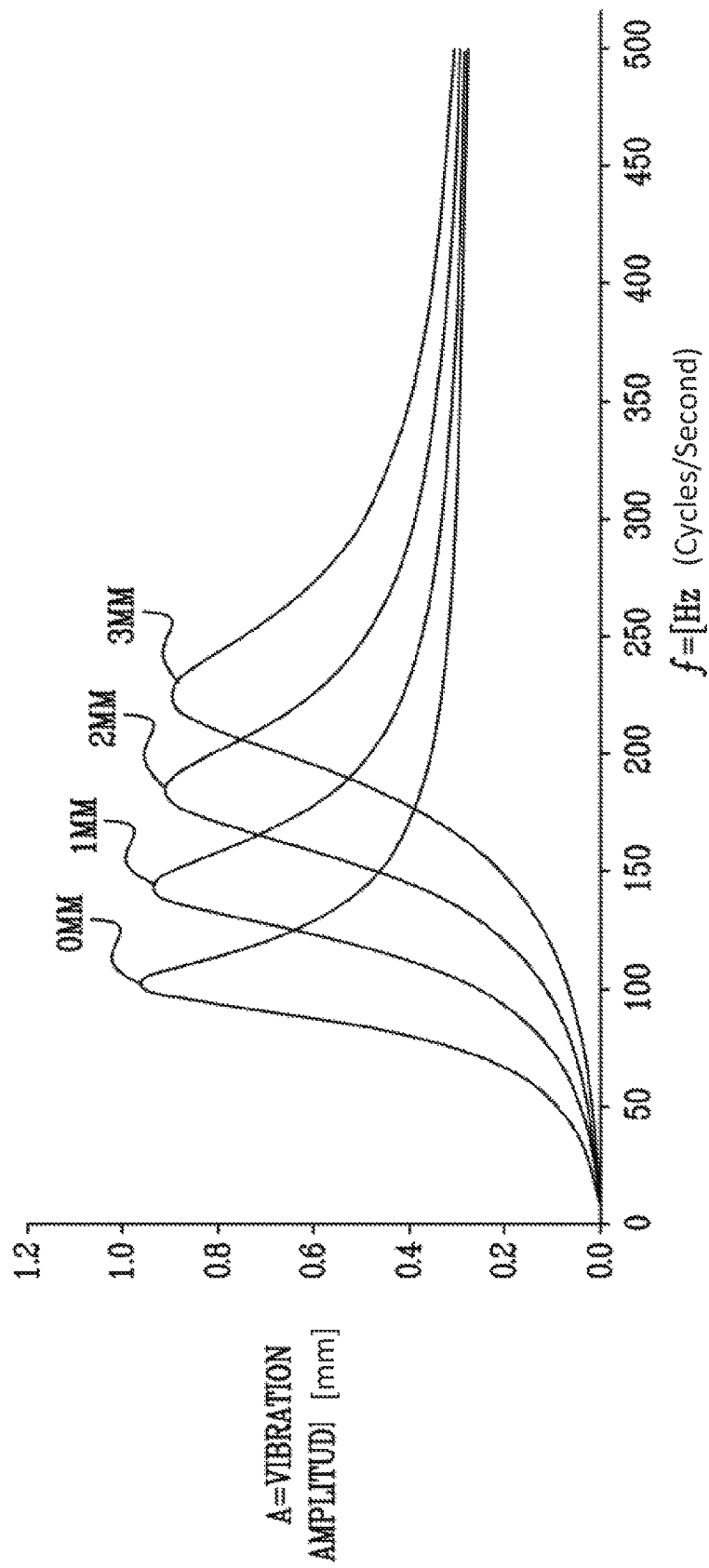
FIG. 12 illustrates examples of empirically derived frequency response curves for various thicknesses of ice on the leading edge.

Controller 240 calculates vibration amplitude vs. rate of activation (e.g. rate of rotation of motor 230), which represents the frequency response of the leading edge, at which the sensor 250 is located. FIG. 12 illustrates examples of empirically derived frequency response curves for various thicknesses of ice on the leading edge. Alongside each frequency response curve of FIG. 12 is an indication, as an example, of the ice thickness represented thereby.

Controller 240 extracts the frequency at which the leading edge is at resonance and, based on this frequency, calculates the amount of ice 90 present on the leading edge. Additionally, based on prior calibration, controller 240 makes a determination as to whether the ice 90 present on the leading edge has at least a predetermined minimum thickness (e.g. 2 mm). If so, controller 240 then determines (e.g. based on a look-up table) a vibration amplitude that should be applied to the leading edge to break the ice 90 for the thickness of ice 90 present on the leading edge.

Prior to operating actuating unit 220 and/or motor 230, controller 240 calculates the desired frequency of vibration corresponding to the desired vibration amplitude and makes a determination of whether, once the ice 90 is removed, the vibration amplitude will increase or decrease.

Optionally, only if at the desired frequency of vibration corresponding to the desired vibration amplitude, the vibration amplitude will decrease once the ice is removed, actuation unit 220 and/or motor 230 is operated to drive structural surface 150 at the at least one second location 110 (and possibly also at the at least one first location 120) to remove the ice from the leading edges. Otherwise, the thickness of the ice 90 will be allowed to increase until, at the desired frequency of vibration corresponding to the desired vibration amplitude, the vibration amplitude will decrease once the ice is removed. Alternatively other operational techniques for preventing undesired increase in vibration amplitude of the structural surface following ice disengagement therefrom may be employed.

The functionality of FIG. 10 may take place intermittently at predetermined intervals, e.g. 10 minutes. The operation of actuation unit 220 and/or motor 230 may optionally take place upon each actuation for a predetermined number of revolutions, e.g. 100 revolutions. Alternatively, the cycle of operation described hereinabove is repeated intermittently at intervals which depend on the altitude and flying conditions of the aircraft. Additionally or alternatively, the cycle of operation described hereinabove is repeated intermittently at intervals which depend on the thickness of the ice 90 present on the leading edge.

If the functionality of FIG. 11, described hereinbelow, is employed, that part of the functionality of FIG. 10 which calculates the amount of ice present on the leading edge based on frequency may optionally not be employed. The remainder of the functionality of FIG. 10 operates when the functionality of FIG. 11 indicates the presence of at least a predetermined thickness of ice 90 on the leading edge.

Figure 11:
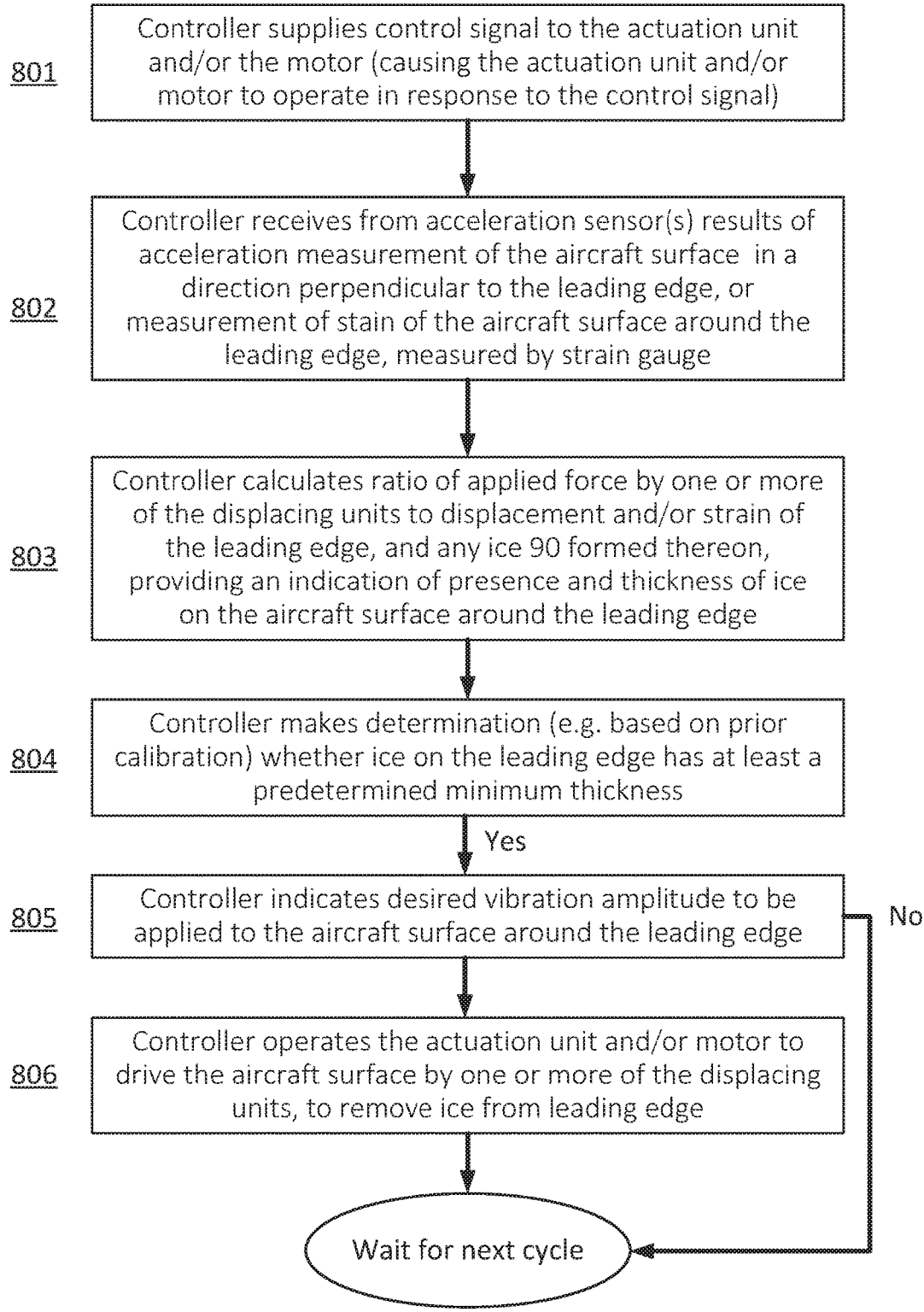

FIG. 11 is a simplified flow chart illustrating method 800 for controlling system 200, in accordance with the presently disclosed subject matter. Referring to the examples set forth with respect to the previous drawings, method 700 may be executed by system 200, and especially by controller 240. Method 800 is exemplified in FIG. 11 in relation to a structural surface which is a leading edge of an aircraft surface, but it is noted that method 800 may also be applied for removing ice from other types of structural surfaces. Method 800 includes at least stages 801, 802, 803, 804, 805, and 806. Method 800 may also include additional stages.

The controlling method 800 of FIG. 11 is based on information collected by acceleration sensors and/or strain gauges. As seen in FIG. 11, a control signal may be supplied by controller 240 to actuation unit 220 and/or motor 230, causing the actuation unit 220 and/or motor 230 to operate in operational speed (e.g. 60 Hz, or 60 revolutions/second). Acceleration sensors measure acceleration of the leading edge in a direction perpendicular thereto and/or strain gauges measure the strain of the leading edge and provide corresponding output indications to controller 240.

Controller 240 calculates ratio of the force applied by one or more of the displacing units (210 and optionally also 210) to the displacement of the leading edge and any ice formed thereon, which represents the stiffness of the leading edge adjacent to where the acceleration sensors and/or strain gauges are located, together with any ice 90 formed in that area. This provides an indication of the presence and thickness of ice 90 on the leading edge.

Additionally controller 240 makes a determination (e.g. based on prior calibration) as to whether the ice 90 present on the leading edge has at least a predetermined minimum thickness (e.g. 2 mm) If so, controller 240, as described hereinabove with reference to FIG. 10, then indicates a desired vibration amplitude that should be applied to the leading edge to remove the ice 90.

The functionality of method 800 may takes place intermittently at predetermined intervals (e.g. every 1-10 minutes). Alternatively, the cycle of operation described hereinabove may be repeated intermittently at intervals which depend on the altitude and flying conditions of the aircraft.

Additionally or alternatively, the cycle of operation described hereinabove may be repeated intermittently at intervals which depend on the thickness of the ice 90 present on the leading edge.

FIG. 12 illustrates examples of frequency response curves for various thicknesses of ice on structural surface 150 (e.g. on a leading edge of a wing), in accordance with examples of the presently disclosed subject matter. Alongside each frequency response curve of FIG. 12 is an indication, as an example, of the ice thickness represented thereby. Ways for utilizing the different frequency response behaviors (and especially the different resonance frequency) when different thickness of ice is accumulated on structural surface 150 are exemplified above with respect to methods 700 and 800.

Figure 13:
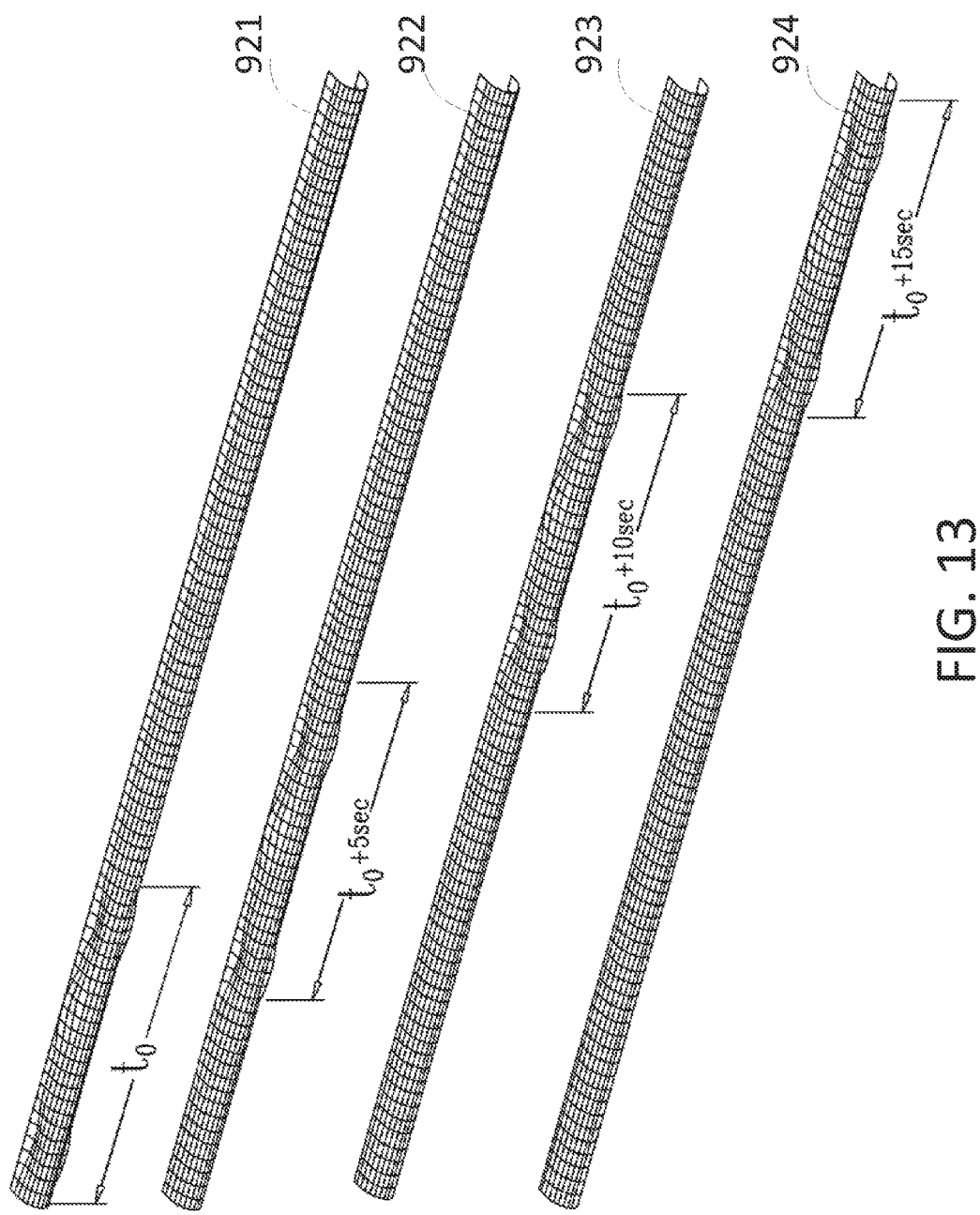
FIG. 13 show, in exaggerated form, deformation of a structural surface responsive to synchronized operation of multiple separate actuating units, in accordance with the presently disclosed subject matter.

Reverting to the examples of FIGS. 6A and 6B, it is noted that system 200 may include a plurality of actuating units 220 (which may optionally be motorized by one or more motors 230). As mentioned above, the different actuating units 220 of system 200 in such case may operate concurrently, partly concurrently or at different times. Optionally, the different actuating units 220 may be activated sequentially, one after the other, FIG. 13 provides simplified illustrations, in exaggerated form, of deformation of a structural surface 150 responsive to synchronized operation of multiple separate actuating units 220, in accordance with the presently disclosed subject matter.

Multiple actuating units 220 (e.g. driven by a corresponding number of motors 230) may be operated in a predetermined sequence, typically at synchronized time intervals, to provide deformation of structural surface 150. This may be used, for example, for disengagement of ice from structural surface 150. In the illustrated embodiment seen in FIG. 13, the predetermined sequence produces displacement of structural surface 150 which proceeds along the surface (substantially parallel to the leading edge) in a wavelike progression. The different diagrams 921, 922, 923 and 924 represent successive points in time, in one such sequence of activation. It is noted that the activation of each of the actuating units 220 in the sequence results in bringing to resonance of one or more passive displacing units 210 which are associated by the respective actuating unit 220.

It is appreciated that the operation of the multiple actuating units 220 (and/or of the multiple motors 230, if any) may be controlled by a centralized controller 240 to provide the predetermined sequence. Additionally or alternatively, each of the multiple actuating units 220 (and/or of the multiple motors 230, if any) may have an associated controller 240, where the multiple controllers 240 are in communication with one another or in communication with a centralized controller 240.

As mentioned above, one of the parameters which affects the relationship between the amplitudes of resonance at the at least one second location 110 and the at least one first location 120—is the distance of weight 212 and/or of weight 222 (if any) from structural surface 150. Another parameter which may affect these relationship is the distance of weight 212 and/or of weight 222 (if any) from other components of the respective displacing unit (e.g. the distance of mass 222 from shaft 226, in the example of FIG. 8). Such distances may also affect other system parameters such as resonance frequency, the amount of energy required to excite resonance, and so on.

Optionally, system 200 may include a mechanism for changing a distance between weight 212 and surface 150; optionally, system 200 may include a mechanism for changing a distance between weight 212 and another component of passive displacing unit 210; optionally, system 200 may include a mechanism for changing a distance between mass 222 and surface 150; optionally, system 200 may include a mechanism for changing a distance between mass 222 and another component of actuating unit 220.

The options of the previous paragraph provide additional degree(s) of freedom in controlling the operation of the deicing system of the present invention. When mass 222 (or weight 212) is relatively close to structural surface 150, it applies relatively little force. As mass 222 (or weight 212) is positioned further from surface 150, the movement thereof produces corresponding greater force. Thus by controlling the proximity of mass 222 (or weight 212) to surface 150, the amount of force applied to structural surface 150 may be modulated and thus controlled.

It is noted that such a mechanism may be a manual mechanism (which can be operated by a person, e.g. when system 200 is installed). Such a mechanism may optionally be controllable by system 200 (e.g. based on instructions of controller 240). In such a case, it is possible to change the respective distance during a flight of the aircraft (e.g. based on icing conditions). Such a mechanism may be a simple mechanical mechanism (e.g. sliding the respective weight along a shaft or a rod), but may also be electromechanical (e.g. changing the distance by a motor, by changing a level of an electric current, and so on).

Optionally, the distance of the center of mass of passive displacement unit 210 from surface 150 is at least 4 cm, when the structural surface 150 is an aircraft surface which includes a leading edge of the aircraft.

Optionally, in a case system 200 includes a plurality of passive displacing units 210 located along a leading edge of the aircraft (e.g. as exemplified in FIGS. 6A and 6B), along a distance of at least 5 meters of the leading edge, a distance between any two adjacent passive displacement units does not exceed 1 meter.

Optionally, acceleration levels of structural surface 150 at each of the at least one second location 110 and at each of the at least one first location 120 exceed 80 g during an operation of the at least one actuating unit 220 when the structural surface 150 is an aircraft surface which includes a leading edge of the aircraft ("g" represents standard gravity, approximately equal to 9.8 m/sec$^2$). At each such location, the acceleration level change with time (occasionally diminishing completely), but at some points during the operation (usually in a repeating cycle whose frequency matches the driving frequency) it exceeds 80 g, in such cases. It is noted that much higher acceleration level may be implemented, e.g. higher than 100 g, higher than 200 g, etc.

Optionally, forces which are applied to structural surface 150 by displacer 214 at each of the at least one second location 110 exceed 50 Newton (50 N) during an operation of actuating unit 220 when the structural surface 150 is an aircraft surface which includes a leading edge of the aircraft. It is noted that significantly larger forces may be generated in buildings and bridges, for example, and significantly smaller forces may be generated in small-scale implementations like MEMS.

It is noted that for the sake of clarity, different aspects and optional variations of system 200 where discussed with respect to different drawings. It is nevertheless noted that the drawings merely illustrated several examples, and that other variations of the features discussed above may be used. Furthermore, any combination of two or more of the features discussed above may be implemented in a single variation of system 200, even if not explicitly discussed above.

For example, system 200 may include a plurality of actuating units 220 and a plurality of passive displacing units 210 (as discussed with respect to the example of FIGS. 6A and 6B) including at least twice as many passive displacing units 210 as the number of actuating units 220. Each of the actuating units 220 in such a configuration is fixed to structural surface 150 at one or more first locations 120 and is operable to produce the periodically variable force at a driving frequency. The applying of the periodically variable forces by the actuating units 220 (at one or more driving frequencies, concurrently or at different timings) produce forces which bring into resonance the weights 212, parts of structural surface 150, and at least a part of each of the actuating units 220 (e.g. masses 222, displacers 224), thereby displacing the structural surface in a plurality of directions at the second locations 110 and at the first locations 120 (e.g. as discussed with respect to the example of FIG. 4A). In the resonance state of the example configuration, a ratio between (a) an average magnitude of displacement of the at least one second location and (b) an average magnitude of displacement of the at least one first location is between ⅓ and 3 (e.g. as discussed with respect to the example of FIG. 4A); where structural surface 150 includes an aircraft leading edge (e.g. as discussed with respect to various figures); where the displacements of structural surface 150 at the second locations 110 and at the first locations 120 cause disengagement of ice from the leading edge (e.g. as discussed with respect to the example of FIG. 3).

All other combinations of aforementioned features of system 200 are also considered and are included within the scope of the present disclosure.

Reverting to FIG. 1, an aircraft 100 is disclosed, equipped with a deicing system constructed and operative in accordance with the presently disclosed subject matter. The deicing system is system 200, which may be located within the wings 102 of the aircraft adjacent the leading edges 104 of the wings 102. The deicing system may alternatively or additionally be located within the tail or stabilizers of the aircraft, or in other airfoils where icing is likely to occur.

Aircraft 100 includes:
  a. an airframe including aircraft surface 150;
  b. one or more engines 190 operable to propel the aircraft in a flying direction (the one or more engines are connected to the airframe, e.g. to fuselage 112);
  c. a plurality of actuating units 220, each of the actuating units being operable to produce a periodically variable force which is applied to at least one first location 120 of aircraft surface 150, thereby displacing aircraft surface 150 in a plurality of directions at the at least one first location 120;
  d. a plurality of passive displacing units 210, each of the passive displacing units 210 including a weight 212 and a displacer 214 supporting the weight 212 and fixed to at least one second location on aircraft surface 150;
  e. aircraft surface 150 which is capable of transferring vibrations between each of the first locations 120 and at least one associated second location 110 out of the second location 110, so that the displacing of aircraft surface 150 at the first locations 120 by actuating units 220 produces forces which are applied to the plurality of weights 212 via the aircraft surface 150 and displacers 214, bringing each of the weights 212 to resonance, thereby displacing aircraft surface 150 in a plurality of directions at each of the second locations 110.

The aircraft 100 may include at least one motor 230, operable to move a mass 222 of each actuating units 220 at a driving frequency, thereby producing forces which are applied to the weights 212 via aircraft surface 150 and the displacers 214, bringing the weights 212 to the resonance state.

It is noted that in addition to system 200, aircraft 100 may incorporate other features which assist in deicing. For example, the thickness, form and/or internal construction of parts of the airframe (especially those including structural surface 150) may be dedicatedly designed to support vibrations in specific frequencies excited by the one or more actuating units 220, while diminishing vibrations in other frequencies. It is noted that any variation of system 200 discussed above may be part of aircraft 100.

As aforementioned, system 200 may serve as deicing system on a wide range of vehicles (e.g. aircrafts, ships, submarines, cars, trucks, trains, tanks, and so on). The deicing system (system 200, in such case) may be located within the vehicle, or on either side of its external surface—on any structural surface of the vehicle, especially on surfaces on which icing is likely to occur.

A vehicle is therefore disclosed, including:
  a. a chassis;
  b. one or more engines 190 operable to propel the vehicle (the one or more engines are connected to the chassis, directly or indirectly);
  c. a plurality of actuating units 220, each of the actuating units being operable to produce a periodically variable force which is applied to at least one first location 120 of a structural surface 150 of the vehicle, thereby displacing structural surface 150 in a plurality of directions at the at least one first location 120;
  d. a plurality of passive displacing units 210, each of the passive displacing units 210 including a weight 212 and a displacer 214 supporting the weight 212 and fixed to at least one second location on structural surface 150;
  e. structural surface 150 which is capable of transferring vibrations between each of the first locations 120 and at least one associated second location 110 out of the second location 110, so that the displacing of structural surface 150 at the first locations 120 by actuating units 220 produces forces which are applied to the plurality of weights 212 via the structural surface 150 and displacers 214, bringing each of the weights 212 to resonance, thereby displacing structural surface 150 in a plurality of directions at each of the second locations 110.

The vehicle may include at least one motor 230, operable to move a mass 222 of each actuating units 220 at a driving frequency, thereby producing forces which are applied to the weights 212 via structural surface 150 and the displacers 214, bringing the weights 212 to the resonance state.

It is noted that in addition to system 200, the vehicle may incorporate other features which assist in deicing. For example, the thickness, form and/or internal construction of parts of the airframe (especially those including structural surface 150) may be dedicatedly designed to support vibrations in specific frequencies excited by the one or more actuating units 220, while diminishing vibrations in other frequencies. It is noted that any variation of system 200 discussed above may be part of the vehicle.

Figure 16:
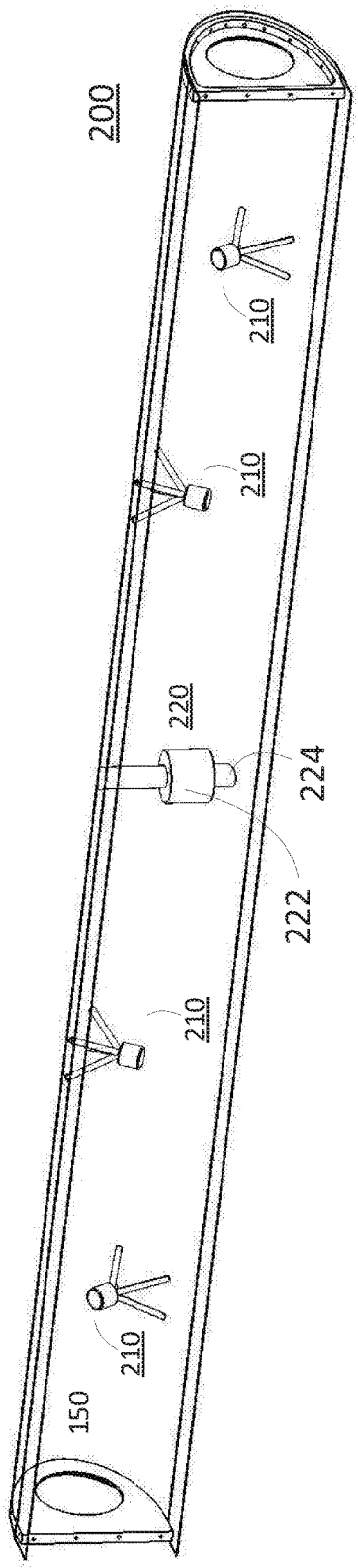

FIG. 16 illustrates an example of system 200 for applying deformations to a structural surface 150, in accordance with the presently disclosed subject matter. Actuating unit 220 exemplified in FIG. 16 may include a mass 222 which periodically travels back and forth along a track (e.g. along displacer 224, as illustrated). The track may be perpendicular to structural surface 150, but this is not necessarily so. Mass 222 may apply a periodically variable force onto structural surface 150 by hitting surface 150 (impact effect), or in other means (e.g. by vibrating the displacer, by creating a pressure wave if located within a cylinder, and so on).

Figure 17:
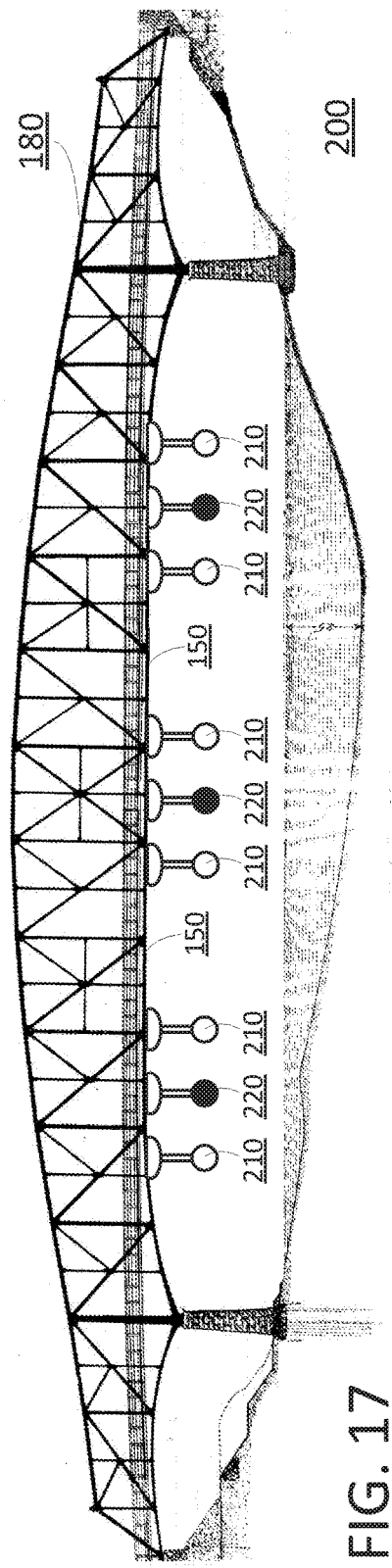
FIG. 17 illustrates an example of a system for applying deformations to a structural surface of a bridge, in accordance with the presently disclosed subject matter.

FIG. 17 illustrates an example of system 200 for applying deformations to a structural surface 150 of a bridge 180, in accordance with the presently disclosed subject matter. In the illustrated example, system 200 is deployed underneath the girder of bridge 180, but it is noted that system 200 may also be deployed on other parts of the bridge, such as piers, footings, foundations, bearings, superstructure, deck etc. the deformation of a structural surface of bridge 180 may be used, for example for deicing, for removing collected water, or for any other use.

Figure 18:
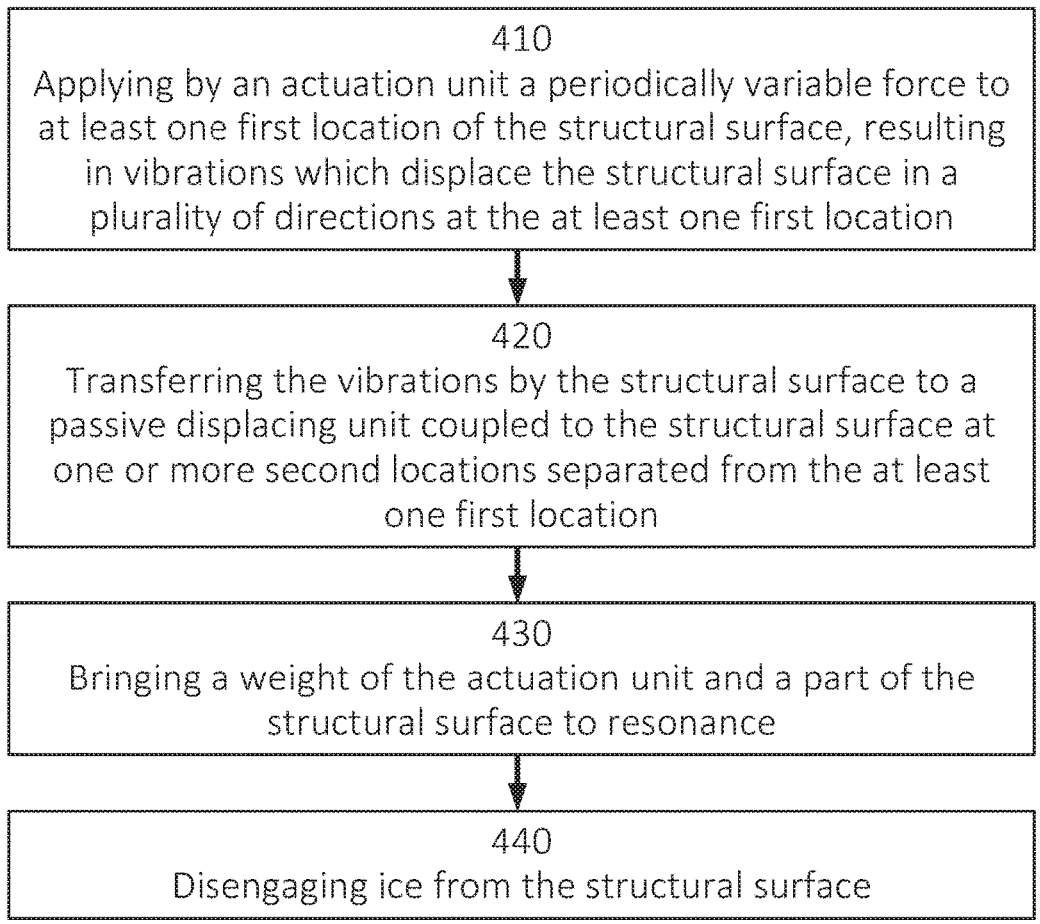
FIGS. 18 and 19 are flow charts illustrating examples of methods for applying deformations to a structural surface, in accordance with the presently disclosed subject matter.

FIG. 18 is a flow chart illustrating an example of method 400, in accordance with the presently disclosed subject matter. Method 400 is a method for applying deformations to a structural surface. Referring to the examples set forth with respect to the previous drawings, method 400 may be executed by system 200. Furthermore, the different variations discussed with respect to system 200 have counterpart stages which may be integrated into method 400 for achieving the functionalities discussed with respect to system 200, even if not explicitly discussed with respect to method 400.

Method 400 includes stage 410 of applying by an actuation unit a periodically variable force to at least one first location of the structural surface, resulting in vibrations which displace the structural surface in a plurality of directions at the at least one first location. It is noted that in each first location, the vibrations may displace the structural surface in different directions and/or in different magnitudes. Referring to the examples set forth with respect to the previous drawings, stage 410 may be executed by actuating unit 220, with or without control of controller 240.

Stage 420 of method 400 includes transferring the vibrations by the structural surface to a passive displacing unit coupled to the structural surface at one or more second locations separated from the at least one first location. Referring to the examples set forth with respect to the previous drawings, stage 420 may be executed by structural surface 150.

Stage 420 results in stage 430 of bringing a weight of the actuation unit and a part of the structural surface to resonance. The resonance of the structural surface creates deformations of the structural surface in a plurality of directions at the one or more second locations. Optionally, forces which are applied to structural surface by the passive displacing unit at each of the one or more second location may exceed 50 N during an operation of the activating unit when the structural surface is an aircraft surface which includes a leading edge of the aircraft.

It is noted that the resonance of stage 430 and the deformations of the structural surface resulting therefrom may be used for deicing of the structural surface. The deformations of the structural surface may be used to cause disengagement of ice from the structural surface. Optionally, stage 430 may result in optional stage 440 of disengaging ice from the structural surface.

Optionally, the transferring of the vibrations by the structural surface produce forces which bring into resonance the weight, a part of the structural surface and at least a part of the actuating unit, thereby displacing the structural surface in a plurality of directions at each of the one or more second locations and at each of the one or more first location.

Optionally, in the resonance state a ratio between (a) an average magnitude of displacement of the at least one second location and (b) an average magnitude of displacement of the at least one first location is between ⅓ and 3.

Optionally, the transferring comprises transferring the vibrations by the structural surface to a plurality of passive displacing units, at a plurality of second locations; thereby bringing weights of the passive displacement units and parts of the structural surface to resonance; wherein the resonance of the structural surface creates deformations of the structural surface in a plurality of directions at the plurality of second locations.

Optionally, method 400 may further include sensing an ice thickness responsive characteristic of the structural surface, by sensing displacement of the structural surface responsive to the forces produced by the system; and controlling an operation of the actuating unit (and/or of a motor which provides energy to the actuating unit) based on a result of the sensing.

Figure 19:
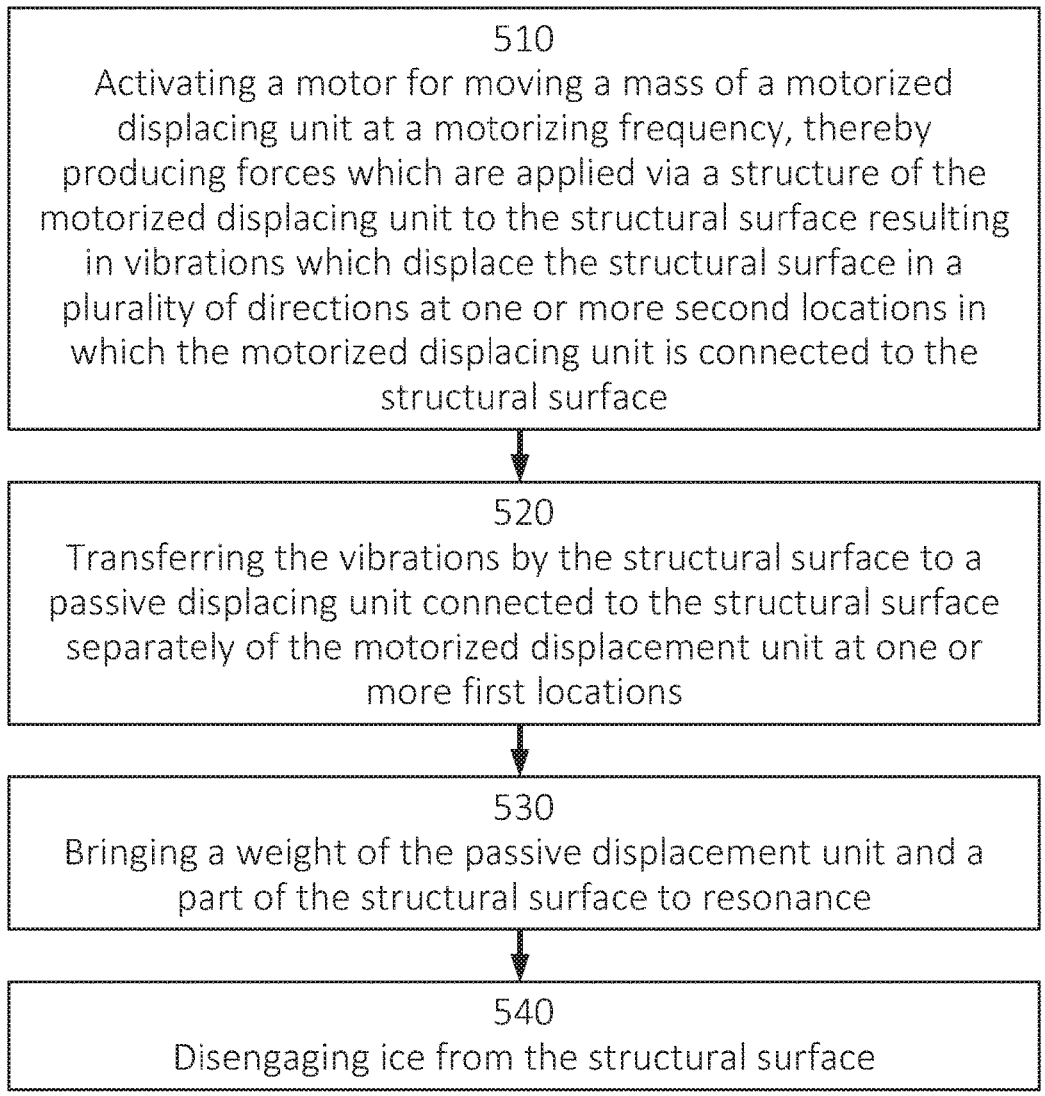

FIG. 19 is a flow chart illustrating an example of method 500, in accordance with the presently disclosed subject matter. Method 500 is a method for applying deformations to a structural surface. Referring to the examples set forth with respect to the previous drawings, method 500 may be executed by system 200. Furthermore, the different variations discussed with respect to system 200 have counterpart stages which may be integrated into method 500 for achieving the functionalities discussed with respect to system 200, even if not explicitly discussed with respect to method 500.

Method 500 includes stage 510 of activating a motor for moving a mass of a actuating unit at a driving frequency, thereby producing forces which are applied via a structure of the actuating unit to the structural surface resulting in vibrations which displace the structural surface in a plurality of directions at one or more first locations in which the actuating unit is connected to the structural surface.

Referring to the examples set forth with respect to the previous drawings, the activating of stage 510 may be executed by motor 230, with or without control of controller 240.

Stage 520 includes transferring the vibrations by the structural surface to a passive displacing unit connected to the structural surface separately of the motorized displacement unit at one or more second locations. Referring to the examples set forth with respect to the previous drawings, stage 520 may be executed by structural surface 150.

Stage 520 results in stage 530 of bringing a weight of the passive displacement unit and a part of the structural surface to resonance. The resonance of the structural surface creates deformations of the structural surface in a plurality of directions at the one or more second locations. Optionally, forces which are applied to structural surface by the passive displacing unit at each of the one or more second location may exceed 50 N during an operation of the motor (in cases the structural surface is an aircraft surface which includes a leading edge of the aircraft).

It is noted that the resonance of stage 530 and the deformations of the structural surface resulting therefrom may be used for deicing of the structural surface. The deformations of the structural surface may be used to cause disengagement of ice from the structural surface. Optionally, stage 530 may result in optional stage 540 of disengaging ice from the structural surface.

Optionally, the transferring of the vibrations by the structural surface produce forces which bring into resonance the weight, the mass, and a part of the structural surface, thereby displacing the structural surface in a plurality of directions at each of the one or more second locations and at each of the one or more first location.

Optionally, in the resonance state a ratio between (a) an average magnitude of displacement of the at least one second location and (b) an average magnitude of displacement of the at least one first location is between ⅓ and 3.

Optionally, the transferring comprises transferring the vibrations by the structural surface to a plurality of passive displacing units, at a plurality of second locations; thereby bringing weights of the passive displacement units and parts of the structural surface to resonance; wherein the resonance of the structural surface creates deformations of the structural surface in a plurality of directions at the plurality of second locations.

Optionally, method 500 may further include sensing an ice thickness responsive characteristic of the structural surface, by sensing displacement of the structural surface responsive to the forces produced by the system; and controlling an operation of the motor based on a result of the sensing.

Figure 20:
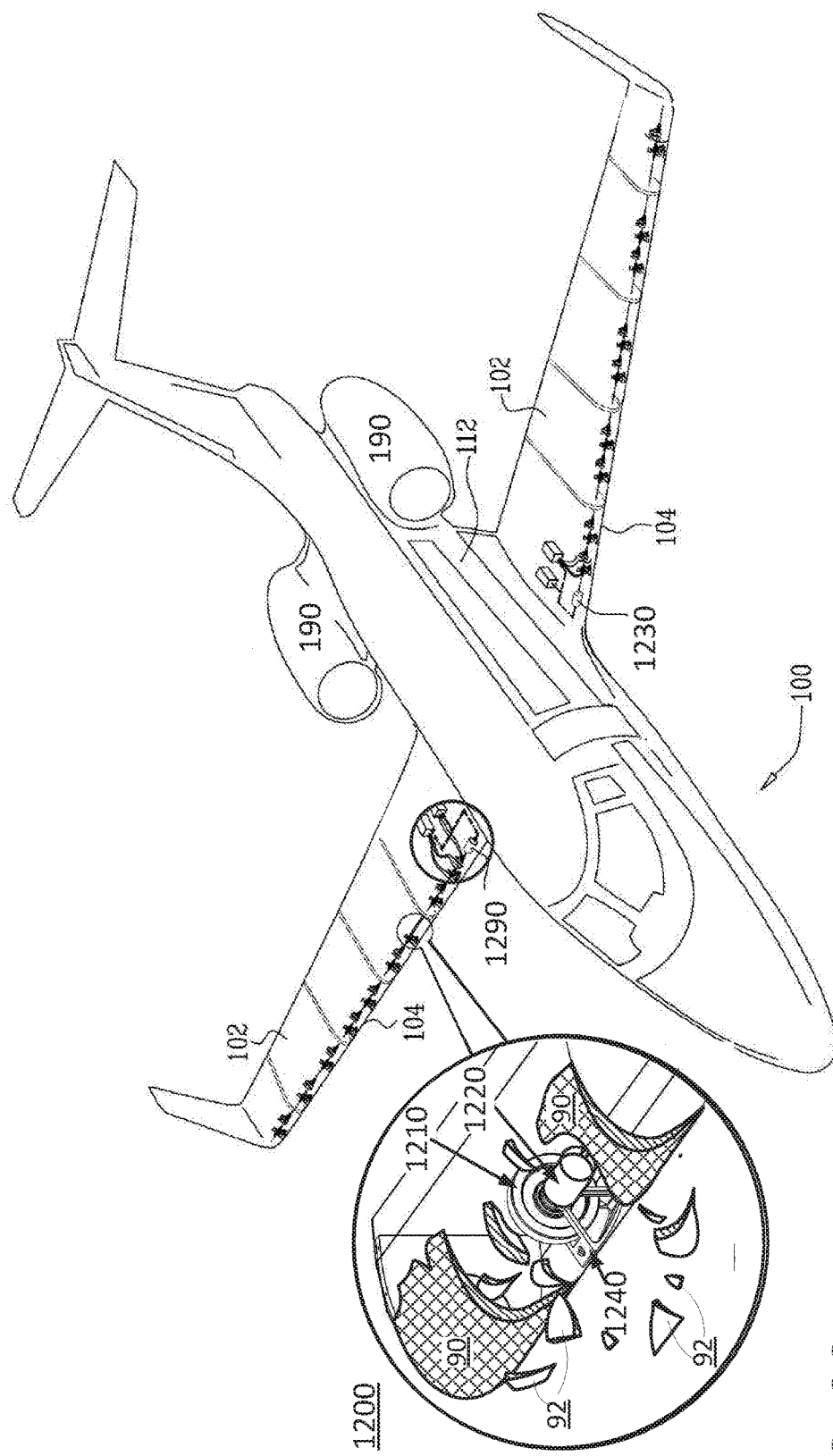
FIG. 20 is a simplified illustration illustrating an example of an aircraft deicing system, connected to an aircraft skin surface of an aircraft, in accordance with the presently disclosed subject matter.
Figure 21:
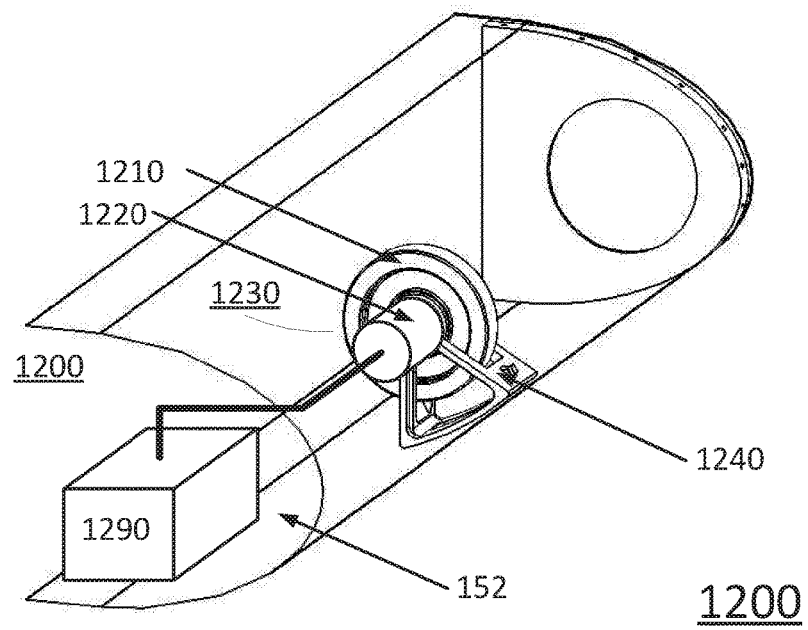
FIGS. 21 and 22 are illustrations of examples of aircraft deicing systems, in accordance with examples of the presently disclosed subject matter.

Reference is now made to FIG. 20, which is a simplified illustration illustrating an example of an aircraft deicing system 1200, connected to an aircraft skin surface 152 (also referred to as "surface 152") of aircraft 100, in accordance with the presently disclosed subject matter, and to FIG. 21 which is an illustration of an example of aircraft deicing system 1200, in accordance with examples of the presently disclosed subject matter. It is noted that in addition—or instead—of deicing, the deformations of aircraft skin surfaces 152 by system 1200 may be used for deicing (i.e. removing of ice collected on aircraft skin surface 152) as discussed below, but may also be used for other uses (e.g. modifying a reflection of electromagnetic radiation off the aircraft skin surface, e.g. for improving stealth or as an electronic countermeasure).

It is noted that optionally, system 1200 may serve as actuating unit 220 of system 200, mutatis mutandis. In such implementations of system 200, it is noted that any variation discussed with respect to system 1200 may be implemented in any variation of system 200, mutatis mutandis.

The term "aircraft skin" is well accepted in the art, and should be construed in a nonlimiting way to pertain to a surface of an aircraft which is located on the exterior of the aircraft. The skin is usually relatively thin (e.g. less than 5 mm) and therefore have some flexibility, especially in portions of the skin which are not directly connected to an internal load-bearing structure of the aircraft (such as ribs of the wings, or other parts of the airframe). The aircraft skin surface may be made from various materials, such as metals, alloys, composite materials, plastics, fiberglass, carbon fibers, and so on. While not necessarily so, components of system 1200 are usually connected to an inner side of the aircraft skin surface (and are therefore not exposed to wind, rain, etc.). It is noted that aircraft skin surface 152 is a structural surface 150 of aircraft 100.

As seen in FIG. 20, system 1200 may optionally be located at an aircraft leading edge, and the aircraft skin surface 152 affected by the operation of system 1200 may be a skin surface of a leading edge. The leading edge may be a leading edge of any airfoil section of the aircraft, such as the leading edge of a wing, of a horizontal stabilizer, of a fin, of a vertical stabilizers, of a V-tail, of a helicopter rotor blade, of a propeller, and so on. The leading edges of such airfoil parts have a higher tendency for icing in lower temperatures, and system 1200 may be used for deicing ice collected on such surfaces. Optionally, different parts of system 1200 (e.g. different motors 1230 and supporting displacers 1240) may be installed on both sides of the leading edge, but this is not necessarily so.

One or more motors 1230 may be connected via one or more displacers 1240 to the suction surface (e.g. the upper surface of a wing) of the respective airfoil (e.g. the wing), and/or one or more motors 1230 may be connected via one or more displacers 1240 to the pressure surface of the respective airfoil (e.g. the lower surface of the wing). It is noted that within the scope of the present invention, the suction surface and the pressure surface may both be considered a single aircraft skin surface 152, as vibrations can be transmitted between those two parts of the airfoil on the surface level thereof, and therefore displacing one side of the airfoil may be used for deicing the other side as well.

It is noted that system 1200 may also be located on non-leading-edge surfaces of the aircraft, e.g. in other aircraft surfaces which on which ice tend to collect. Some of these surfaces may be skin surfaces of the aircraft, while others (such as fans) are not. For example, other types of surfaces of aircrafts which may also serve as aircraft skin surface 152 are radomes, aircraft fairing antenna, antenna covers, inlets, air intakes, fans, and so on.

Like system 200, system 1200 may be used to device aircraft skin surfaces of propelled aircraft whose lift is a dynamic lift of an airfoil, such as an airplane, a helicopter, a multirotor helicopter (e.g. a quadcopter), an Unmanned Aerial Vehicle (UAV), a missile, and so on. Other types of aircraft may also be used (such as a nonpropelled glider, a hot-air balloon, a zeppelin, and so on).

It is noted that while the disclosure pertains to deicing of aircraft skin surfaces, systems such as the ones discussed below may also be installed and used, mutatis mutandis, on other surfaces and on other structures. A non-exhausting list of few example of structural surfaces to which the systems disclosed below may be used for deicing are surfaces belonging to:
  a. Aircraft (also non-skin surfaces, as exemplified above);
  b. Other types of vehicles (e.g. ships, submarines, trains, trucks, etc.);
  c. Buildings (e.g. windows, walls, doors, infrastructure, and so on of homes, skyscrapers, etc.);
  d. Bridges;
  e. Airborne units such as cameras, pods, coolers, etc.;
  f. Antennas and various poles; and so on.

It is further noted that systems similar to the ones disclosed herein may also be used for purposes other than deicing, such as for vibrating surfaces of small-scale apparatuses, such as any surface of a Microelectromechanical system (MEMS are systems of small scale, e.g. 10 µm to 10 mm, which are usually fabricated on a semiconductor using modified semiconductor device fabrication technologies).

Aircraft deicing system 1200 includes motor 1230, which in turn includes stator 1220 and rotor 1210. Rotor 1210 is rotatable about a center of mass of the rotor (denoted 1212 in FIG. 23), and stator 1220 rotatably supports rotor 1210. That is, stator 1220 supports rotor 1210, while enabling mass 1210 to rotate about its center of mass. The support may be carried out using mechanical means (e.g. shaft, bearings, etc.), electromagnetic means, or any other means. It is noted that stator 1220 may support rotor 1210 directly (i.e. touching it) or indirectly (i.e. via an intermediary component such as a shaft). It is noted that the supporting of rotor 1210 by stator 1220 may or may not involve physical touch between the components (e.g. magnetic support may be used).

System 1200 also include at least one displacer 1240 which is connected to stator 1220 and to aircraft skin surface 152 at a plurality of connection locations. It is noted that optionally, stator 1220 and displacer 1240 may be implemented as a continuous piece of matter (e.g. as a housing for rotor 1210 which is supported by aircraft skin surface 152), or as two or more units which are connected to one another (e.g. as illustrated in FIG. 21). Stator 1220 may include additional components, e.g. a coil through which current can be transferred, for generating a magnetic flux.

In addition to motor 1230 and to the one or more displacers 1240 connecting motor 1230 to surface 152, system 1200 further includes controller 1290, which is operable to control torques in motor 1230. Especially, controller 1290 is operable to control:

a. A first torque which is applied to rotor 1210, and which angularly accelerates rotor 1210 about the center of mass (i.e. the center of mass of rotor 1210);

b. A second torque which is applied to stator 1220, and which produces countering forces applied to the aircraft skin surface at the plurality of connection locations by the at least one displacer 1240 at different directions, causing displacement of aircraft skin surface 152 at at least one of the connection locations.

Figure 23:
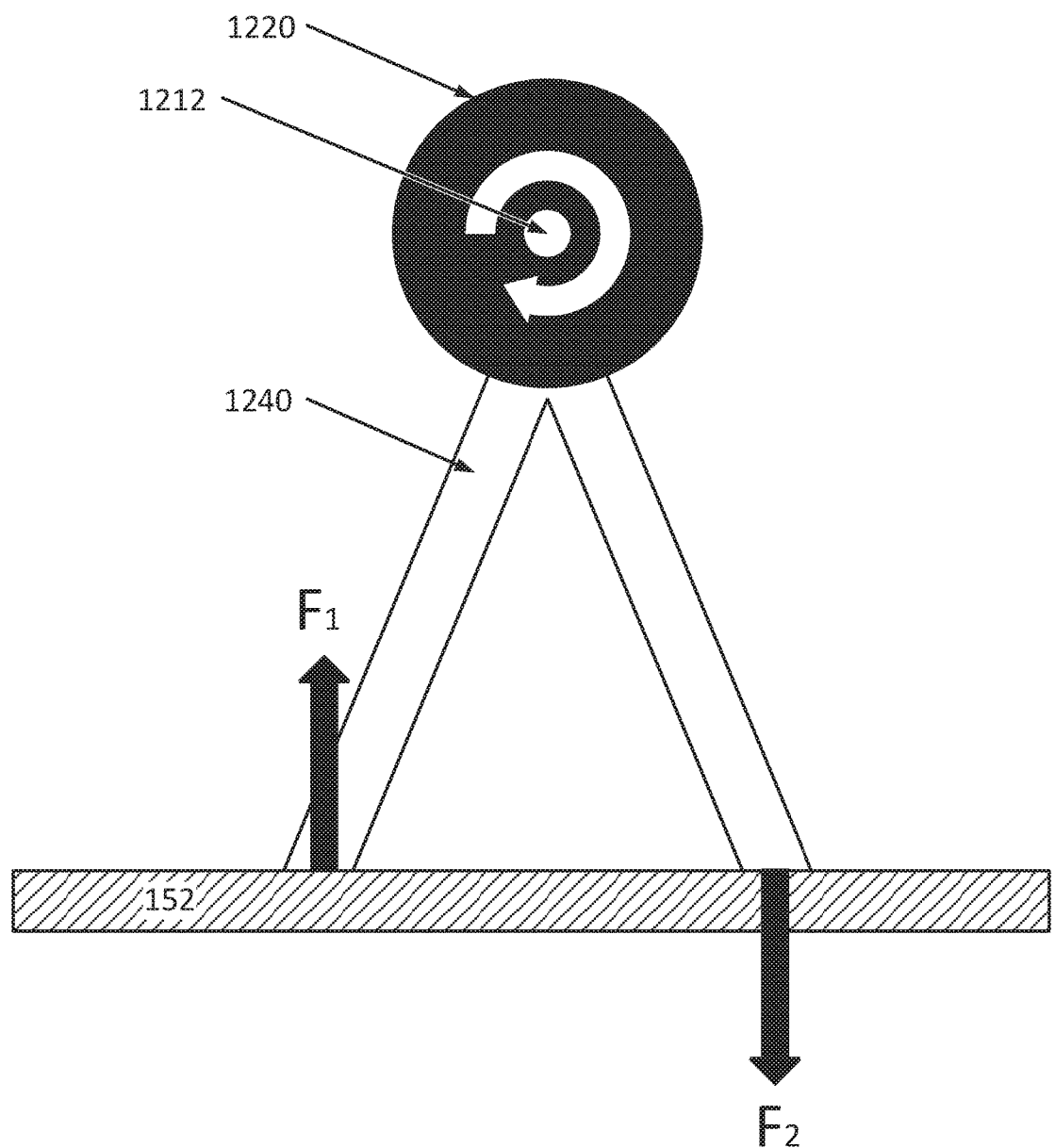
FIG. 23 is a simplified forces diagram, illustrating forces in an aircraft deicing system in accordance with examples of the presently disclosed subject matter.
Figure 24A:
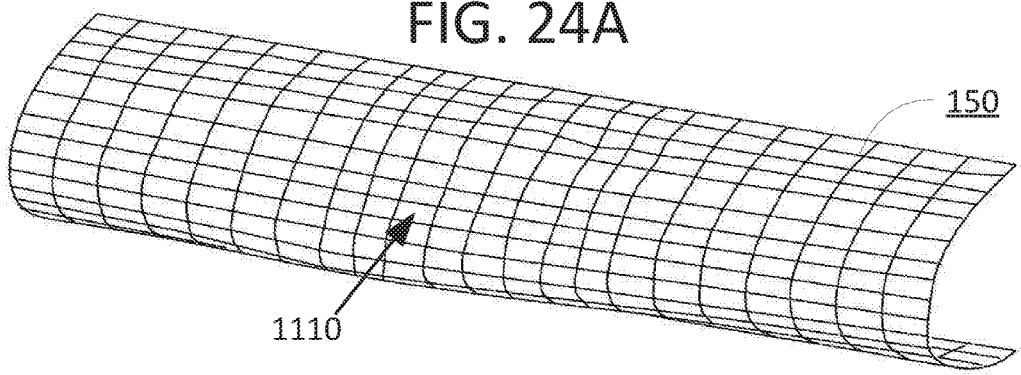
FIGS. 24A through 24D show, in an exaggerated manner, deformation of a leading edge of an aircraft skin surface in different phases of an alternating periodical angular acceleration of the rotatable mass about the center of mass, in accordance with the presently disclosed subject matter.
Figure 24B:
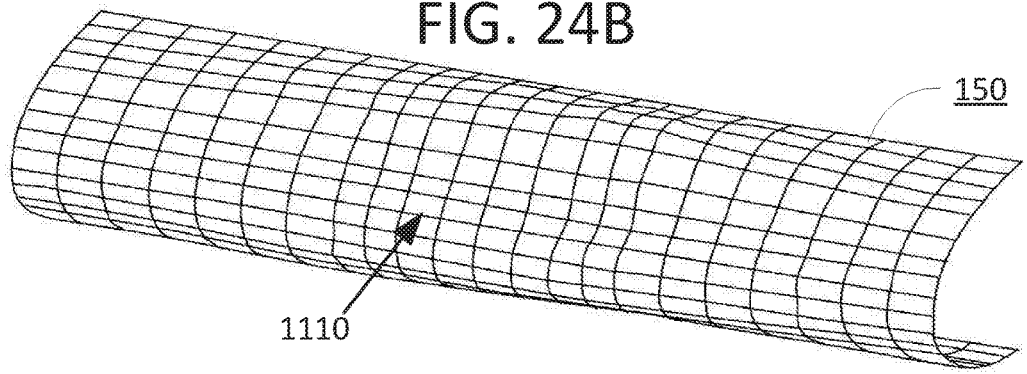
Figure 24C:
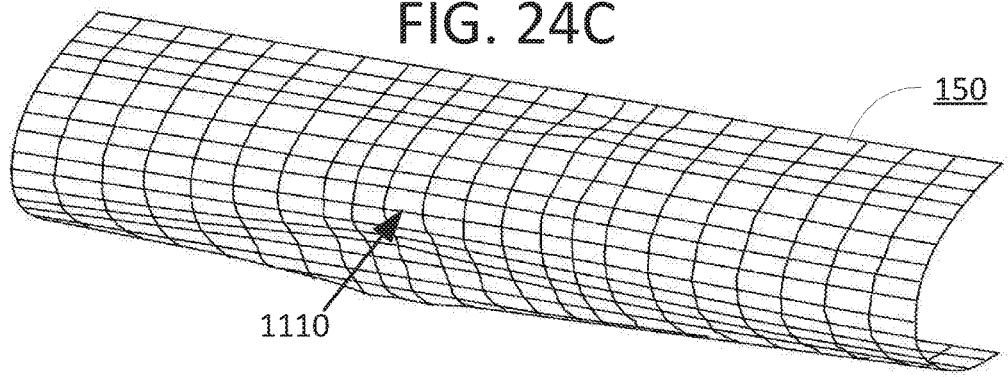
Figure 24D:
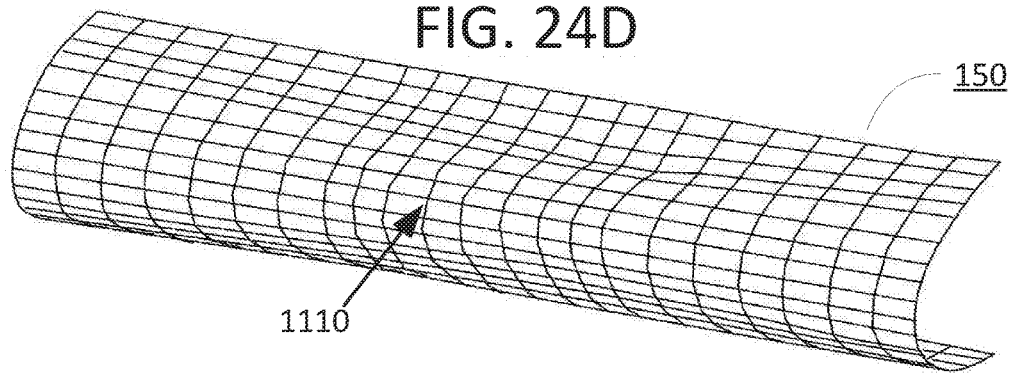

FIG. 23 is a simplified forces diagram, illustrating forces in system 1200 in accordance with examples of the presently disclosed subject matter. For simplicity of the drawings, not all of the components of system 1200 are illustrated in FIG. 23. Especially, rotor 1210 is not illustrated, showing only torque applied to stator 1220. As can be seen, stator 1220 is connected at a plurality of connection locations (two, in the illustrated example) to surface 152 by displacer 1240. The second torque applied onto stator 1220 (represented by the circular arrow) results in forces (e.g. F1, F2) applied by displacer 1240 on surface 152 in different directions, at least one pushing on surface 152, and at least one force pulling on surface 152.

The opposing forces exerted by displacer 1240 onto surface 152 (as a result of the torque applied onto stator 1220) result in displacing of surface 152 in different directions in the connection locations in which the forces are applied, and therefore to the deformation of surface 152 in this area (the deformation is not shown in the illustration). Such deformations may be used for deicing of surface 152, as discussed below. It is noted that the direction in which each of the forces (F1, F2) pushes or pulls or surface 152 depends on the second torque applied onto stator 1220, which is opposite to the direction in which the rotation of rotor 1210 accelerates.

Reverting to FIGS. 20 and 21, system 1200 includes rotor 1210 which is rotatable about its center of mass 1212. Rotor 1210 is rotatable about at least one rotation axis passing through its center of mass. It is nevertheless noted that system 1200 may also be implemented so that rotor 1210 is rotatable about more than one rotation axis (concurrently or not), e.g. in order to deform surface 152 in different directions. Also, system 1200 may optionally be implemented so that the rotation axis may itself be movable (e.g. changing its orientation with respect to surface 152). It is noted that a similar effect of applying forces in different angles onto surface 152 may be achieved by using a plurality of motors having rotors 1210 rotating in intersecting planes.

Referring to the first torque, the rotation of rotor 1210 about its center of mass 1212 is subject to angular acceleration. The angular acceleration may be controlled and/or monitored by controller 1290, but this is not necessarily so. In other words, the first torque may be directly controlled by controller 1290, but this is not necessarily so, and it may also be a derivative of the second torque. As rotor 1210 has parts of its mass located away from its axis of rotation, it has moment of inertia (also known as 'rotational inertia"), and therefore it accelerates angularly when a torque (also known as "moment of force" or "moment") is applied to rotor 1210.

The first torque may be generated, for example, by applying current to a coil located in stator 1220, which results in magnetic flux, which is applied to a magnet of rotor 1210. However, other ways of applying and controlling the torques in motor 1230 may also be used. It is noted that system 1200 may also include additional sources of torque (e.g. a brake 1260).

It is noted that rotor 1210 may include one or more physical parts. For example, rotor 1210 may consist of a single piece (or lump) of metal, but it may also consist of several pieces of matter, each being independently rotatably supported by stator 1220.

The moment of inertia weight of rotor 1210 may be selected based on various factors, such as the size of the surface area it is designed to deice, on the material and structure of this area, and on other factors. For example, when installed in an airfoil of an aircraft (e.g. when surface 152 including a leading edge), the mass of rotor 1210 may be 50-200 grams. It is noted that the moment of inertia of rotor 1210 depends on its shape as well as on its mass. For example, the moment of inertia of rotor 1210 may be between 0.0005 and 0.01 Kg·m².

Rotor 1210 may be rigidly connected to a shaft passing through its center of mass and be rotatable about the shaft, but this is not necessarily so. For example, the rotor 1210 may be an outer rotor (also known as "external rotor") of motor 1230.

It is noted that since the center of mass is an imaginary dimensionless point, the rotation axis of rotor may have slight deviations from the exact center of mass 122. However, rotation of rotor 1210 about its center of mass should not exert substantial inertial forces onto displacer 1240 resulting from the rotation of the center of mass 1212 about the rotation axis. Rotation of eccentric masses for the purpose of deicing is discussed in U.S. Pat. No. 8,517,313 entitled "Mechanical Vibration Deicing System" by the same inventor.

Rotor 1210 may be of different shapes. For example, it can be a flat disc, a cylinder, a sphere, a rod, a cube, a box, an ellipsoid, and so on. It is noted that rotor 1210 may be symmetric or asymmetric. Especially, rotor 1210 may and may not demonstrate symmetric about the axis of rotation, or about a plane passing through the axis of rotation.

The at least one displacer 1240 is connected to aircraft skin surface 152 at a plurality of connection locations. Displacer 1240 may be connected (possibly fixed) to the respective one or more connection locations of aircraft skin surfaces 152 in various ways, such as (although not limited to): glue, screws, nails, nuts and bolts, blind bolts, pins, one or more pins passing through a lug of a fitting embedded to the aircraft skin surface, etc. The mechanism of connection may be selected, for example, in order to limit the amount of energy which is wasted when forces and/or torques are applied onto the connections, and/or in order to withstand deliberate vibrations applied to the connection by system 1200 (if any).

With respect to the connection locations in which displacer 1240 is connected to the surface 152, it is noted that the sizes and the shapes of these locations may vary, depending on various considerations such as structural strength, functionality in transferring movement between displacer 1240 and surface 152, position with respect to the leading edge, and so on. It is noted that a single displacer 1240 may be connected to aircraft skin surface 152 in more than one connection location, where these locations are separated from each other.

In addition to permanent (or at least steady) connections between displacer 1240 and surface 152 as suggested above, temporary connections may also be used for applying forces on surface 152. For example, the center of mass of motor 1230 may be designed to move as a result of the operation of motor 1230, which may cause more (or less) parts of displacer 1240 to touch surface 152 in some positions of the moving motor 1230. As can be seen at least in the examples of FIGS. 20 and 21, optionally all of the connections of the one or more displacers 1240 of system 1200 to surface 152—are permanent (or at least steady) connections, staying connected throughout the operation of system 1200.

It is noted that displacer 1240 may be implemented as a rigid uniform displacer, made out of a continuous piece of a single rigid matter. For example, displacer 1240 may be made out of any combination of one or more of the following materials: metals, plastics, composite materials, (e.g. fiberglass, carbon fibers, etc.). However, it is also possible to use a displacer 1240 which is not made out of a continuous piece of a single rigid matter, e.g. by adding an axis or a bearing between parts of displacer 1240. In the following description a displacer which is a rigid displacer is used as a primary variation, but it is noted that other types of displacers may be used.

The operation of motor 1230 drives rotor 1210 in rotational motion about the center of mass 1212 at variable speeds. Motor 1230 can accelerate rotor 1210 to higher rotation speeds (more revolutions per minute), and may optionally be operable to accelerate rotor 1210 to lower rotation speeds (less revolutions per minute), e.g. by using reverse electrical current. It is noted that in the present disclosure, the term acceleration (and especially "angular acceleration") pertains to any change in the velocity (e.g. angular velocity) of an object—whether if increasing that velocity or decreasing it (a condition occasionally referred to as "deceleration").

Different kinds of motors may be used as motor 1230, including all of the motors known in the art to be used on vehicles. For example, motor 1230 may be an electric motor, a fluid driven motor (e.g. a pneumatic motor), piezoelectric motor, and so on.

Figure 29:
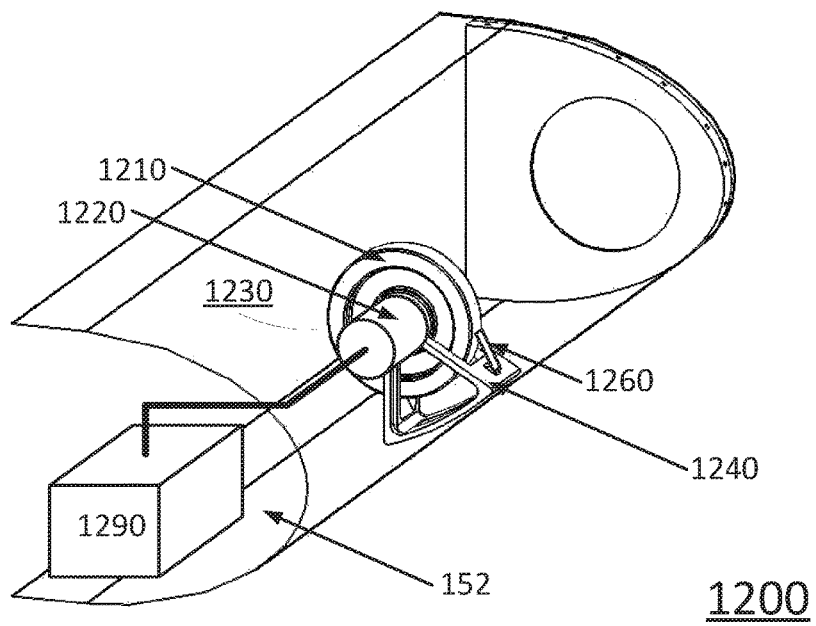
FIG. 29 is an illustration of an example of an aircraft deicing system, in accordance with examples of the presently disclosed subject matter.

As mentioned above, other sources of torque (in addition to motor 1230) may also be may also incorporated into system 1200, which may be operable to angularly accelerate rotor 1210. FIG. 29 is an illustration of an example of aircraft deicing system 1200, in accordance with examples of the presently disclosed subject matter. System 1200 may include a brake 1260, which is operable to slow down a rotation of rotor 1210 about its center of mass. Brake 1260 which is operable to reduce the rotation speed of rotor 1210, is also controlled by controller 1290. Different kinds of brakes may be used as motor 1230, including all of the brakes known in the art to be used on vehicles, such as friction brakes, shoe brakes, pad brakes, drum brakes, disc brakes, electromagnetic brakes, and so on.

One form of braking mechanism which may optionally be implemented includes a fixed obstacle. Rotor 1210 in such case may include a part which moves as a response of the rotation speed. For example, rotor 1210 may include a mass which moves along a conical spiral, against a pulling force, based on its rotation speed. In another example, rotor 1210 may have levers which raise to the sides based on the rotation speed. In such case, once the moving part of rotor 1210 reaches a certain angular velocity (and hence a certain location in space), it may hit the fixed obstacle and abruptly come to a stop. Other mechanisms for stopping or slowing the rotation of rotor 1210 may also be used.

Referring to controller 1290, it is noted that controller 1290 can be implemented as any kind of electronic device with data processing capabilities, including, by way of non-limiting example, a flight computer, a computing system, a communication device, DSP, microcontroller, FPGA, ASIC, etc. Controller 1290 is operable to control one or more motors 1230 and optionally also one or more brakes 1260, or any other component of system 1200 which can controllably apply torques in system 1200 (and thereby also change an angular velocity of rotor 1210). Controller 1290 may be connected to various sensors 1250 (e.g. as discussed below) for collecting information in order to determine how to control the one or more motors and/or brakes, but this is not necessarily so.

Controller 1290 may be operable to control various parameters of the operation of motor 1230, such as: turn on times, turn off times, activation level, current level, current direction, voltages, operational frequency, direction of movement, activation profiles, programs, or schemes, and so on. Controller 1290 may be a dedicated hardware controller, a part of a general hardware processor, and may also be implemented as general purpose processor running a dedicated software. Controller 1290 may base its controlling on many kinds of sources, such as: preprogrammed data, data collected by sensors 1250 of system 1200 (if any), data transmitted from other aircraft systems, commands of the pilot (or another member of the flight crew), feedback mechanisms of system 1200 (if any), and so on.

Referring again to the example of FIG. 23, the second torque (illustrated in FIG. 23) is countered by countering forces which are applied by the at least one displacer 1240 to the aircraft skin surface 152. The forces are applied to surface 152 at different directions at the plurality of connection locations, causing displacement of aircraft skin surface 152 at at least one of the connection locations. For example, skin surface 152 may move inward towards an interior of the aircraft, or outwards, away from the aircraft. The movement may also include some sideways movement components.

It is noted that the torque in system 1200 is generated dynamically, e.g. by dynamically controlling the currents used by motor 1230 for generation of torques. Dynamically changing the torque enables dynamic control of the forces (e.g. $F_1$, $F_2$) which are used for deforming surface 152, which can be used for removal of ice from the external side of surface 152. Optionally, the displacements of the aircraft skin surface 152 at the at least one connection location cause disengagement of ice from the aircraft skin surface 152. Disengagement of ice from surface 152 may depend on the thickness and hardness of the ice collected on the surface.

In the following discussion, two of the ways in which system 1200 may be used for deicing of aircraft skin surface 152 are discussed in greater detail. In one way, second torque is intensified in one direction (causing a first torque which accelerates rotor 1210 rapidly in the opposite direction), thereby creating a relatively large second torque which is translated to relatively large forces in the connection location. The large torques may be created, for example, by abruptly braking the rotation of rotor 1210, thereby creating a shock in surface 152, leading to disengagement of ice.

Rapid acceleration of the rotor may include controllable angular acceleration of rotor 1210 at an angular acceleration of at least 500 radians/sec$^2$ for at least 100 milliseconds. Optionally, the second torque generated by motor 1230 in such cases is at least 2 Newton·meter (N·m). Optionally, the second torque produce countering forces of at least 100 Newton (N) applied to the aircraft skin surface 152 by the at least one displacer 1240.

In the second way, the second torque is applied by motor 1230 at alternating opposite directions, thereby producing countering forces which alternate their direction at each of the connecting locations in which they are applied to surface 152. That is, at each such connection location, the force applied to surface 152 by displacer 1240 sometimes pushes on the surface 152, and sometimes pulls the surface. This cause displacement at different directions of the aircraft skin surface 152 at the at least one connection location. Controller 1290 may therefore be operable to control application of the second torque at alternating opposite directions, thereby producing forces applied to aircraft skin surface 152 at the plurality of connection locations by the at least one displacer at different directions, causing displacement at different directions of the aircraft skin surface at one or more of the connection locations. Since the first torque is opposed in direction to the second torque, it also alternates its direction in such case. As a result, rotor 1210 is being accelerated in alternating directions.

Controlled alternation of the direction of the second torque may be used to generate forces alternating periodically, bringing the surface 152 in the area of the connection location to resonance—which may lead to disengagement of ice from surface 152. Control of the periodically alternating second torque may include controlling operation of motor 1230 and/or operation of brake 1260.

It is noted that while the first torque is alternating directions in the opposite direction to the second torque, the angular velocity of rotor 1210 does not necessarily change direction, and it may simply speed up and slow down alternatively. Alternatively, the alternating periodical first torque may cause rotor 1210 to rotate about its center of mass in opposing directions. It is noted that if rotor 1210 is rotated at different directions many times a second (e.g. alternating at about 100 Hz), it does not necessarily ever complete a full revolution in any of the directions.

The periodically variable torque is a torque which changes over a period. The period may be of constant duration (e.g. the duration of each period is 50 milliseconds), but periods of changing durations may also be used (for example, in some actuating mechanism the duration of each period may depend on the linear acceleration of rotor 1210, which may result from movement of surface 152). Optionally, the periodically variable torque may be a sinusoidal variable torque (i.e. torque whose magnitude change sinusoidally), or a sinusoidal-like variable torque. The periodically variable torque produced by actuating unit 1290 can also have periodically recurring impulses (e.g. if being braked abruptly in each period).

It is noted that the displacement of surface 152 as result of these alternating forces applied onto surface 152 causes displacer 1240—and other components of system 1200, such as mass 1210—to move in alternating directions. That is, parts of system 1200 accelerate in alternating directions. In accordance with the second law of Newton, the acceleration of those parts of system 1200 cause additional forces which are also applied via displacer 1240 onto the connection location—contributing to the displacement thereof.

Based on the accumulative effect of resonance, and on the added forces resulting from the linear acceleration, the required torques on stator 1220 and on rotor 1210 can be significantly lower. For example, instead of using torques larger than 2 N·m, as discussed above with respect to the rapid acceleration, torques of about 0.1-0.2 N·m may suffice.

The rate of alternation of direction of the torques in motor 1230 may be selected so that the system is brought to resonance by the controlled operation of the motor and/or brake. For example, controller 1290 may be operable to control periodically alternating the second torque in a rate of at least 40 alternations per second (i.e. of at least 20 Hertz).

As aforementioned, applying the second torque in different directions in different times may be used to bring into resonance a resonating compound which includes parts of surface 152 and at least a part of displacer 1240 (and possibly other components of the system). Optionally, controller 1290 may be operable to control the alternating second torque at a driving frequency, thereby bringing aircraft skin surface 152 to resonate around the at least one connection location, thereby causing disengagement of ice from aircraft skin surface 152. This resonance in turn may cause, in appropriate conditions, disengagement of ice from the aircraft skin surface 152. Optionally, controller 1290 may be operable to control alternating periodical angular acceleration of rotor 1210 about the center of mass at a driving frequency, thereby bringing the aircraft skin surface 152 to resonate around the at least one connection location.

The driving frequency is a frequency in which an area of surface 152 around at least one displacer 1240 resonate. It is noted that the driving frequency may be the natural resonance frequency of a resonating system which includes displacer 1240. However, this is not necessarily so, and the driving frequency may be a frequency which is somewhat different than this natural resonance frequency, but still sufficiently close in order for surface 152 to resonate (e.g. having a transfer function value larger than 2).

The terms "resonating system" and "resonating compound" refer to a group of components (or parts thereof) which resonate together which each other, due to forces transmitted between them in a certain timing (phase difference) which Increase the total energy of the resonating system. The resonating system may purely mechanical resonating system (in which the timely forces increase the total Kinetic/Elastic Energy of a system which includes elasticity and mass), but may also may be a system resonating in a combination of mechanical and electric and/or electromagnetic system (e.g. if the actuating system includes a capacitance based inducement).

In the context of system 1200, such resonating mechanical system includes also some or all of displacer 1240, and the aforementioned resonating area (or areas) of surface 152 around the one or more second connection locations (and may include other parts of system 1200 and/or of the aircraft as well).

Referring to system 1200 in general, it is noted that the operation of controller 1290 may be based on input received from one or more sensors 1250 of system 1200 (as well as from other optional sources, as discussed above). For example, system 1200 may further include at least one ice thickness sensor 1250 which is operable to sense an ice thickness responsive characteristic of aircraft skin surface 152, by sensing displacement of surface 152 responsive to the forces produced as a result of the angular acceleration of rotor 1210.

In such cases, controller 1290 is operable to control the torques in motor 1230 (e.g. by controlling currents in the motor and/or controlling operation of the brake) in response to an output of the at least one ice thickness sensor 1250 which is indicating the ice thickness responsive characteristic. It is noted that utilization of one or more sensors 1250 may be used whether the deicing is achieved by rapid acceleration, by alternating acceleration, or in any other way.

The optional one or more sensors 1250 of system 1200 may be used to collect information which can later be used by controller 1290. For example, sensor(s) 1250 may be used to determine system parameters, aircraft skin surface parameters, aircraft parameters, atmospheric parameters and/or ice parameters.

For example, system 1200 may include one or more sensors 1250 operable to sense at least one icing parameter (a parameter which is indicative of icing condition on aircraft skin surface 152). Controller 1290 in such case is operable to control the torques in motor 1230 based at least one the icing parameter. The icing parameter may be useful, for example, for detecting presence of ice on surface 1250, for detecting thickness of the ice, for detecting removal of ice by the operation of system 1200, and so on. Some of the types of sensors 1250 which may be used are strain gauge, current gauge, acceleration gauge, and so on.

Optionally, system 1200 may include at least one sensor 1250 which is an ice thickness sensor (e.g. employing at least one of an acceleration sensor and a strain gauge) for sensing an ice thickness responsive characteristic of aircraft skin surface 152, e.g. by sensing displacement of aircraft skin surface 152 responsive to the forces produced by system 1290. Controller 1290 in such case is operable to control an operation of the brake 1260 and/or of motor 1230 (thereby affecting the torques in the motor) based on an output of the at least one ice thickness sensor. An example of control logic which may be employed by controller 1290 is described hereinbelow with reference to FIG. 27.

Optionally, sensor 1250 may be an acceleration sensor, such as model NMA 1213D acceleration sensors commercially available from Freescale Semiconductors Inc., 6501 William Cannon Drive West, Austin, Tex. 78735, USA; which is mounted on a surface of displacer 1240 on the wing of the aircraft in order to serve as ice presence sensors, as is described hereinbelow. Such an acceleration sensors may be arranged to lie perpendicular to the surface of the leading edge.

Optionally, sensor 1250 may be a strain gauge (e.g. strain gauge 062AP commercially available from Vishay Intertechnology Inc., 63 Lancaster Ave., Malvern Pa. 19355, USA). Such a strain gauge may be mounted, for example, onto the curved interior surface of the leading edge. Control logic which may be employed by controller 1290 based on information received from a strain gauge is described hereinbelow with reference to FIG. 28.

Figure 22:
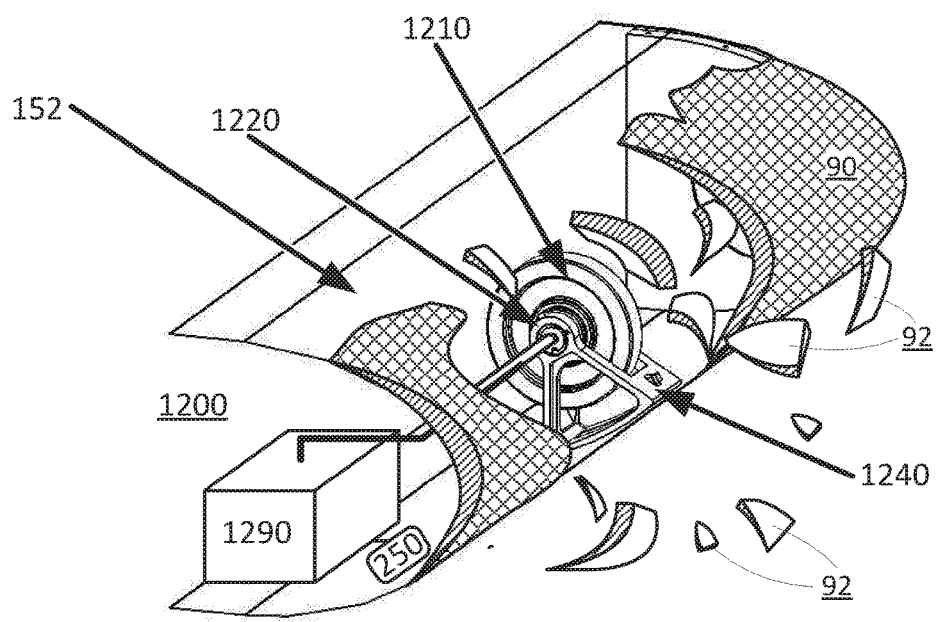

FIG. 22 illustrates an example of system 1200, in accordance with the presently disclosed subject matter. As mentioned above, optionally the displacements of aircraft skin surface 152 at the at least one connection location cause disengagement of ice from aircraft skin surface 152 (in conditions of ice accumulation). In the example of FIG. 22, a single unit serves both as displacer 1240 and as stator 1220. FIG. 22 further demonstrates ice 90 collected on aircraft skin surface 152, and shattered ice 92 which is disengaged from surface 152 as a result from the deformation of surface 152 by system 1200.

As discussed above, the movements of aircraft skin surface 152 by forces transmitted thereto by displacer 1240 are in opposing directions. Such forces in opposing directions results in sheer stress and in twisting of aircraft skin surface 152, which may facilitate disengagement of ice 90 from surface 152. It is nevertheless that other types of mechanical stresses and forces applied onto the ice 90 by surface 152 (as a result of operation of system 1200) may also result in disengagement of ice.

FIGS. 24A through 24D show, in an exaggerated manner, deformation of the leading edge of surface 152 in different phases of an periodically alternating second torque, in accordance with the presently disclosed subject matter. In the illustrated example, the second torque changes harmonically (in a sinusoidal manner), and FIG. 24A demonstrate the deformation at phase 0, FIG. 24B demonstrate the deformation at phase $\pi/2$ (or 90°), FIG. 24C demonstrate the deformation at phase $\pi$ (or 180°) and FIG. 24D demonstrate the deformation at phase $3\pi/2$ (or 270°). The extent of exaggeration is estimated to be a factor of 40. Location 1110 illustrated in FIGS. 24A through 24D is the connection location where displacer 1240 is fixed to aircraft surface 152.

FIGS. 25A and 25B illustrate examples of aircraft deicing systems which includes a plurality of rotors 1210, in accordance with examples of the presently disclosed subject matter. In the example of FIG. 25B, each of the motors 1230 is controlled by a dedicated controller 1290. In the example of FIG. 25A, a plurality of motors 1230 is controlled by a single controller 1290. In the illustrated examples, each motors 1230 is supported by a distinct displacer 1240. It is noted that optionally, different motors 1230 may be supported by a single displacer 1240.

Optionally, the plurality of motors 1230 may be activated in a predetermined sequence with respect to one another, thereby causing disengagement of ice from the aircraft skin surface 152. For example, the motors 1230 may be angularly activated one after the other, in accordance with their order of position along the leading edge. Optionally, the aforementioned predetermined sequence produces displacement of the aircraft skin surface 152 which proceeds therealong in a wavelike progression.

Figure 26:
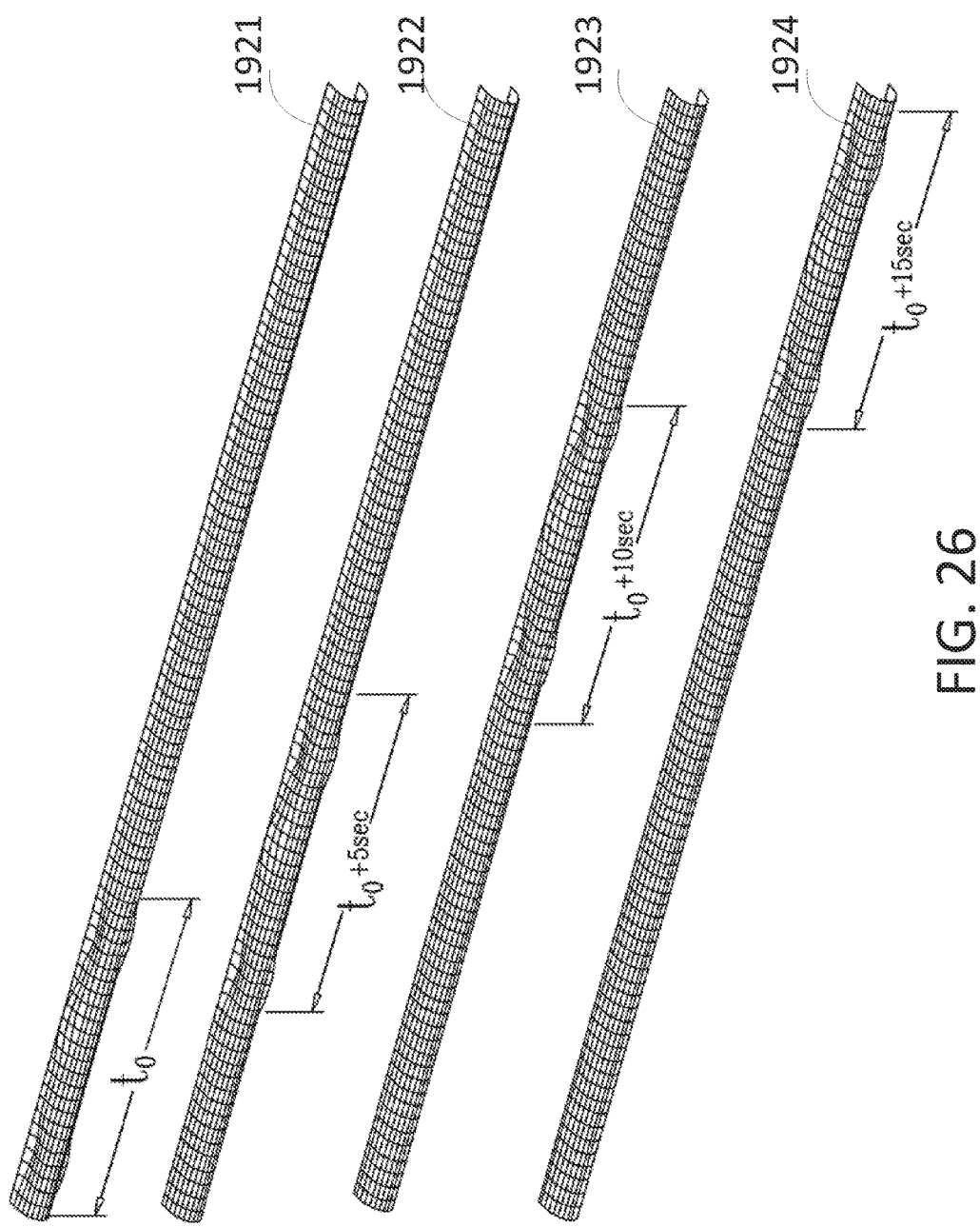
FIG. 26 provides simplified illustrations, in exaggerated form, of deformation of an aircraft skin surface responsive to synchronized operation of multiple separate rotatable masses, in accordance with the presently disclosed subject matter.

FIG. 26 provides simplified illustrations, in exaggerated form, of deformation of an aircraft skin surface 152 responsive to synchronized operation of multiple separate motors 1230, in accordance with the presently disclosed subject matter.

Multiple motors 1230 (controlled by one or more controllers 1290) may be operated in a predetermined sequence, e.g. at synchronized time intervals, to provide deformation of aircraft skin surface 152. This may be used, for example, for disengagement of ice from aircraft skin surface 152. In the illustrated embodiment seen in FIG. 26, the predetermined sequence produces displacement of aircraft skin surface 152 which proceeds along surface 152 (substantially parallel to the leading edge) in a wavelike progression. The different diagrams 1921, 1922, 1923 and 1924 represent successive points in time, in one such sequence of activation.

It is appreciated that the torques in each of the motors 1230 may be controlled by a centralized controller 1290 to provide the predetermined sequence (e.g. as illustrated). Additionally or alternatively, each of the motors 1230 may have an associated controller 1290, where the multiple controllers 1290 are in communication with one another or in communication with a centralized controller 1290.

Figure 27:
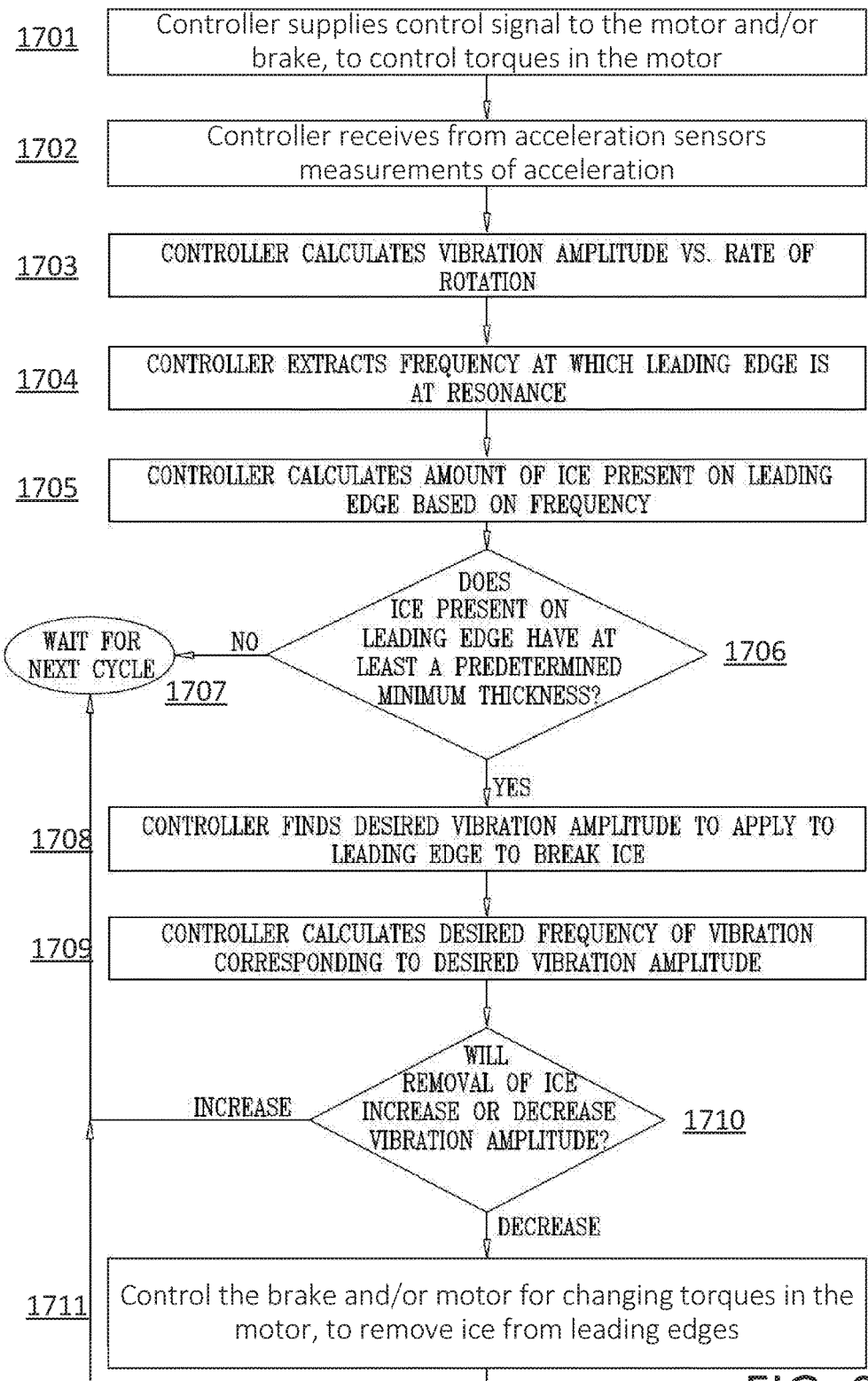
FIGS. 27 and 28 are simplified flow charts illustrating methods for controlling aircraft deicing systems, in accordance with the presently disclosed subject matter.

FIG. 27 is a simplified flow chart illustrating method 1700 for controlling system 1200, in accordance with the presently disclosed subject matter. Referring to the examples set forth with respect to the previous drawings, method 1700 may be executed by system 1200, and especially by controller 1290. Method 1700 includes at least stages 1701, 1702, 1703, 1704, 1705, 1706, 1707, 1708, 1709, 1710, and 1711. Method 1700 may also include additional stages.

As seen in FIG. 27, the controller may provide a control signal to a motor and/or to a brake, causing the motor and/or brake to change the torques in the motor, thereby causing forces which accelerate the aircraft skin surface at the at least one connection location. Acceleration sensors measure linear acceleration of the aircraft skin surface (directly or indirectly, by measuring acceleration of the displacer), and provide corresponding output indications to the controller.

Figure 30:
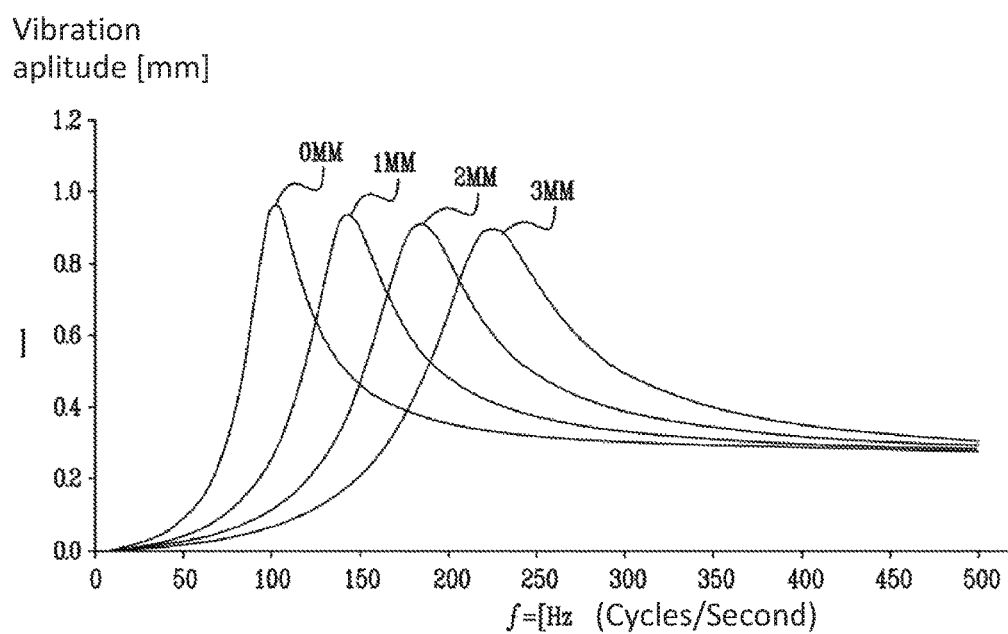
FIG. 30 illustrates examples of empirically derived frequency response curves for various thicknesses of ice on the leading edge.

The controller calculates vibration amplitude vs. rate of activation (e.g. rate of rotation of the motor), which represents the frequency response of the leading edge, at which the sensor is located. FIG. 30 illustrates examples of empirically derived frequency response curves for various thicknesses of ice on the leading edge. Alongside each frequency response curve of FIG. 30 is an indication, as an example, of the ice thickness represented thereby.

The controller extracts the frequency at which the leading edge is at resonance and, based on this frequency, calculates the amount of ice present on the leading edge. Additionally, based on prior calibration, the controller makes a determination as to whether the ice present on the leading edge has at least a predetermined minimum thickness (e.g. 2 mm) If so, the controller then determines (e.g. based on a look-up table) a vibration amplitude (or required displacement, or another mechanical parameter) that should be applied to the leading edge to break the ice for the thickness of ice present on the leading edge.

Optionally, prior to operating the brake and/or motor, the controller calculates the desired frequency of vibration corresponding to the desired vibration amplitude and makes a determination of whether, once the ice is removed, the vibration amplitude will increase or decrease.

Optionally, only if at the desired frequency of vibration corresponding to the desired vibration amplitude, the vibration amplitude will decrease once the ice is removed, the brake and/or motor is operated to drive aircraft skin surface at the at least one connection location to remove the ice from the leading edges. Otherwise, the thickness of the ice will be allowed to increase until, at the desired frequency of vibration corresponding to the desired vibration amplitude, the vibration amplitude will decrease once the ice is removed. Alternatively other operational techniques for preventing undesired increase in vibration amplitude of the aircraft skin surface following ice disengagement therefrom may be employed.

The functionality of FIG. 27 may take place intermittently at predetermined intervals, e.g. 10 minutes. The operation of the motor and/or the brake may optionally take place upon each actuation for a predetermined time. Alternatively, the cycle of operation described hereinabove is repeated intermittently at intervals which depend on the altitude and flying conditions of the aircraft. Additionally or alternatively, the cycle of operation described hereinabove is repeated intermittently at intervals which depend on the thickness of the ice present on the leading edge.

If the functionality of FIG. 28, described hereinbelow, is employed, that part of the functionality of FIG. 27 which calculates the amount of ice present on the leading edge based on frequency may optionally not be employed. The remainder of the functionality of FIG. 27 operates when the functionality of FIG. 28 indicates the presence of at least a predetermined thickness of ice on the leading edge.

Figure 28:
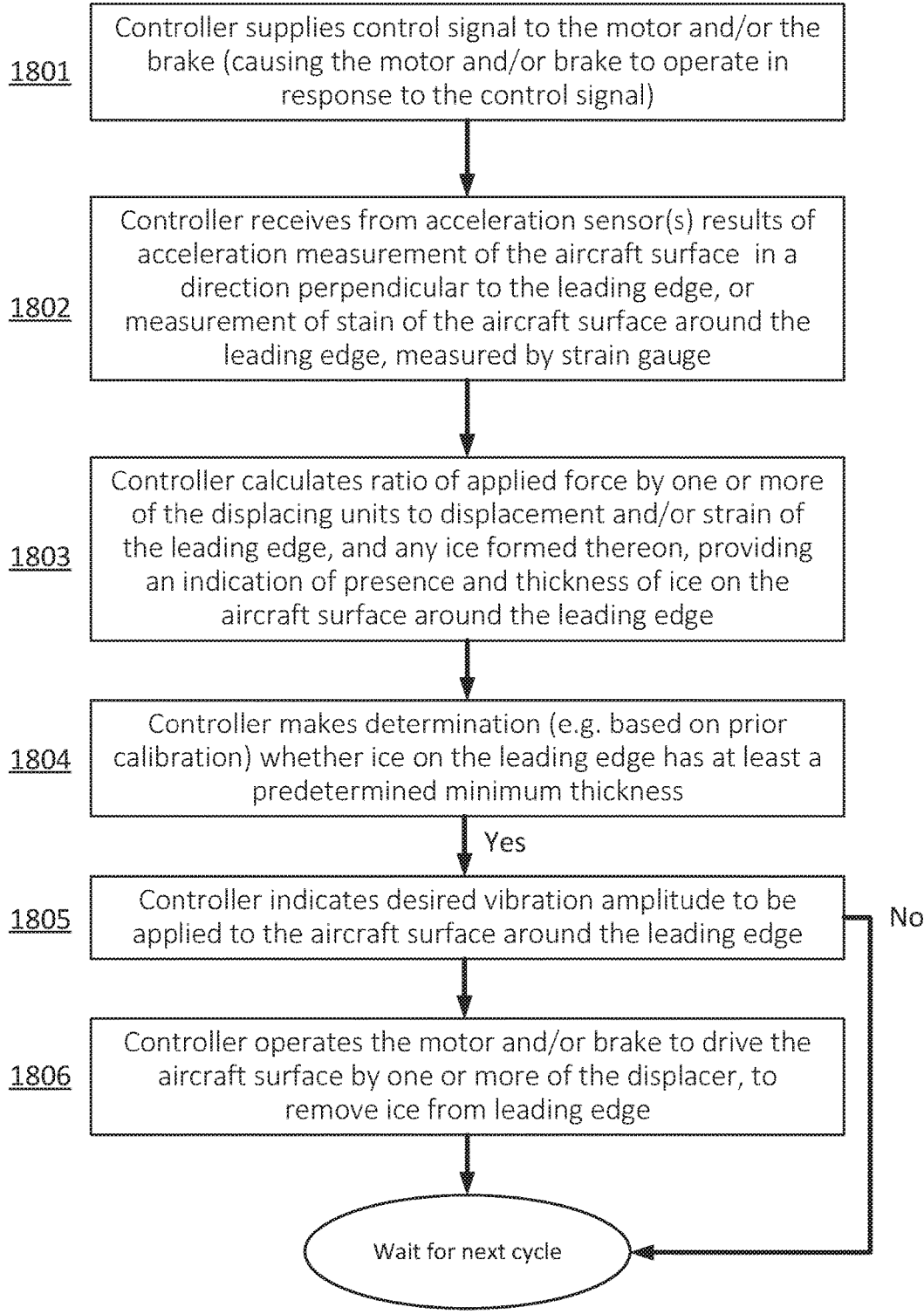

FIG. 28 is a simplified flow chart illustrating method 1800 for controlling system 1200, in accordance with the presently disclosed subject matter. Referring to the examples set forth with respect to the previous drawings, method 1700 may be executed by system 1200, and especially by controller 1290. Method 1800 is exemplified in FIG. 28 in relation to an aircraft skin surface which is a leading edge of an aircraft surface, but it is noted that method 1800 may also be applied for removing ice from other types of aircraft skin surfaces. Method 1800 includes at least stages 1801, 1802, 1803, 1804, 1805, and 1806. Method 1800 may also include additional stages.

The controlling method 1800 of FIG. 28 is based on information collected by acceleration sensors and/or strain gauges. As seen in FIG. 28, a control signal may be supplied by the controller to the motor and/or brake, causing the motor and/or the brake to generate torques in the motor (which result in angularly accelerating the rotor at a certain rate). Acceleration sensors measure linear acceleration of the leading edge in a direction perpendicular thereto and/or strain gauges measure the strain of the leading edge and provide corresponding output indications to the controller.

The controller calculates ratio of the force applied by one or more of the displacers to the displacement of the leading edge and any ice formed thereon, which represents the stiffness of the leading edge adjacent to where the acceleration sensors and/or strain gauges are located, together with any ice formed in that area. This provides an indication of the presence and thickness of ice on the leading edge.

Additionally the controller makes a determination (e.g. based on prior calibration) as to whether the ice present on the leading edge has at least a predetermined minimum thickness (e.g. 2 mm) If so, the controller, as described hereinabove with reference to FIG. 8, then indicates a desired vibration amplitude (or another mechanical parameter such as required force or displacement) that should be applied to the leading edge to remove the ice.

The functionality of method 1800 may takes place intermittently at predetermined intervals (e.g. every 1-10 minutes). Alternatively, the cycle of operation described hereinabove may be repeated intermittently at intervals which depend on the altitude and flying conditions of the aircraft. Additionally or alternatively, the cycle of operation described hereinabove may be repeated intermittently at intervals which depend on the thickness of the ice present on the leading edge.

FIG. 30 illustrates examples of frequency response curves for various thicknesses of ice on aircraft skin surface 152 (e.g. on a leading edge of a wing), in accordance with examples of the presently disclosed subject matter. Alongside each frequency response curve of FIG. 11 is an indication, as an example, of the ice thickness represented thereby. Ways for utilizing the different frequency response behaviors (and especially the different resonance frequency) when different thickness of ice is accumulated on aircraft skin surface 152 are exemplified above with respect to methods 1700 and 1800.

Optionally, system 1200 may include a mechanism for changing the moment of inertia of rotor 1210. This may include, for example, a mechanism to move parts of rotor 1210 closer or farther from the axis of rotation. This may provide an additional degree(s) of freedom in controlling the operation of the deicing system of the present invention. When rotor 1210 has relatively small moment of inertia, its angular acceleration applies relatively little force to surface 152. As the moment of inertia of rotor 1210 is larger, the angular acceleration thereof produces corresponding greater force. Thus by controlling the moment of inertia of rotor 1210, the amount of force applied to aircraft skin surface 152 may be modulated and thus controlled.

It is noted that such a mechanism may be a manual mechanism (which can be operated by a person, e.g. when system 1200 is installed). Such a mechanism may optionally be controllable by system 1200 (e.g. based on instructions of controller 1290). In such a case, it is possible to change the respective moment of inertia during a flight of the aircraft (e.g. based on icing conditions). Such a mechanism may be a simple mechanical mechanism (e.g. sliding weights along a shaft or a rod), but may also be electromechanical (e.g. changing the distance of the parts by a motor, by changing a level of an electric current, and so on).

Optionally, the distance of the center of rotor 1210 from surface 152 is at least 4 cm, when the aircraft skin surface 152 is an aircraft surface which includes a leading edge of the aircraft.

Optionally, acceleration levels of aircraft skin surface 152 at each of the at least one connection location as a result of the torques generated in motor 1230 exceed 80 g ("g" represents standard gravity, approximately equal to 9.8 m/sec$^2$). At each such location, the acceleration level change with time (occasionally diminishing completely), but at some points during the operation (e.g. in a repeating cycle whose frequency matches the driving frequency) it exceeds 80 g, in such cases. It is noted that much higher acceleration level may be implemented, e.g. higher than 100 g, higher than 200 g, etc.

Reverting to FIG. 20, an aircraft 100 is disclosed, equipped with a deicing system constructed and operative in accordance with the presently disclosed subject matter. The deicing system is system 1200, which may be located within the wings 102 of the aircraft adjacent the leading edges 104 of the wings 102. The deicing system may alternatively or additionally be located within the tail or stabilizers of the aircraft, or in other airfoils where icing is likely to occur. It is noted that aircraft 100 of FIG. 20 may differ from aircraft 100 of FIG. 1, at least in the type of system installed on the aircraft for deicing and/or for applying deformation to its aircraft surfaces. However, as system 1200 may be used in a variation of system 200 as actuating unit 220, aircraft 100 may implement both the functionalities discussed with respect to FIG. 1 (and generally to FIGS. 1 through 19) and the functionalities discussed with respect to FIG. 20 (and generally to FIGS. 20 through 32).

Aircraft 100 includes:
a. an airframe including aircraft skin surface 152 which includes a leading edge of aircraft 100;
b. a plurality of motors, each including a stator and a rotor, the rotor being rotatable about a center of mass of the rotor, and the stator rotatably supporting the rotor;
c. a plurality of displacers 1240, each of the displacer connected to a stator of one of the motors, and also connected to the aircraft skin surface at a plurality of connection locations;
d. at least one controller 1290 operable to control torques in the motors, the torques in each motor including a first torque applied to the rotor (which angularly accelerates the rotor about the center of mass) and a second torque, applied to the stator, which produces countering forces applied to the aircraft skin surface at the plurality of connection locations by the at least one displacer at different directions, causing displacement of the aircraft skin surface at at least one of the connection locations. Optionally, aircraft 100 may further include one or more engines 190 operable to propel the aircraft in a flying direction (the one or more engines are connected to the airframe, e.g. to fuselage 112).

Optionally, the displacements of the aircraft skin surface at the at least one connection location cause disengagement of ice from the aircraft skin surface.

Aircraft 100 may also include: an airframe which includes aircraft skin surface that include a leading edge of the aircraft; a plurality of motors, each of the motors including: a rotor rotatable about a center of mass of the rotor, and a stator rotatably supporting the rotor and connected to the aircraft skin surface by a displacer; and a controller operable to control torques in the motors, the torques in each motor including: a first torque, applied to the rotor, which angularly accelerates the rotor about its center of mass; and a second torque, applied to the stator, which produces countering forces applied by the displacer to the aircraft skin surface at different directions, causing displacement of the aircraft skin surface. Optionally, each displacer may be connected to the aircraft skin surface at a plurality of connecting locations, wherein the second torques in each motors produce the countering forces at the connection locations in which the corresponding displacer is connected to the aircraft skin surface.

It is noted that any variation of system 1200 discussed above, may be installed on aircraft 100. It is noted that in addition to system 1200, aircraft 100 may incorporate other features which assist in deicing. For example, the thickness, form and/or internal construction of parts of the airframe (especially those including aircraft skin surface 152) may be dedicatedly designed to support vibrations in specific frequencies excited by system 1200, while diminishing vibrations in other frequencies.

As aforementioned, system 1200 may serve as deicing system on a wide range of vehicles (e.g. aircrafts, ships, submarines, cars, trucks, trains, tanks, and so on). The deicing system (system 1200, in such case) may be located within the vehicle, or on either side of its external surface—on any aircraft skin surface of the vehicle, especially on surfaces on which icing is likely to occur.

A vehicle is therefore disclosed, including:
a. a chassis;
b. one or more engines 190 operable to propel the vehicle (the one or more engines are connected to the chassis, directly or indirectly);
c. one or more deicing systems 1200 installed on one or more skin surfaces of the vehicle, including one or more motors whose torques are controlled by one or more controllers.

Figure 31:
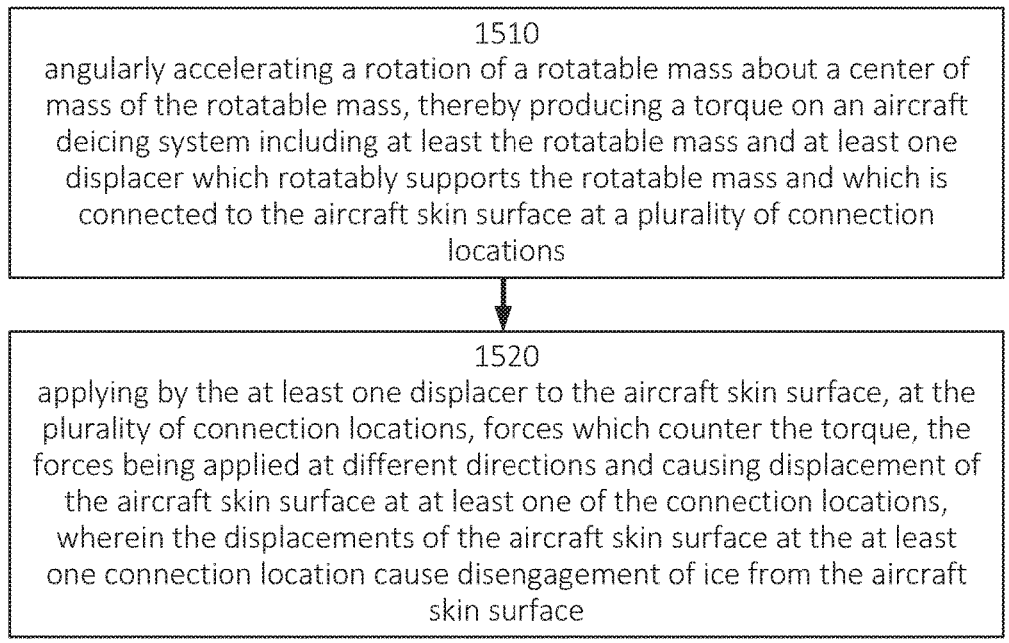
FIGS. 31 and 32 are flow charts illustrating examples of methods for deicing an aircraft skin surface of an aircraft, in accordance with the presently disclosed subject matter.

FIG. 31 is a flow chart illustrating an example of method 1500, in accordance with the presently disclosed subject matter. Method 1500 is a method for deicing an aircraft skin surface of an aircraft. Referring to the examples set forth with respect to the previous drawings, method 1500 may be executed by system 1200. Furthermore, the different variations discussed with respect to system 1200 have counterpart stages which may be integrated into method 1500 for achieving the functionalities discussed with respect to system 1200, even if not explicitly discussed with respect to method 1500. Method 1500 may be used for deicing of different types of aircraft skin surfaces. For example, the aircraft skin surface may include a leading edge of a wing.

Stage 1510 of method 1500 includes angularly accelerating a rotation of a rotor about a center of mass of the rotor, thereby producing a torque on an aircraft deicing system including at least the rotor and at least one displacer which rotatably supports the rotor and which is connected to the aircraft skin surface at a plurality of connection locations.

Referring to the examples set forth in the previous drawing, it is noted that the angular acceleration of stage 1510 may be executed by motor 1230 and/or by brake 1260.

It is noted that the operation of the deicing system (which includes at least the rotor, the displacer as well as torque generator such as motor or brake) may include angular acceleration of the mass which does not lead to significant deformation of the aircraft skin surface. For example, a motor may bring the rotor to an operation angular velocity in a relatively slow acceleration, and the acceleration of stage 1510 is faster acceleration from the operational velocity to a higher/lower angular velocity. Optionally, the torque is at least 2 Newton·meter.

Stage 1520 of method 1500 includes applying by the at least one displacer to the aircraft skin surface, at the plurality of connection locations, forces which counter the torque, the forces being applied at different directions and causing displacement of the aircraft skin surface at at least one of the connection locations, wherein the displacements of the aircraft skin surface at the at least one connection location cause disengagement of ice from the aircraft skin surface. Referring to the examples set forth with respect to the previous drawings, stage 1520 may be executed by displacer 1240. Optionally, the applying includes applying forces of at least 100 Newton to the aircraft skin surface.

Optionally, method 1500 may include angularly accelerating the rotation of the rotor about the center of mass at different directions at an alternating periodical manner. The applying of stage 1520, in such a case, includes applying forces applied to the aircraft skin surface at the plurality of connection locations by the at least one displacer at different directions, causing displacement at different directions of the aircraft skin surface at the at least one connection location. The rate of alternation of the angular velocity may change, e.g. a rate of at least 40 alternations per second. Optionally, the alternating periodical angular acceleration causes the rotor to rotate about the center of mass in opposing directions.

The aforementioned alternating periodical angular accelerating of the rotor about the center of mass may executed at a driving frequency, thereby bringing the aircraft skin surface to resonate around the at least one connection location, thereby causing disengagement of ice from the aircraft skin surface It is noted that method 1500 may also include sensing an ice thickness responsive characteristic of the aircraft skin surface by sensing displacement of the aircraft skin surface responsive to the forces produced by motion of the rotor; and controlling the angular acceleration of the rotor in response to a result of the sensing.

Figure 32:
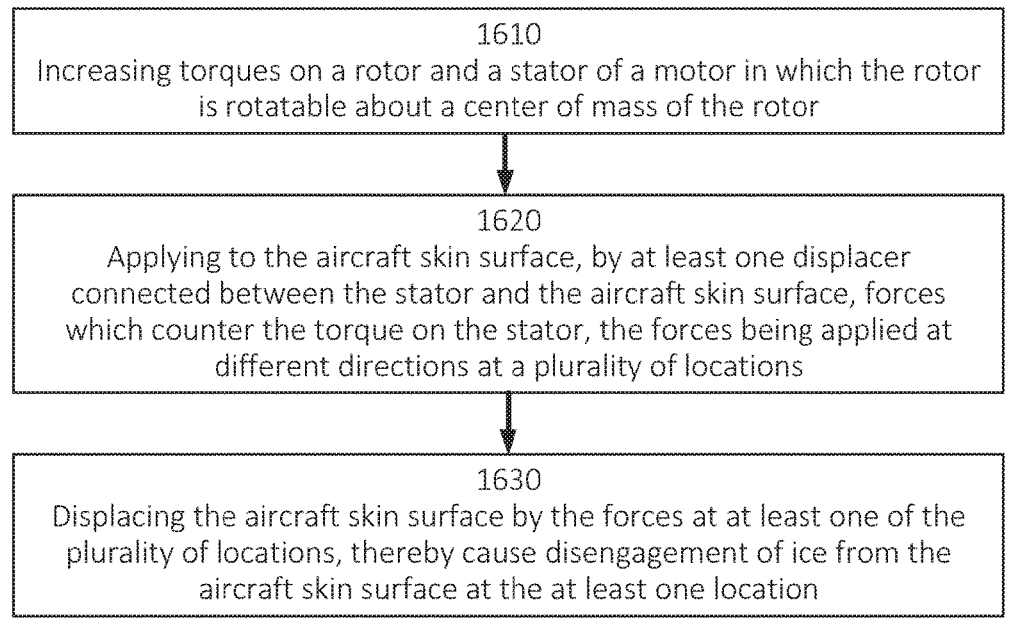

FIG. 32 is a flow chart illustrating an example of method 1600, in accordance with the presently disclosed subject matter. Method 1600 is a method for deicing an aircraft skin surface of an aircraft. Referring to the examples set forth with respect to the previous drawings, method 1600 may be executed by system 1200. Furthermore, the different variations discussed with respect to system 1200 have counterpart stages which may be integrated into method 1600 for achieving the functionalities discussed with respect to system 1200, even if not explicitly discussed with respect to method 1600. Method 1600 may be used for deicing of different types of aircraft skin surfaces. For example, the aircraft skin surface may include a leading edge of a wing.

Stage 1610 of method 1600 includes increasing torques on a rotor and a stator of a motor in which the rotor is rotatable about a center of mass of the rotor. Referring to the examples set forth with respect to the previous drawings, the increasing may be executed by motor 1230, and controlled by controller 1290. The rotor in such a case is rotor 1210, and the stator is stator 1220.

Optionally, the increasing of the torques is achieved by applying electric current in at least one coil of the motor. It is noted that the increasing of the torques may also be achieved by braking a rotation of the rotor (e.g. using a brake).

Stage 1610 results in stage 1620 of applying to the aircraft skin surface, by at least one displacer connected between the stator and the aircraft skin surface, forces which counter the torque on the stator, the forces being applied at different directions at a plurality of locations. Referring to the examples set forth with respect to the previous drawings, the applying of forces in stage 1620 may be executed by displacer 1240.

It is noted that in addition to stage 1620, stage 1610 would generally also result in angularly accelerating a rotation of the rotor about its center of mass, as a result of the increasing of the torque on the rotor.

Stage 1620 leads to stage 1630 of displacing the aircraft skin surface by the forces at at least one of the plurality of locations, thereby cause disengagement of ice from the aircraft skin surface at the at least one location.

The magnitude of torques and of forces used in method 1600 depend on the physical characteristics of the aircraft skin surface and of the deicing system, on the degree of ice, and on the deicing strategy used (e.g. brute sheer force, or bringing to resonance).

If torques and resulting forces are increase until the ice is broken, stage 1610 may include increasing the torque on the stator to at least 2 Newton·meter, and/or stage 1620 may include applying forces of at least 100 Newton to the aircraft skin surface. If the aircraft skin surface is brought to resonance in order to break the ice, significantly lower torques and forces may be used (e.g. 20% of the respective torques/forces mentioned before).

Optionally, stage 1610 may include alternately increasing each of the torques at alternating opposite directions, thereby producing forces applied (at stage 1620) to the aircraft skin surface at the plurality of locations at different directions, wherein the resulting displacing (of stage 1630) includes displacing of the aircraft skin surface at the at least one location at different directions at different times.

Optionally, the alternately increasing of the torques is executed at a driving frequency, thereby bringing the aircraft skin surface to resonate around the at least one location, thereby causing disengagement of ice from the aircraft skin surface. By way of example, the driving frequency may be 20 Hz or higher.

Optionally, method 1600 may further include sensing an ice thickness responsive characteristic of the aircraft skin surface by sensing displacement of the aircraft skin surface; and the level of increasing of the toques in stage 610 may be based a result of the sensing.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations and alternatives are also possible. The specifications and drawings are, accordingly, to be regarded in an illustrative rather than in a restrictive sense.

What is claimed is:

1. A system for applying deformations to a structural surface, the system comprising:
   an actuating unit, operable to produce a periodically variable force which is applied to at least one first location of the structural surface, thereby displacing the structural surface in a plurality of directions at the at least one first location; and
   a passive displacing unit comprising a weight and a displacer supporting the weight and fixed to at least one second location on the structural surface;
   wherein the structural surface is capable of transferring vibrations between the at least one first location and the at least one second location, so that the displacing of the structural surface at the at least one first location produces forces which are applied to the weight via the structural surface and the displacer, bringing the weight to resonance, thereby displacing the structural surface in a plurality of directions at each of the at least one second location.

2. The system according to claim 1, wherein the actuating unit is fixed to the structural surface at one or more of the at least one first location.

3. The system according to claim 2, wherein the actuating unit is operable to produce the periodically variable force at a driving frequency, thereby producing forces which bring into resonance the weight, a part of the structural surface, and at least a part of the actuating unit, thereby displacing the structural surface in a plurality of directions at each of the at least one second location and at each of the at least one first location.

4. The system according to claim 3, wherein in the resonance state a ratio between (a) an average magnitude of displacement of the at least one second location and (b) an average magnitude of displacement of the at least one first location is between ⅓ and 3.

5. The system according to claim 1, wherein the structural surface comprises an aircraft leading edge.

6. The system according to claim 5, wherein an overall mass of the passive displacing unit is at least 80 grams.

7. The system according to claim 5, wherein acceleration levels of the structural surface at each of the at least one second location and at each of the at least one first location exceed 80 g during an operation of the actuating unit.

8. The system according to claim 1, further comprising:
   at least one ice thickness sensor for sensing an ice thickness responsive characteristic of the structural surface, by sensing displacement of the structural surface responsive to the forces produced by the system; and at least one controller operable to control an operation of the actuating unit based on an output of the at least one ice thickness sensor.

9. The system according to claim 1, wherein the actuating unit comprises at least one actuator displacer fixed to the at least one first location and rotatably supporting a shaft about which the at least one eccentric mass moves in rotational motion, thereby producing inertial forces which are applied via the shaft to the at least one actuator displacer, causing the at least one actuator displacer to displace the structural surface in a plurality of directions at each of the at least one first location, the plurality of directions corresponding to changing positions of the eccentric mass as it moves in rotational motion about the shaft.

10. The system according to claim 1, comprising a plurality of actuating units and a plurality of passive displacing units, wherein the system comprises at least twice as many passive displacing units than actuating units;
   wherein each of the actuating units is fixed to the structural surface at one or more of the at least one first location, and is operable to produce the periodically variable force at a driving frequency, thereby producing forces which bring into resonance the weight, a part of the structural surface, and at least a part of the actuating unit, thereby displacing the structural surface in a plurality of directions at each of the at least one second location and at each of the at least one first location;
   wherein in the resonance state a ratio between (a) an average magnitude of displacement of the at least one second location and (b) an average magnitude of displacement of the at least one first location is between ⅓ and 3;
   wherein the structural surface comprises an aircraft leading edge;
   wherein the displacements of the structural surface at the second locations and at the first locations cause disengagement of ice from the leading edge.

11. An aircraft comprising:
   an airframe including a structural surface;
   an engine operable to propel the aircraft in a flying direction, the engine being mechanically coupled to the airframe;
   a plurality of actuating units, each of the actuating units being operable to produce a periodically variable force which is applied to at least one first location of the structural surface, thereby displacing the structural surface in a plurality of directions at the at least one first location; and
   a plurality of passive displacing units, each of the passive displacing units comprising a weight and a displacer supporting the weight and fixed to at least one second location on the structural surface;
   wherein the structural surface is capable of transferring vibrations between each of the first locations and at least one associated second location out of the second location, so that the displacing of the structural surface at the first locations by the actuating units produces forces which are applied to the plurality of weights via the structural surface and the displacers, bringing each of the weights to resonance, thereby displacing the structural surface in a plurality of directions at each of the second locations.

12. The aircraft according to claim 11, wherein the displacements of the structural surface at the at least one second location cause disengagement of ice from the structural surface.

13. The aircraft according to claim 11, wherein the actuating unit is fixed to the structural surface at one or more of the at least one first location, wherein the actuating unit is operable to produce the periodically variable force at a driving frequency, thereby producing forces which bring into resonance the weight, a part of the structural surface, and at least a part of the actuating unit, thereby displacing the structural surface in a plurality of directions at each of the at least one second location and at each of the at least one first location.

14. The aircraft according to claim 11, wherein the structural surface comprises an aircraft leading edge, wherein the aircraft comprises at least one actuating unit, and a plurality of passive displacing units, wherein along a distance of at least 5 meters of the leading edge, a distance between any two adjacent passive displacement units does not exceed 1 meter.

15. The aircraft according to claim 11, further comprising:
   at least one ice thickness sensor for sensing an ice thickness responsive characteristic of the structural surface, by sensing displacement of the structural surface responsive to the forces produced by the system; and
   at least one controller operable to control an operation of the actuating unit based on an output of the at least one ice thickness sensor.

16. The aircraft according to claim 11, comprising a plurality of actuating units and a plurality of passive displacing units, wherein the system comprises at least twice as many passive displacing units than actuating units;
   wherein each of the actuating units is fixed to the structural surface at one or more of the at least one first location, and is operable to produce the periodically variable force at a driving frequency, thereby producing forces which bring into resonance the weight, a part of the structural surface, and at least a part of the actuating unit, thereby displacing the structural surface in a plurality of directions at each of the at least one second location and at each of the at least one first location;
   wherein in the resonance state a ratio between (a) an average magnitude of displacement of the at least one second location and (b) an average magnitude of displacement of the at least one first location is between ⅓ and 3;
   wherein the structural surface comprises an aircraft leading edge;
   wherein the displacements of the structural surface at the second locations and at the first locations cause disengagement of ice from the leading edge.

17. A method for applying deformations to a structural surface, the method comprising:
   applying by an actuation unit a periodically variable force to at least one first location of the structural surface, resulting in vibrations which displace the structural surface in a plurality of directions at the at least one first location; and
   transferring the vibrations by the structural surface to a passive displacing unit coupled to the structural surface at one or more second locations separated from the at least one first location; thereby bringing a weight of the actuation unit and a part of the structural surface to resonance;
   wherein the resonance of the structural surface creates deformations of the structural surface in a plurality of directions at the one or more second locations.

18. The method according to claim 17, wherein the deformations of the structural surface cause disengagement of ice from the structural surface.

19. The method according to claim 17, wherein the transferring of the vibrations by the structural surface produce forces which bring into resonance the weight, a part of the structural surface and at least a part of the actuating unit, thereby displacing the structural surface in a plurality of directions at each of the one or more second locations and at each of the one or more first location.

20. The method according to claim 17, further comprising:
   sensing an ice thickness responsive characteristic of the structural surface, by sensing displacement of the structural surface responsive to the forces produced by the system; and
   controlling an operation of the actuating unit based on a result of the sensing.

* * * * *